(12) United States Patent
Chou et al.

(10) Patent No.: US 10,558,013 B2
(45) Date of Patent: Feb. 11, 2020

(54) ANNULAR OPTICAL ELEMENT ASSEMBLY, IMAGING LENS SET AND ELECTRONIC DEVICE

(71) Applicant: LARGAN PRECISION CO., LTD., Taichung (TW)

(72) Inventors: Ming-Ta Chou, Taichung (TW); Cheng-Feng Lin, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 150 days.

(21) Appl. No.: 15/615,923

(22) Filed: Jun. 7, 2017

(65) Prior Publication Data
US 2018/0239109 A1 Aug. 23, 2018

(30) Foreign Application Priority Data

Feb. 22, 2017 (TW) .............................. 106105988 A

(51) Int. Cl.
*G02B 13/00* (2006.01)
*G02B 7/02* (2006.01)

(52) U.S. Cl.
CPC .......... *G02B 13/002* (2013.01); *G02B 7/021* (2013.01)

(58) Field of Classification Search
CPC ...... G02B 13/00; G02B 13/002; G02B 5/003; G02B 5/0278; G02B 7/00; G02B 7/021; G02B 7/02; G02B 7/023; G02B 7/026; G02B 7/04; G02B 27/00; G02B 27/0018; G02B 27/0025

USPC ........ 359/362, 601, 611, 740, 703, 704, 830
See application file for complete search history.

(56) References Cited

U.S. PATENT DOCUMENTS

| | | | |
|---|---|---|---|
| 6,898,030 B1 | 5/2005 | Lin et al. | |
| 7,042,659 B2 | 5/2006 | Huang et al. | |
| 7,068,448 B2 | 6/2006 | Huang | |
| 7,088,530 B1 | 8/2006 | Recco et al. | |
| 7,158,318 B2 | 1/2007 | Shirie | |
| 7,639,438 B2 | 12/2009 | Chen | |
| 7,755,857 B2 | 7/2010 | Yu | |

(Continued)

FOREIGN PATENT DOCUMENTS

| | | |
|---|---|---|
| CN | 205027955 U | 2/2016 |
| CN | 205507177 U | 8/2016 |

(Continued)

*Primary Examiner* — Jie Lei

(74) *Attorney, Agent, or Firm* — McClure, Qualey & Rodack, LLP

(57) ABSTRACT

An annular optical element assembly having a central axis includes a first annular optical element, a second annular optical element and a light blocking sheet. The first annular optical element includes a first central opening, a first axial connecting structure and a first inner receiving surface. The second annular optical element includes a second central opening, a second axial connecting structure and a second inner receiving surface. The second inner receiving surface surrounds the second central opening, wherein the second inner receiving surface is closer to the central axis than a second axial connecting surface is to the central axis, the second inner receiving surface is vertical to the central axis, and the first inner receiving surface and the second inner receiving surface are corresponding and not connected to each other for defining a receiving space.

10 Claims, 47 Drawing Sheets

(56) References Cited

U.S. PATENT DOCUMENTS

| | | | |
|---|---|---|---|
| 2012/0019905 A1* | 1/2012 | Teraoka | ............... G02B 7/021 359/356 |
| 2014/0177079 A1 | 6/2014 | Kim | |
| 2015/0219871 A1 | 8/2015 | Kim | |
| 2016/0377827 A1 | 12/2016 | Kang et al. | |

FOREIGN PATENT DOCUMENTS

| | | |
|---|---|---|
| CN | 205507178 U | 8/2016 |
| CN | 205507182 U | 8/2016 |
| CN | 205507196 U | 8/2016 |

* cited by examiner

ANNULAR OPTICAL ELEMENT ASSEMBLY, IMAGING LENS SET AND ELECTRONIC DEVICE

RELATED APPLICATIONS

This application claims priority to Taiwan Application Serial Number 106105988, filed Feb. 22, 2017, which is herein incorporated by reference.

BACKGROUND

Technical Field

The present disclosure relates to an annular optical element assembly and an imaging lens set. More particularly, the present disclosure relates to an annular optical element assembly and an imaging lens set which are applicable to portable electronic devices.

Description of Related Art

In general, besides lens elements being arranged in an imaging lens set, at least one annular optical element is also configured among the lens elements for positioning the lens elements with proper axial distances. When an additional optical element such as a light blocking sheet is simultaneously required in the imaging lens set, the light blocking sheet is only able to be disposed between the annular optical element and one of lens elements that are adjacent to each other. Accordingly, it is difficult to dispose the light blocking sheet with respect to a desired position on the optical axis in the conventional manufacturing and assembling techniques therefore.

FIG. 15 is a schematic view of a conventional imaging lens set 90 (some details about lens elements are omitted). In FIG. 15, a light blocking sheet 95 is limitedly disposed between a lens element 93 and an annular optical element 91 in the imaging lens set 90, and a light blocking sheet 96 is limitedly disposed between the annular optical element 91 and a lens element 94. Therefore, the light blocking sheets 95 and 96 are only able to be disposed in the imaging lens set 90 by a conventional stacking method for the optical elements, and thereby difficult to be configured with respect to a desired position on a central axis z (i.e. an optical axis of the imaging lens set 90).

Moreover, a conventional annular optical element is typically made by an injection molding method and has a smooth and bright surface, which is featured with high reflectivity. Accordingly, the stray light reflected from a surface of the conventional annular optical element cannot be effectively attenuated and would be incident on an image surface of an imaging lens set, which thereby affects the image quality thereof.

Given the above, how to improve the annular optical elements and the light blocking sheets so as to dispose the light blocking sheets at the desired positions, and reduce the stray light reflection from the annular optical elements has become one of the important subjects.

SUMMARY

According to one aspect of the present disclosure, an annular optical element assembly having a central axis includes a first annular optical element, a second annular optical element and a light blocking sheet. The first annular optical element includes a first central opening, a first axial connecting structure and a first inner receiving surface. The central axis passes through the first central opening. The first axial connecting structure surrounds the first central opening and includes a first axial connecting surface. The first inner receiving surface surrounds the first central opening, wherein the first inner receiving surface is closer to the central axis than the first axial connecting surface is to the central axis, and the first inner receiving surface is vertical to the central axis. The second annular optical element includes a second central opening, a second axial connecting structure and a second inner receiving surface. The central axis passes through the second central opening. The second axial connecting structure surrounds the second central opening and includes a second axial connecting surface, wherein the first axial connecting surface and the second axial connecting surface are corresponding and connected to each other for aligning the first annular optical element and the second annular optical element with the central axis. The second inner receiving surface surrounds the second central opening, wherein the second inner receiving surface is closer to the central axis than the second axial connecting surface is to the central axis, the second inner receiving surface is vertical to the central axis, and the first inner receiving surface and the second inner receiving surface are corresponding and not connected to each other for defining a receiving space. An outer diameter of the light blocking sheet is smaller than an outer diameter of the first annular optical element and an outer diameter of the second annular optical element. The light blocking sheet is received in the receiving space and limitedly disposed with respect to a position on the central axis by the first annular optical element and the second annular optical element. The light blocking sheet includes a light blocking sheet opening, wherein the central axis passes through the light blocking sheet opening.

According to another aspect of the present disclosure, an imaging lens set includes the annular optical element assembly according to the foregoing aspect and a plurality of lens elements, wherein the lens elements and the annular optical element assembly are arranged along the central axis. The first axial connecting structure further includes a first outer receiving surface vertical to the central axis, wherein the first outer receiving surface is farther from the central axis than the first axial connecting surface is from the central axis. The second axial connecting structure further includes a second outer receiving surface vertical to the central axis, wherein the second outer receiving surface is farther from the central axis than the second axial connecting surface is from the central axis, and the first outer receiving surface and the second outer receiving surface are corresponding and connected to each other. When a thickness of the first annular optical element which is parallel to the central axis and corresponding to the first outer receiving surface is t1, and a thickness of the second annular optical element which is parallel to the central axis and corresponding to the second outer receiving surface is t2, the following condition is satisfied: $0.2 < t1/t2 < 5.0$.

According to another aspect of the present disclosure, an electronic device includes the imaging lens set according to the foregoing aspect.

According to another aspect of the present disclosure, an annular optical element assembly having a central axis includes a first annular optical element and a second annular optical element. The first annular optical element includes a first central opening and a first axial connecting structure. The central axis passes through the first central opening. The first axial connecting structure surrounds the first central opening and includes a first axial connecting surface. The second annular optical element includes a second central opening and a second axial connecting structure. The central axis passes through the second central opening. The second axial connecting structure surrounds the second central opening and includes a second axial connecting surface, wherein the first axial connecting surface and the second axial connecting surface are corresponding and connected to each other for aligning the first annular optical element and the second annular optical element with the central axis. On a cross-sectional plane of the annular optical element assembly which passes through the central axis and has a normal direction vertical to the central axis, when a minimum diameter position of the first axial connecting surface is A1, a minimum diameter position of the first central opening is H1, a minimum diameter position of the second axial connecting surface is A2, a minimum diameter position of the second central opening is H2, and an angle between a line connecting A1 with H1 and a line connecting A2 with H2 is θ, the following condition is satisfied: 5 degrees<θ<90 degrees.

According to another aspect of the present disclosure, an imaging lens set includes the annular optical element assembly according to the foregoing aspect and a plurality of lens elements, wherein the lens elements and the annular optical element assembly are arranged along the central axis. At least one of the first annular optical element and the second annular optical element further includes an element axial connecting surface, which is a conical surface, and the element axial connecting surface is for aligning the annular optical element assembly and at least one of the lens elements with the central axis.

According to another aspect of the present disclosure, an electronic device includes the imaging lens set according to the foregoing aspect.

According to another aspect of the present disclosure, an imaging lens set includes the annular optical element assembly according to the foregoing aspect and a plurality of lens elements, wherein the lens elements and the annular optical element assembly are arranged along the central axis. The first axial connecting structure further includes a first outer receiving surface vertical to the central axis, wherein the first outer receiving surface is farther from the central axis than the first axial connecting surface is from the central axis, The second axial connecting structure further includes a second outer receiving surface vertical to the central axis, wherein the second outer receiving surface is farther from the central axis than the second axial connecting surface is from the central axis, and the first outer receiving surface and the second outer receiving surface are corresponding and connected to each other. When a thickness of the first annular optical element which is parallel to the central axis and corresponding to the first outer receiving surface is t1, and a thickness of the second annular optical element which is parallel to the central axis and corresponding to the second outer receiving surface is t2, the following condition is satisfied: 0.2<t1/t2<5.0.

According to another aspect of the present disclosure, an electronic device includes the imaging lens set according to the foregoing aspect.

BRIEF DESCRIPTION OF THE DRAWINGS

FIG. 6D is another exploded view of the annular optical element assembly of FIG. 6B;

DETAILED DESCRIPTION

1st Embodiment

Figure 1A:
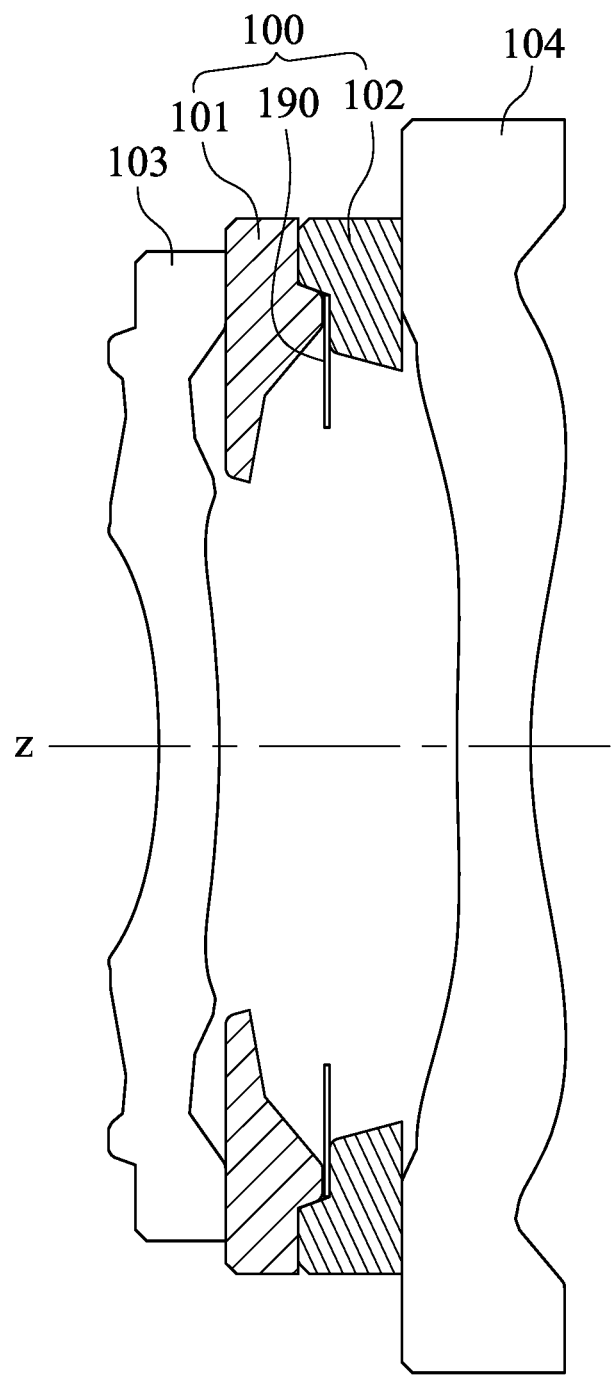
FIG. 1A is an assembling schematic view of an annular optical element assembly according to the 1st embodiment of the present disclosure and the lens elements.

FIG. 1A is an assembling schematic view of an annular optical element assembly 100 according to the 1st embodiment of the present disclosure, lens elements 103 and 104. In FIG. 1A, the annular optical element assembly 100, the lens elements 103 and 104 can be part of optical elements in the imaging lens set (not shown completely), wherein two side surfaces of the annular optical element assembly 100 are respectively abutted with the lens elements 103 and 104.

Figure 1B:
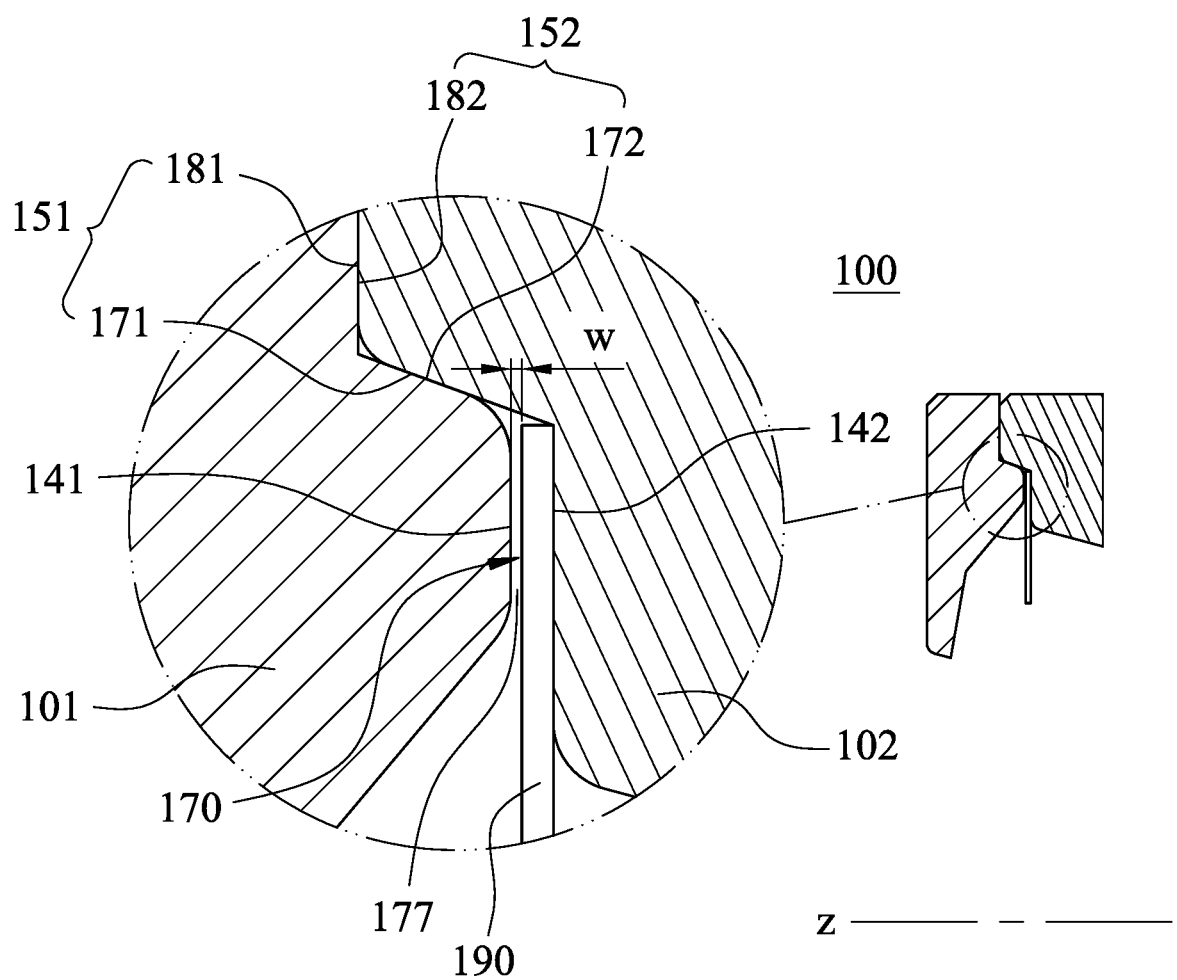
FIG. 1B is a schematic view of the annular optical element assembly according to the 1st embodiment.
Figure 1B:
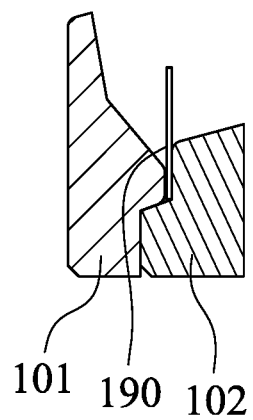
Figure 1C:
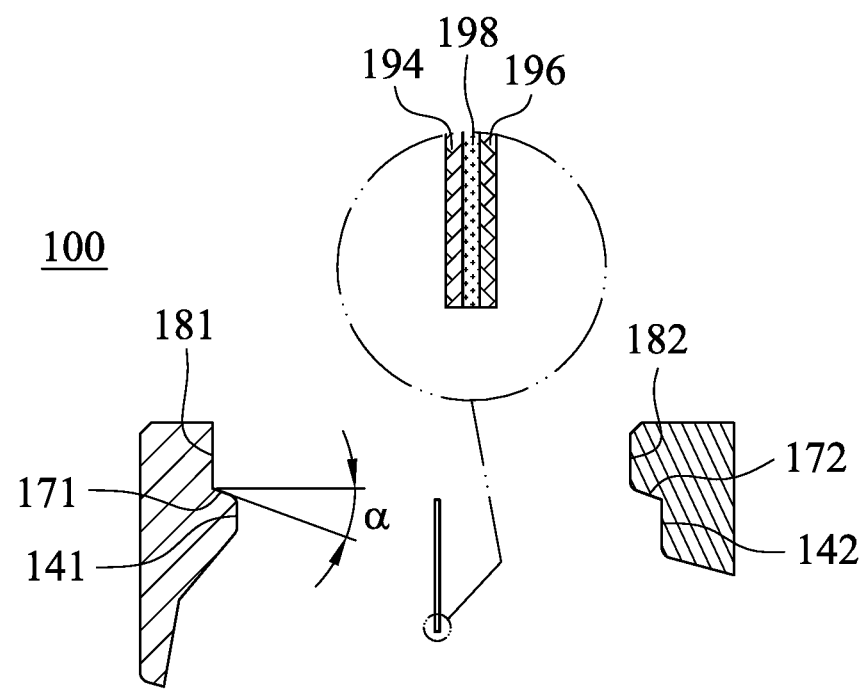
FIG. 1C is an exploded view of the annular optical element assembly of FIG. 1B.
Figure 1C:
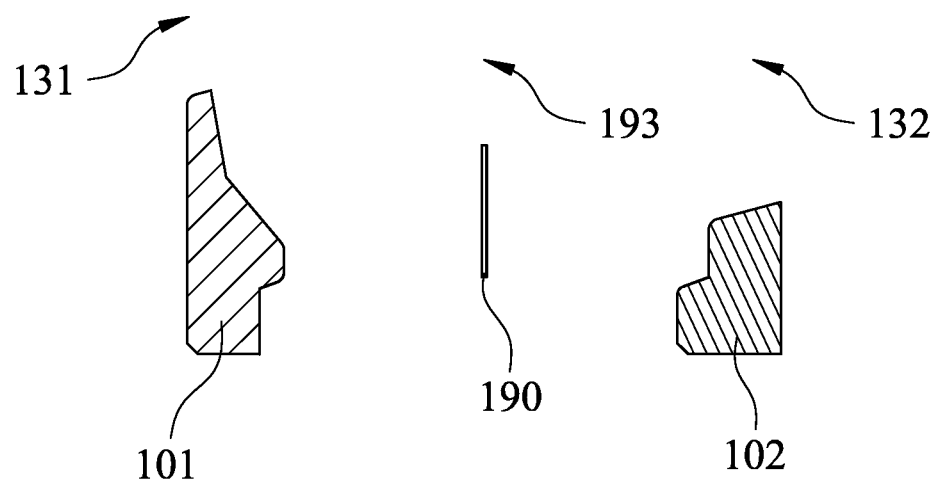

FIG. 1B is a schematic view of the annular optical element assembly 100 according to the 1st embodiment, and FIG. 1C is an exploded view of the annular optical element assembly 100 of FIG. 1B. In FIG. 1B and FIG. 1C, the annular optical element assembly 100 having a central axis z includes a first annular optical element 101 and a second annular optical element 102. In the 1st embodiment, optical elements of the annular optical element assembly 100 such as the first annular optical element 101 and the second annular optical element 102 are circularly annular and coaxial with respect to the central axis z, wherein all cross-sectional planes of the annular optical element assembly 100 which pass through the central axis z and have normal directions vertical to the central axis z are the same, shown as FIG. 1B. In other embodiments (not shown in drawings) according to the present disclosure, optical elements of the annular optical element assembly such as the first annular optical element and the second annular optical element may be non-circularly annular.

The first annular optical element 101 includes a first central opening 131 and a first axial connecting structure 151. The central axis z passes through the first central opening 131. The first axial connecting structure 151 surrounds the first central opening 131 and includes a first axial connecting surface 171. Furthermore, the first axial connecting structure 151 may be composed of the first axial connecting surface 171 and at least one other surface. The first axial connecting surface 171 may have a normal direction neither vertical nor parallel to the central axis z, and thus be a circular conical surface, an arc annular surface and so on.

The second annular optical element 102 includes a second central opening 132 and a second axial connecting structure 152. The central axis z passes through the second central opening 132. The second axial connecting structure 152 surrounds the second central opening 132 and includes a second axial connecting surface 172. Furthermore, the second axial connecting structure 152 may be composed of the second axial connecting surface 172 and at least one other surface. The second axial connecting surface 172 may have a normal direction neither vertical nor parallel to the central axis z, and thus be a circular conical surface, an arc annular surface and so on.

The first axial connecting surface 171 and the second axial connecting surface 172 are corresponding and connected to each other for aligning the first annular optical element 101 and the second annular optical element 102 with the central axis z. It can be said that the first axial connecting structure 151 at least including the first axial connecting surface 171 and the second axial connecting structure 152 at least including the second axial connecting surface 172 are for aligning the first annular optical element 101 and the second annular optical element 102 with the central axis z. In general, axial connecting structures including axial connecting surfaces respectively are for two individual optical elements (such as the first annular optical element 101 and the second annular optical element 102 in the 1st embodiment) to connect with each other and be aligned with the central axis, and it may be implemented by two axial connecting structures with axial connecting surfaces located in a circumferential direction of the central axis and corresponding to each other as the 1st embodiment, but not limited thereto. In the 1st embodiment, the first annular optical element 101 and the second annular optical element 102 are circularly annular, coaxial with respect to the central axis z, and aligned with the central axis z, and thereby the first central opening 131 and the second central opening 132 are corresponding to and aligned with each other.

Furthermore, the first annular optical element 101 can further include a first inner receiving surface 141 surrounding the first central opening 131. The first inner receiving surface 141 is closer to the central axis z than the first axial connecting surface 171 is to the central axis z, which can be said the first inner receiving surface 141 is closer to the central axis z than the first axial connecting structure 151 is to the central axis z. The first inner receiving surface 141 is vertical to the central axis z, that is, a normal direction of the first inner receiving surface 141 is parallel to the central axis z.

The second annular optical element 102 can further include a second inner receiving surface 142 surrounding the second central opening 132. The second inner receiving surface 142 is closer to the central axis z than the second axial connecting surface 172 is to the central axis z, which can be said the second inner receiving surface 142 is closer to the central axis z than the second axial connecting structure 152 is to the central axis z. The second inner receiving surface 142 is vertical to the central axis z, that is, a normal direction of the second inner receiving surface 142 is parallel to the central axis z.

The first inner receiving surface 141 and the second inner receiving surface 142 are corresponding and not connected to each other for defining a receiving space 170, that is, the receiving space 170 is formed between the first inner receiving surface 141 and the second inner receiving surface 142. Furthermore, the receiving space 170 may be an air gap space only, or may accommodate an optical element such as a light blocking sheet.

The annular optical element assembly 100 can further include a light blocking sheet 190, wherein an outer diameter of the light blocking sheet 190 is smaller than an outer diameter of the first annular optical element 101 and an outer diameter of the second annular optical element 102. In the 1st embodiment, the outer diameter of the light blocking sheet 190 is 41 mm, the outer diameter of the first annular optical element 101 is 48 mm, and the outer diameter of the second annular optical element 102 is 48 mm.

The light blocking sheet 190 is received in the receiving space 170 and limitedly disposed with respect to a position on the central axis z by the first annular optical element 101 and the second annular optical element 102. The light blocking sheet 190 includes a light blocking sheet opening 193, wherein the central axis z passes through the light blocking sheet opening 193. Therefore, the first annular optical element 101 and the second annular optical element 102, which are assembled with each other and aligned with the central axis z, can provide the receiving space 170 to accommodate the light blocking sheet 190, so that a light blocking position formed by the light blocking sheet 190 cannot be limited by the conventional stacking method for the lens elements. In addition, it is favorable for simultaneously achieving a proper structure design and satisfying molding conditions by adjusting a thickness proportion between the first annular optical element 101 with the first axial connecting structure 151 and the second annular optical element 102 with the second axial connecting structure 152, so that the light blocking sheet 190 assembled therebetween can be disposed with respect to the proper position on the central axis z.

Figure 1D:
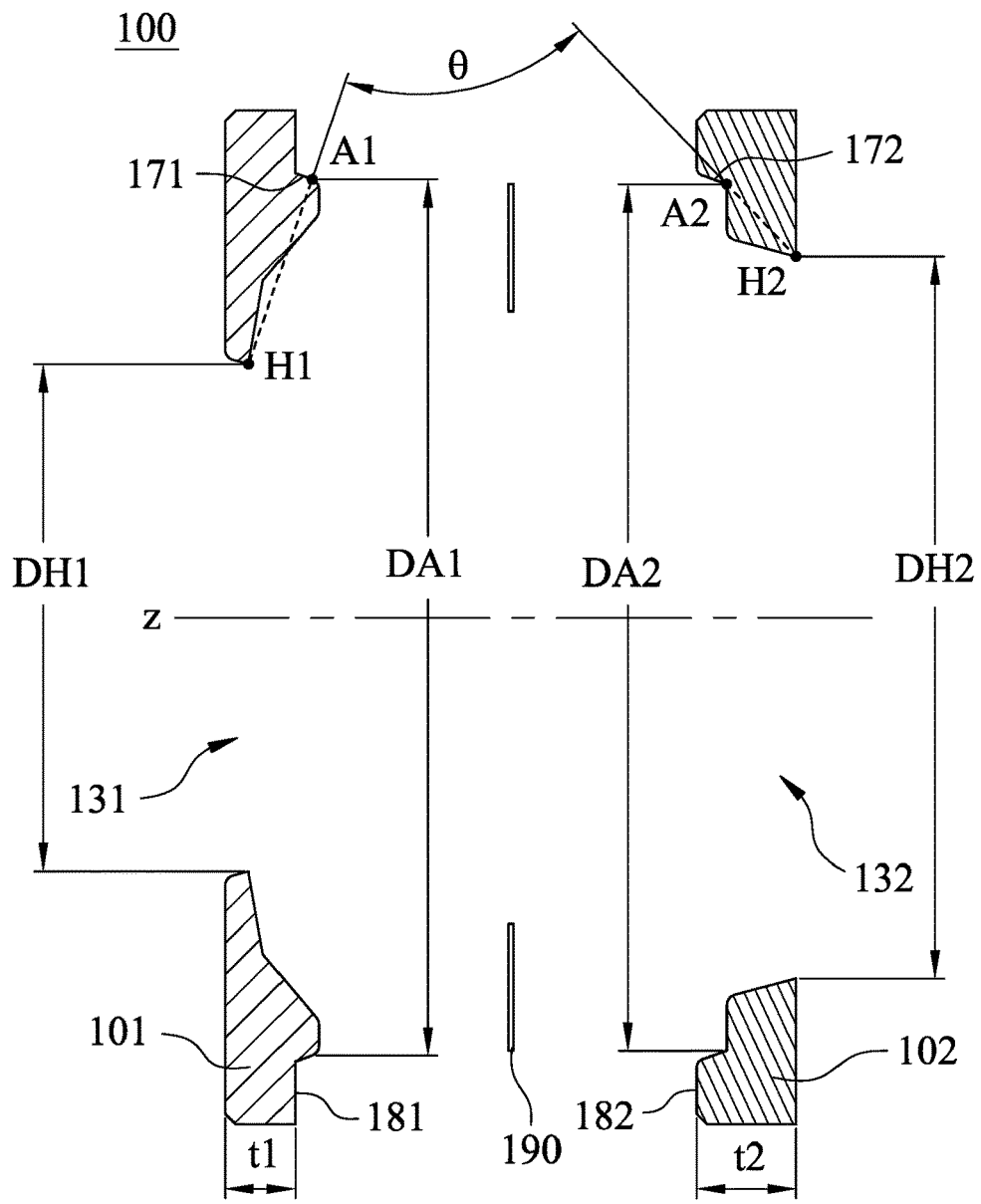
FIG. 1D is another exploded view of the annular optical element assembly of FIG. 1B.
Figure 1E:
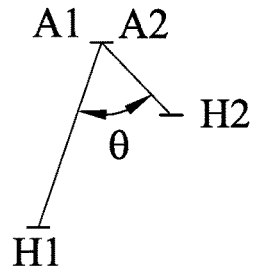
FIG. 1E is a schematic view of the parameter θ according to FIG. 1D.

FIG. 1D is another exploded view of the annular optical element assembly 100 of FIG. 1B, and FIG. 1E is a schematic view of the parameter θ according to FIG. 1D. In FIG. 1D and FIG. 1E, on the cross-sectional plane of the annular optical element assembly 100 which pass through the central axis z and has the normal direction vertical to the central axis z (i.e. FIG. 1B, wherein FIG. 1D is the another exploded view of FIG. 1B), diameters of the first axial connecting surface 171 are different along the central axis z, wherein a minimum diameter of the first axial connecting surface 171 is DA1, and a minimum diameter position corresponding to the minimum diameter DA1 of the first axial connecting surface 171 is A1. Diameters of the second axial connecting surface 172 are different along the central axis z, wherein a minimum diameter of the second axial connecting surface 172 is DA2, and a minimum diameter position corresponding to the minimum diameter DA2 of the second axial connecting surface 172 is A2. Diameters of the first central opening 131 are different along the central axis z, wherein a minimum diameter of the first central opening 131 is DH1, and a minimum diameter position corresponding to the minimum diameter DH1 of the first central opening 131 is H1. Diameters of the second central opening 132 are different along the central axis z, wherein a minimum diameter of the second central opening 132 is DH2, and a minimum diameter position corresponding to the minimum diameter DH2 of the second central opening 132 is H2. Furthermore, in order to interpret the characteristics of the present disclosure, the aforementioned minimum diameter positions A1, H1, A2 and H2 are located at the same side with respect to the central axis z on the cross-sectional plane.

On the cross-sectional plane of the annular optical element assembly 100 which pass through the central axis z and has the normal direction vertical to the central axis z, when the minimum diameter position of the first axial connecting surface 171 is A1, the minimum diameter position of the first central opening 131 is H1, the minimum diameter position of the second axial connecting surface 172 is A2, the minimum diameter position of the second central opening 132 is H2, and an angle between a line connecting A1 with H1 and a line connecting A2 with H2 is θ, the following condition can be satisfied: 5 degrees<θ<90 degrees. Furthermore, it may be not necessary that the angle θ is formed from the minimum diameter positions A1 and A2 being overlapped, or the minimum diameter positions H1 and H2 being overlapped. The angle θ may be formed between the line connecting A1 with H1 and the line connecting A2 with H2 being shifted or extended, wherein FIG. 1E is the schematic view of the angle θ formed between the line connecting A1 with H1 and the line connecting A2 with H2 being shifted. Therefore, a light trap structure with an inverted V-shaped groove formed between the first annular optical element 101 and the second annular optical element 102 assembled with each other is advantageous to reduce the stray light. Moreover, when the light blocking sheet 190 is omitted from the annular optical element assembly 100, the receiving space 170 can serve as the air gap space with a proper spacing width, wherein it is difficult to visually see the light trap structure resulted from little reflected light from the surfaces of the annular optical element assembly 100, so that the light trap structure with the inverted V-shaped groove can have a bottomless effect caused by the reflected light from the surfaces of the annular optical element assembly 100 being reduced. Preferably, the following condition can be satisfied: 18 degrees<θ<89 degrees. More preferably, the following condition can be satisfied: 28 degrees<θ<79 degrees. Accordingly, the angle θ of appropriate shrinkage is favorable for absorbing light by the light trap structure with the inverted V-shaped groove.

In FIG. 1B, each of the first annular optical element 101 and the second annular optical element 102 can be made of a black plastic material and made by an injection molding method. Therefore, it is favorable for raising the production speed of the annular optical element assembly 100, because the process of painting black material on metal surfaces in a manufacturing method of cutting metal can be saved in a manufacturing method of using a black material directly.

The receiving space 170 can include an air gap space 177, wherein the air gap space 177 is located between the light blocking sheet 190 and the first inner receiving surface 141 or between the light blocking sheet 190 and the second inner receiving surface 142. It can be said that the air gap space 177 is an air layer sandwiched, the light blocking sheet 190 is received by one of the first inner receiving surface 141 and the second inner receiving surface 142 at a moment, and the light blocking sheet 190 can be slightly shaken in the receiving space 170 instead of being simultaneously and closely abutted with the first inner receiving surface 141 and the second inner receiving surface 142. Therefore, the air gap space 177 is favorable for ensuring that the light blocking sheet 190 cannot be pressed by the first inner receiving surface 141 and the second inner receiving surface 142 so as to prevent the light blocking sheet 190 from being affected after assembling of the annular optical element assembly 100. In addition, the dimension of the light blocking sheet 190 may be adjusted, and the light blocking sheet 190 may extend from the receiving space 170 towards the central axis z based on an optical specification.

Furthermore, the air gap space 177 can be located between the first inner receiving surface 141 and the second inner receiving surface 142. Specifically, at least part space between the first inner receiving surface 141 and the second inner receiving surface 142 serves as the air gap space 177. Therefore, the air gap space 177 is favorable for reducing the reflection of the stray light.

When a width parallel to the central axis z of the air gap space 177 is w, the following condition can be satisfied: 0.001 mm<w<0.03 mm. Therefore, it is favorable for configuring the air gap space 177 as a proper spacing so as to enhance the effect of the light trap structure, and it is thereby difficult to visually see the reflected light from the surfaces of the first annular optical element 101, the second annular optical element 102 and the light blocking sheet 190.

In FIG. 1B and FIG. 1C, each of the first axial connecting surface 171 and the second axial connecting surface 172 can be a conical surface. That is, the conical surface is an annular conical surface with respect to the central axis z, and the conical surface is straightly inclined to the central axis z. When an angle between the first axial connecting surface 171 and the central axis z and an angle between the second axial connecting surface 172 and the central axis z are $\alpha$ and the same values, the following condition can be satisfied: 1 degrees<$\alpha$<38 degrees. Therefore, the parameter $\alpha$ with the proper value is favorable for better aligning the first annular optical element 101 and the second annular optical element 102 with the central axis z. Preferably, the following condition can be satisfied: 5 degrees<$\alpha$<25 degrees.

The first axial connecting surface 171 and the second axial connecting surface 172 can be for aligning the light blocking sheet opening 193 with the first central opening 131 and the second central opening 132, and the light blocking sheet 190 can be aligned with the first central opening 131 and the second central opening 132. Therefore, it is favorable for the light blocking sheet 190 not to be overly shaken. Comparing with other optical elements of the imaging lens set, such as the annular optical element assembly 100, the lens elements 103 and 104, a thickness of the light blocking sheet 190 is smaller than thicknesses of the other optical elements, and an alignment accuracy of the light blocking sheet 190 is slightly lower than alignment accuracies of the other optical elements. In spite of that, the connecting with high alignment accuracy between the first axial connecting surface 171 and the second axial connecting surface 172 still enables the light blocking sheet 190 to be limitedly disposed with respect to the specific position on the central axis z with the certain alignment accuracy by the first annular optical element 101 and the second annular optical element 102. Preferably, when the condition "5 degrees<$\alpha$<25 degrees" is satisfied, it is favorable for enhancing the alignment accuracy of the light blocking sheet 190. That is, the light blocking sheet 190 can be aligned with the central axis z, and the light blocking sheet opening 193 can be aligned with the first central opening 131 and the second central opening 132.

Figure 1F:
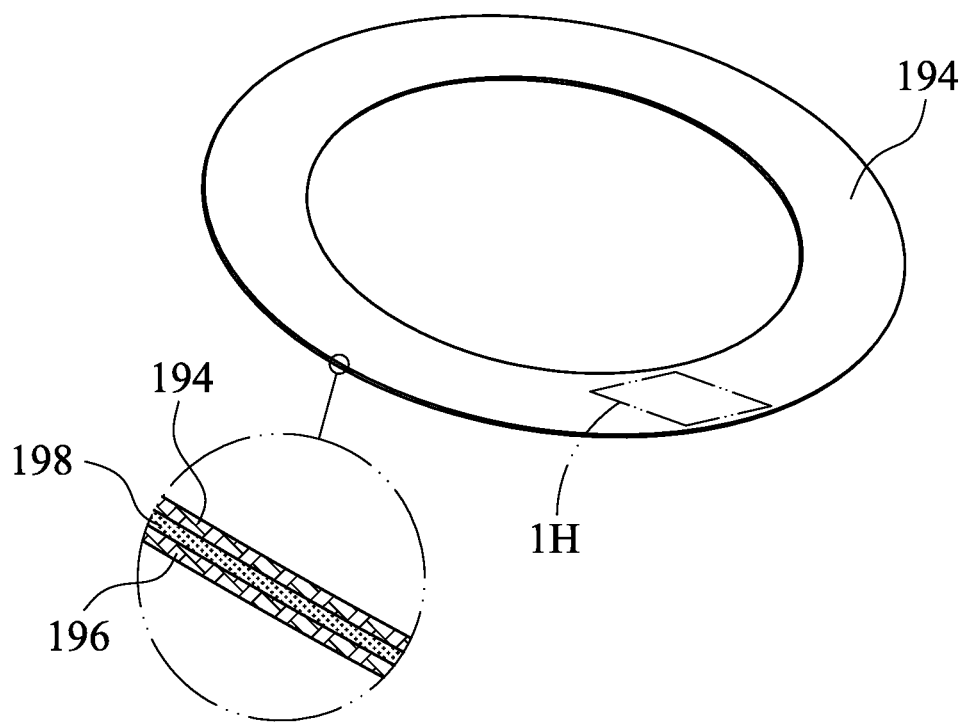
FIG. 1F is a three-dimensional view of the light blocking sheet according to the 1st embodiment.
Figure 1G:
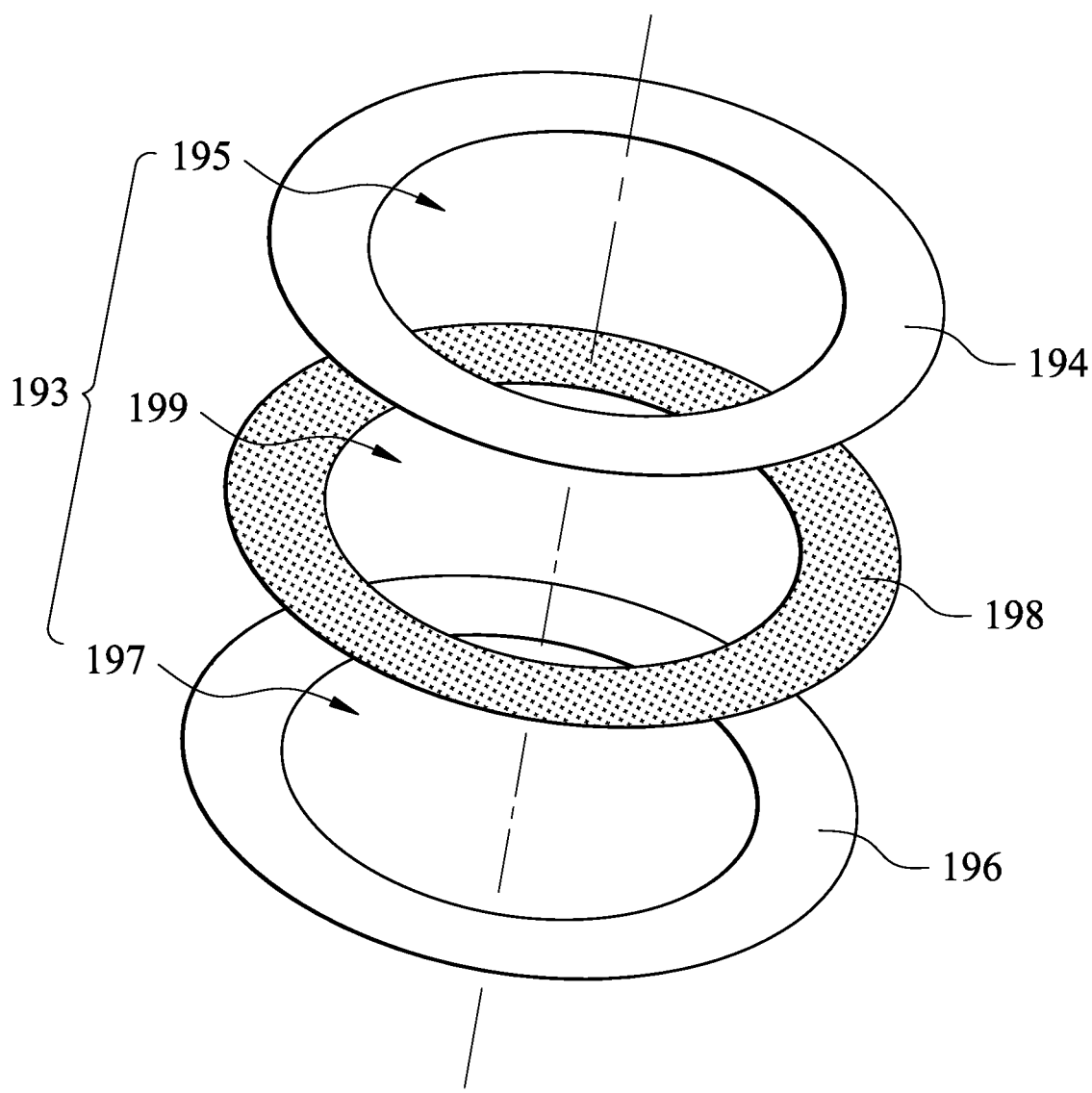
FIG. 1G is an exploded view of the light blocking sheet of FIG. 1F.
Figure 1H:
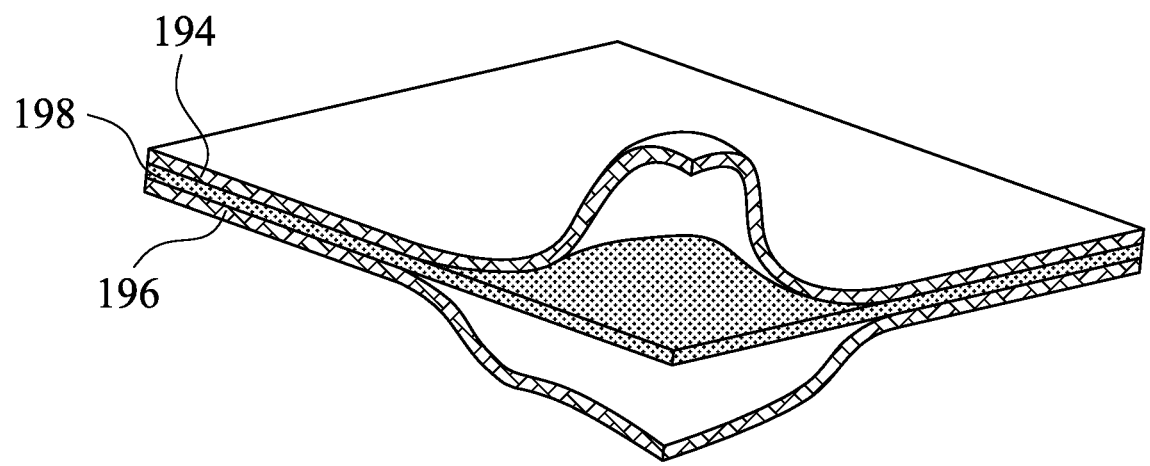
FIG. 1H is a separation schematic view of part 1H in FIG. 1F.

FIG. 1F is a three-dimensional view of the light blocking sheet 190 according to the 1st embodiment, FIG. 1G is an exploded view of the light blocking sheet 190 of FIG. 1F, and FIG. 1H is a separation schematic view of part 1H in FIG. 1F. In FIG. 1F to FIG. 1H, the light blocking sheet 190 can be a composite light blocking sheet and further include a first outer layer 194, a second outer layer 196 and an inner substrate layer 198, wherein the first outer layer 194 surrounds a first outer opening 195, the second outer layer 196 surrounds a second outer opening 197, the inner substrate layer 198 is disposed between the first outer layer 194 and the second outer layer 196, the inner substrate layer 198 connects the first outer layer 194 and the second outer layer 196 and surrounds a substrate opening 199, and the first outer opening 195, the substrate opening 199 and the second outer opening 197 are corresponding to each other and coaxial with respect to the central axis z, and form the light blocking sheet opening 193. Therefore, it is favorable for attenuating the stray light.

In FIG. 1H, it further shows the relationship among the first outer layer 194, the second outer layer 196 and the inner substrate layer 198, wherein the first outer layer 194 and the second outer layer 196 are torn by an external force and are distorted due to a non-uniform extension. However, under normal circumstance, the first outer layer 194 is tightly connected with the second outer layer 196 via the inner substrate layer 198 as shown in FIG. 1F. Thus, a composite material used for the light blocking sheet 190 can be provided by a tape type based on the manufacturing method, wherein the composite material can have a uniform thickness by controlling the manufacturing process of the inner substrate layer 198. Moreover, it is favorable to prevent the composite material from warping and to obtain a flat composite material being a thin film, which is favorable to maintain a thin thickness of the light blocking sheet 190.

The inner substrate layer 198 can be made of a plastic material, and each of the first outer layer 194 and the second outer layer 196 can be made of a black carbon-containing material, such as black carbon fibers. Therefore, it is favorable for satisfying the requirements of low reflection and light diminishing appearance of the light blocking sheet 190. Specifically, the plastic material can be black or transparent polycarbonate (PC), polyethylene terephthalate (PET), polymethylmethacrylate (PMMA) or a combination thereof.

In FIG. 1D, the line connecting A1 with H1 and the line connecting A2 with H2 can approach towards each other from being near the central axis z to being far from the central axis z, that is, the line connecting A1 with H1 and the line connecting A2 with H2 can have a trend of being close to each other from being near the central axis z to being far from the central axis z. Thus, the inverted V-shaped groove, which is a kind of the light trap structures, can be defined by the line connecting A1 with H1 and the line connecting A2 with H2. The light trap structure with the inverted V-shaped groove according to the present disclosure having the function of reducing reflected light can be shown from the results of computing the geometric relationship between the line connecting A1 with H1 and the line connecting A2 with H2, real shooting experiences and trying numerous assembling with various optical elements.

In FIG. 1B and FIG. 1D, the first axial connecting structure 151 can further include a first outer receiving surface 181 vertical to the central axis z, wherein the first outer receiving surface 181 is farther from the central axis z than the first axial connecting surface 171 is from the central axis z. The second axial connecting structure 152 can further include a second outer receiving surface 182 vertical to the central axis z, wherein the second outer receiving surface 182 is farther from the central axis z than the second axial connecting surface 172 is from the central axis z, and the first outer receiving surface 181 and the second outer receiving surface 182 are corresponding and connected to each other. A thickness of the first annular optical element 101 which is parallel to the central axis z and corresponding to the first outer receiving surface 181 is t1, and a thickness of the second annular optical element 102 which is parallel to the central axis z and corresponding to the second outer receiving surface 182 is t2.

The data of the aforementioned parameters of the annular optical element assembly 100 according to the 1st embodiment of the present disclosure are listed in the following Table 1, wherein the parameters are also shown as FIG. 1B to FIG. 1E.

TABLE 1

| 1st Embodiment | | | |
|---|---|---|---|
| DA1 (mm) | 4.15 | w (mm) | 0.008 |
| DA2 (mm) | 4.1 | α (deg.) | 20 |
| DH1 (mm) | 2.4 | t1 (mm) | 0.33 |
| DH2 (mm) | 3.42 | t2 (mm) | 0.47 |
| θ (deg.) | 63 | t1/t2 | 0.70 |

2nd Embodiment

Figure 2A:
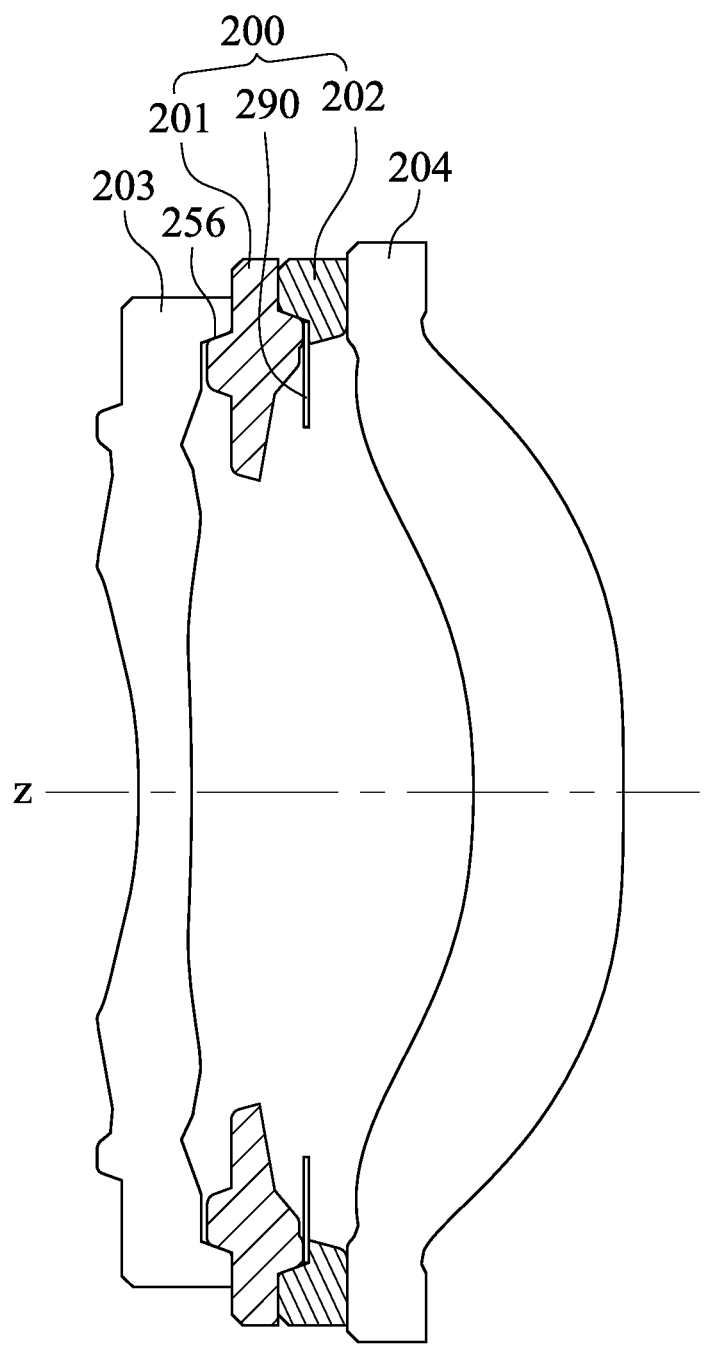
FIG. 2A is an assembling schematic view of an annular optical element assembly according to the 2nd embodiment of the present disclosure and the lens elements.

FIG. 2A is an assembling schematic view of an annular optical element assembly 200 according to the 2nd embodiment of the present disclosure, lens elements 203 and 204. In FIG. 2A, the annular optical element assembly 200, the lens elements 203 and 204 can be part of optical elements in the imaging lens set (not shown completely), wherein one side surface of the annular optical element assembly 200 is received with the lens element 203, and the other side surface of the annular optical element assembly 200 is abutted with the lens element 204.

Figure 2B:
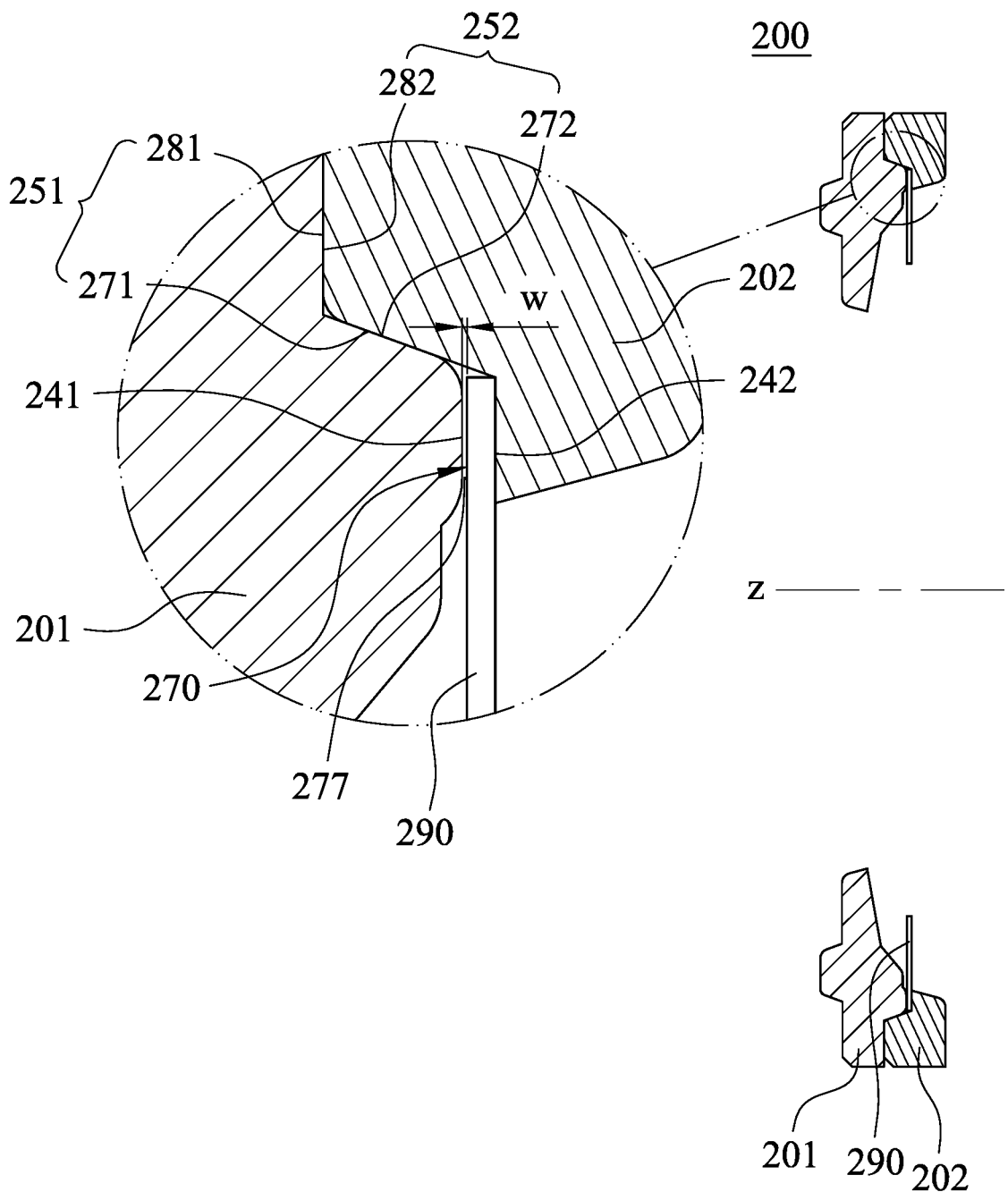
FIG. 2B is a schematic view of the annular optical element assembly according to the 2nd embodiment.
Figure 2C:
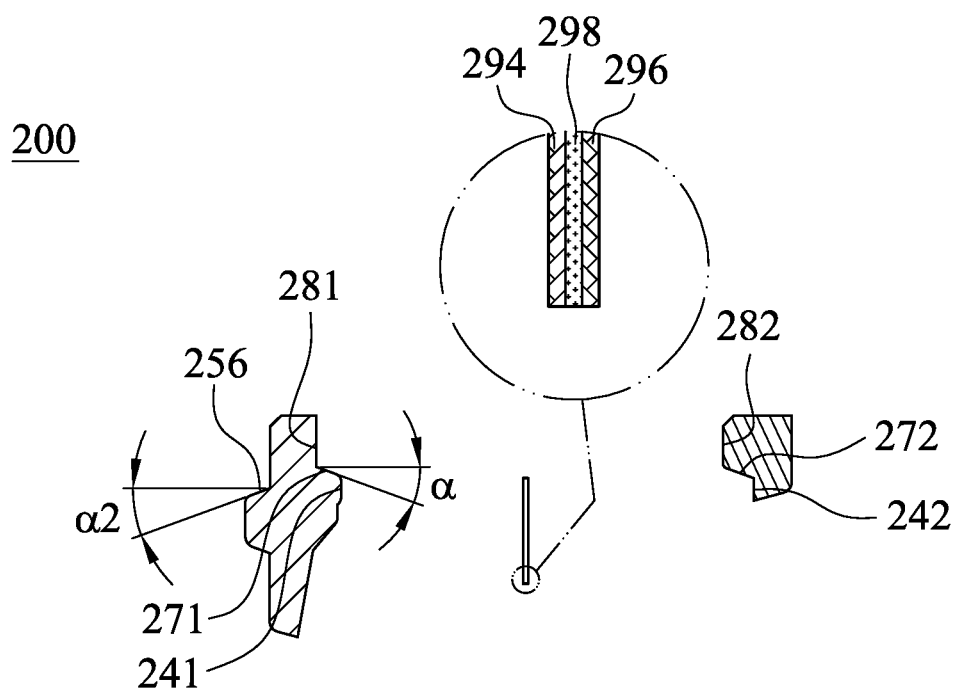
FIG. 2C is an exploded view of the annular optical element assembly of FIG. 2B.
Figure 2C:
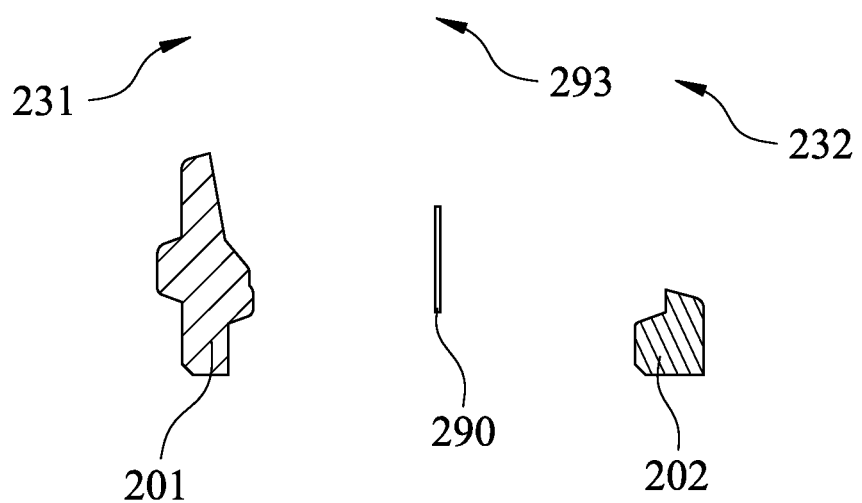

FIG. 2B is a schematic view of the annular optical element assembly 200 according to the 2nd embodiment, and FIG. 2C is an exploded view of the annular optical element assembly 200 of FIG. 2B. In FIG. 2B and FIG. 2C, the annular optical element assembly 200 having a central axis z includes a first annular optical element 201 and a second annular optical element 202. In the 2nd embodiment, optical elements of the annular optical element assembly 200 such as the first annular optical element 201 and the second annular optical element 202 are circularly annular and coaxial with respect to the central axis z, wherein all cross-sectional planes of the annular optical element assembly 200 which pass through the central axis z and have normal directions vertical to the central axis z are the same, shown as FIG. 2B.

The first annular optical element 201 includes a first central opening 231 and a first axial connecting structure 251. The central axis z passes through the first central opening 231. The first axial connecting structure 251 surrounds the first central opening 231 and includes a first axial connecting surface 271.

The second annular optical element 202 includes a second central opening 232 and a second axial connecting structure 252. The central axis z passes through the second central opening 232. The second axial connecting structure 252 surrounds the second central opening 232 and includes a second axial connecting surface 272.

The first axial connecting surface 271 and the second axial connecting surface 272 are corresponding and connected to each other for aligning the first annular optical element 201 and the second annular optical element 202 with the central axis z. In the 2nd embodiment, the first annular optical element 201 and the second annular optical element 202 are circularly annular, coaxial with respect to the central axis z, and aligned with the central axis z, and thereby the first central opening 231 and the second central opening 232 are corresponding to and aligned with each other.

Furthermore, the first annular optical element 201 further includes a first inner receiving surface 241 surrounding the first central opening 231. The first inner receiving surface 241 is closer to the central axis z than the first axial connecting surface 271 is to the central axis z. The first inner receiving surface 241 is vertical to the central axis z.

The second annular optical element 202 further includes a second inner receiving surface 242 surrounding the second central opening 232. The second inner receiving surface 242 is closer to the central axis z than the second axial connecting surface 272 is to the central axis z. The second inner receiving surface 242 is vertical to the central axis z.

The first inner receiving surface 241 and the second inner receiving surface 242 are corresponding and not connected to each other for defining a receiving space 270, that is, the receiving space 270 is formed between the first inner receiving surface 241 and the second inner receiving surface 242.

The annular optical element assembly 200 further includes a light blocking sheet 290, wherein an outer diameter of the light blocking sheet 290 is smaller than an outer diameter of the first annular optical element 201 and an outer diameter of the second annular optical element 202.

The light blocking sheet 290 is received in the receiving space 270 and limitedly disposed with respect to a position on the central axis z by the first annular optical element 201 and the second annular optical element 202. The light blocking sheet 290 includes a light blocking sheet opening 293, wherein the central axis z passes through the light blocking sheet opening 293.

In detail, each of the first annular optical element 201 and the second annular optical element 202 is made of a black plastic material and made by an injection molding method.

The receiving space 270 includes an air gap space 277, wherein the air gap space 277 is located between the light blocking sheet 290 and the first inner receiving surface 241 or between the light blocking sheet 290 and the second inner receiving surface 242. It can be said that the air gap space 277 is an air layer sandwiched, and specifically at least part space between the first inner receiving surface 241 and the second inner receiving surface 242 serves as the air gap space 277.

Each of the first axial connecting surface 271 and the second axial connecting surface 272 is a conical surface. An angle between the first axial connecting surface 271 and the central axis z and an angle between the second axial connecting surface 272 and the central axis z are α and the same values. The first axial connecting surface 271 and the second axial connecting surface 272 are for aligning the light blocking sheet opening 293 with the first central opening 231 and the second central opening 232.

The light blocking sheet 290 is a composite light blocking sheet and further includes a first outer layer 294, a second outer layer 296 and an inner substrate layer 298, wherein the first outer layer 294 surrounds a first outer opening, the second outer layer 296 surrounds a second outer opening, the inner substrate layer 298 is disposed between the first outer layer 294 and the second outer layer 296, and the inner substrate layer 298 connects the first outer layer 294 and the second outer layer 296 and surrounds a substrate opening. The first outer opening, the substrate opening and the second outer opening are corresponding to each other and coaxial with respect to the central axis z, and form the light blocking sheet opening 293, wherein the first outer opening, the second outer opening and the substrate opening in the 2nd embodiment may refer to the first outer opening 195, the second outer opening 197 and the substrate opening 199 of the light blocking sheet 190 shown as FIG. 1G in the 1st embodiment, and their reference numerals are omitted herein. Furthermore, the inner substrate layer 298 is made of a plastic material, and each of the first outer layer 294 and the second outer layer 296 is made of a black carbon-containing material.

Figure 2D:
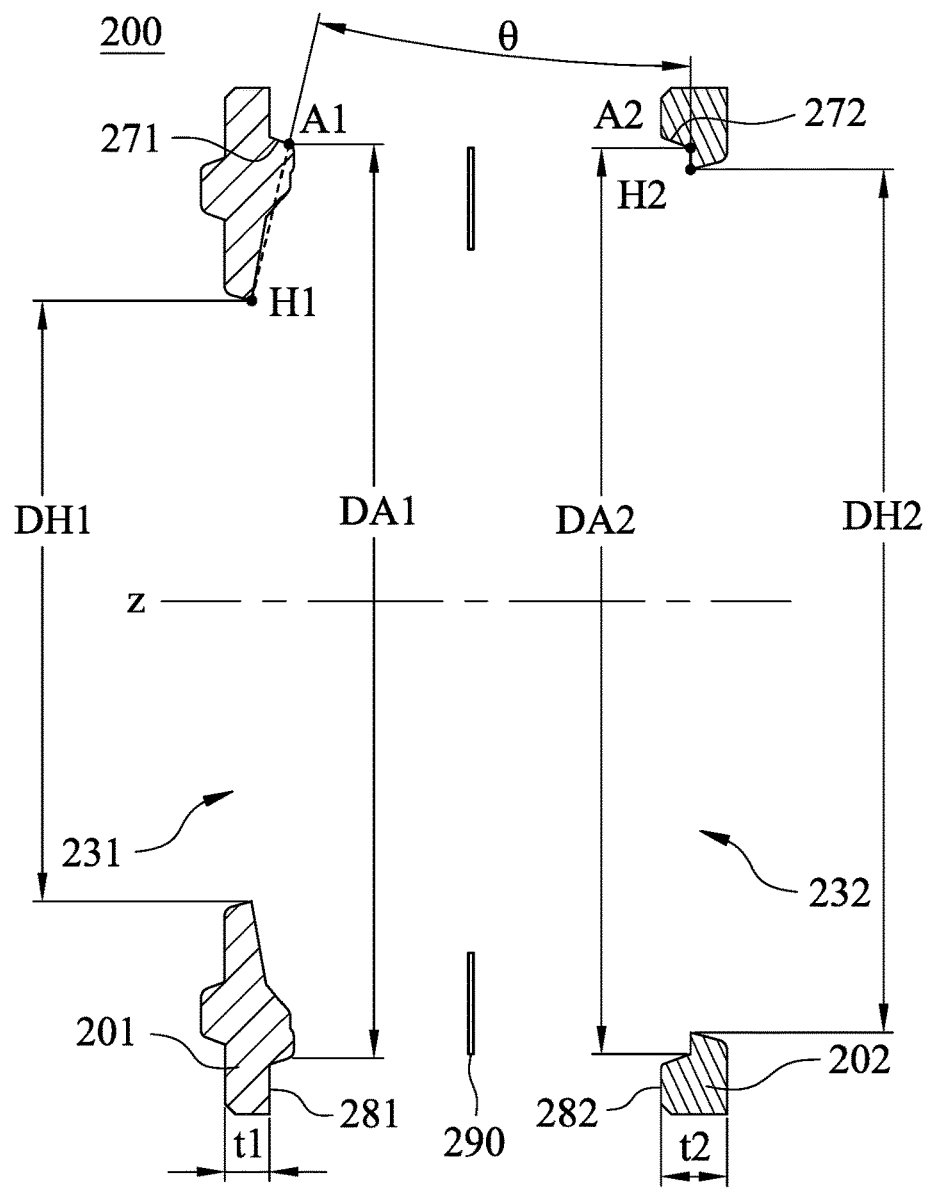
FIG. 2D is another exploded view of the annular optical element assembly of FIG. 2B.
Figure 2E:
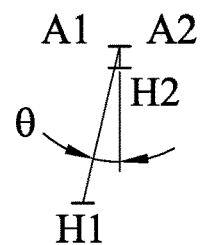
FIG. 2E is a schematic view of the parameter θ according to FIG. 2D.

FIG. 2D is another exploded view of the annular optical element assembly 200 of FIG. 2B, and FIG. 2E is a schematic view of the parameter θ according to FIG. 2D. In FIG. 2D and FIG. 2E, the definitions of parameters DA1, DA2, DH1 and DH2and minimum diameter positions A1, A2, H1 and H2 of the annular optical element assembly 200 in the 2nd embodiment are the same as those of the annular optical element assembly 100 in the 1st embodiment. In the 2nd embodiment, the line connecting A1 with H1 and the line connecting A2 with H2 approach towards each other from being near the central axis z to being far from the central axis z.

In FIG. 2B and FIG. 2C, the first axial connecting structure 251 further includes a first outer receiving surface 281 vertical to the central axis z, wherein the first outer receiving surface 281 is farther from the central axis z than the first axial connecting surface 271 is from the central axis z. The second axial connecting structure 252 further includes a second outer receiving surface 282 vertical to the central axis z, wherein the second outer receiving surface 282 is farther from the central axis z than the second axial connecting surface 272 is from the central axis z, and the first outer receiving surface 281 and the second outer receiving surface 282 are corresponding and connected to each other.

In FIG. 2A and FIG. 2C, the first annular optical element 201 further includes an element axial connecting surface 256, which is a conical surface. The element axial connecting surface 256 is located on a side surface of the first annular optical element 201 which is not received with the second annular optical element 202, and the element axial connecting surface 256 is for aligning the annular optical element assembly 200 and the lens element 203 with the central axis z (i.e. an optical axis of the imaging lens set), wherein an angle between the element axial connecting surface 256 and the central axis z is α2. The data of the parameters DA1, DA2, DH1, DH2, θ, w, α, α2, t1, t2 and t1/t2 of the annular optical element assembly 200 according to the 2nd embodiment of the present disclosure are listed in the following Table 2, wherein the parameters are also shown as FIG. 2B to FIG. 2E. The definitions of these parameters shown in Table 2 are the same as those stated in the annular optical element assembly 100 of the 1st embodiment with corresponding values for the annular optical element assembly 200.

TABLE 2

| 2nd Embodiment | | | |
|---|---|---|---|
| DA1 (mm) | 4.32 | α (deg.) | 20 |
| DA2 (mm) | 4.28 | α2 (deg.) | 20 |
| DH1 (mm) | 2.83 | t1 (mm) | 0.21 |
| DH2 (mm) | 4.08 | t2 (mm) | 0.31 |
| θ (deg.) | 13 | t1/t2 | 0.68 |
| w (mm) | 0.004 | | |

3rd Embodiment

Figure 3A:
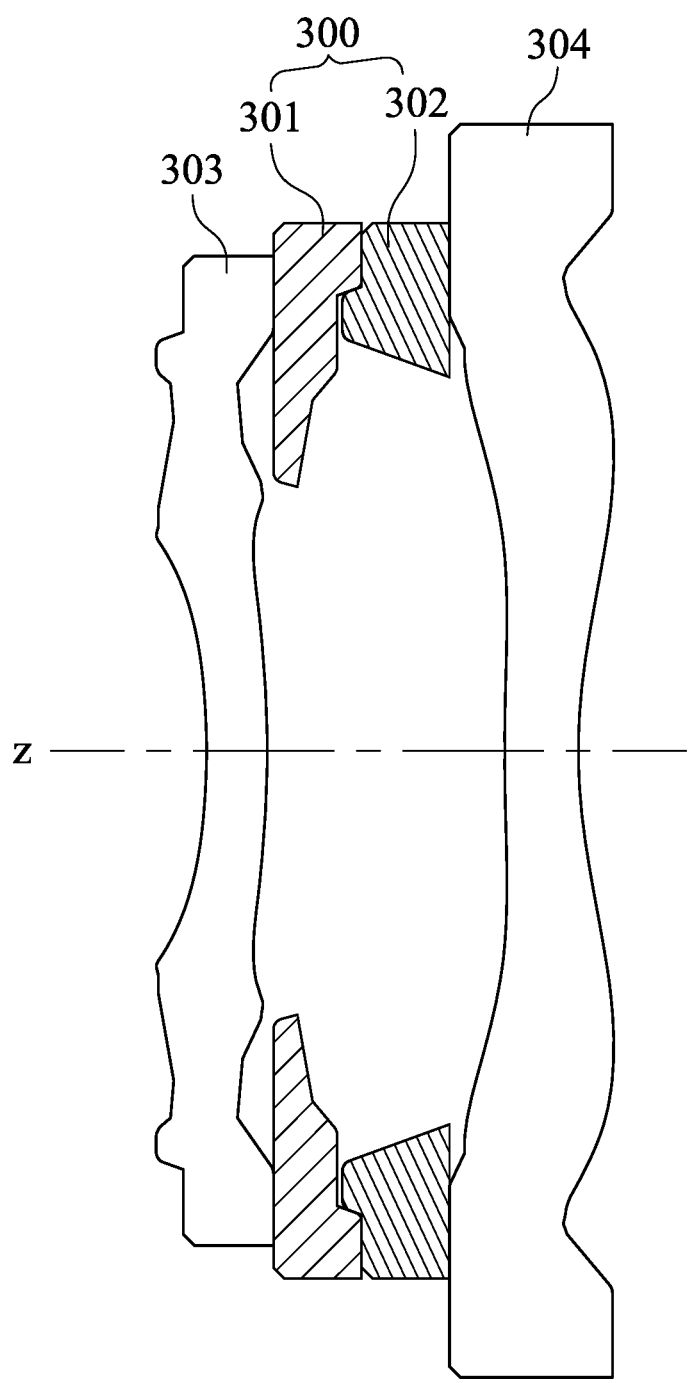
FIG. 3A is an assembling schematic view of an annular optical element assembly according to the 3rd embodiment of the present disclosure and the lens elements.

FIG. 3A is an assembling schematic view of an annular optical element assembly 300 according to the 3rd embodiment of the present disclosure, lens elements 303 and 304. In FIG. 3A, the annular optical element assembly 300, the lens elements 303 and 304 can be part of optical elements in the imaging lens set (not shown completely), wherein two side surfaces of the annular optical element assembly 300 are respectively abutted with the lens elements 303 and 304.

Figure 3B:
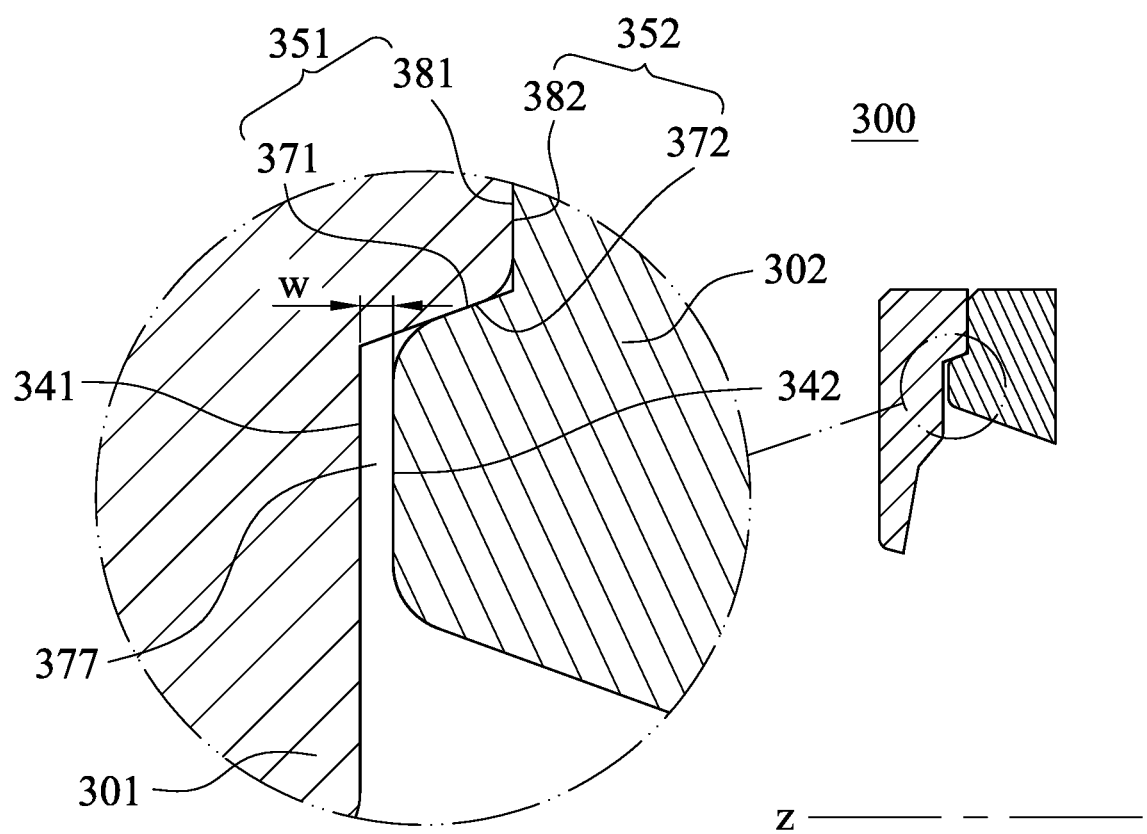
FIG. 3B is a schematic view of the annular optical element assembly according to the 3rd embodiment.
Figure 3B:
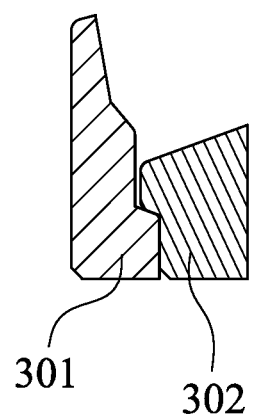
Figure 3C:
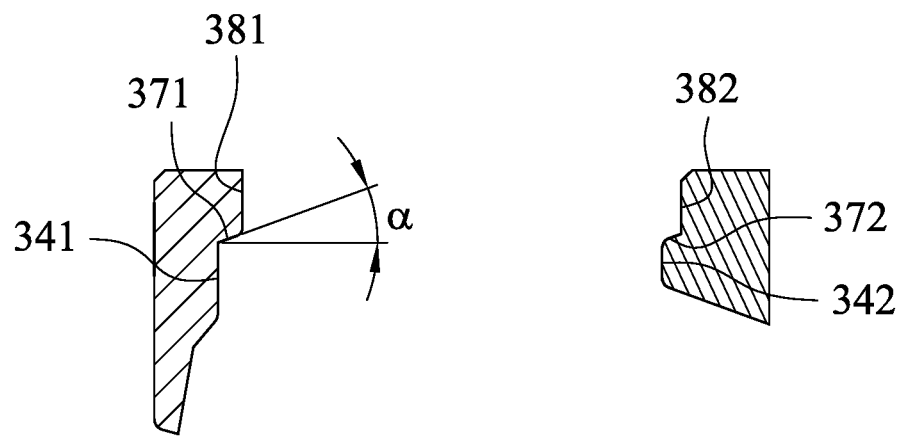
FIG. 3C is an exploded view of the annular optical element assembly of FIG. 3B.
Figure 3C:
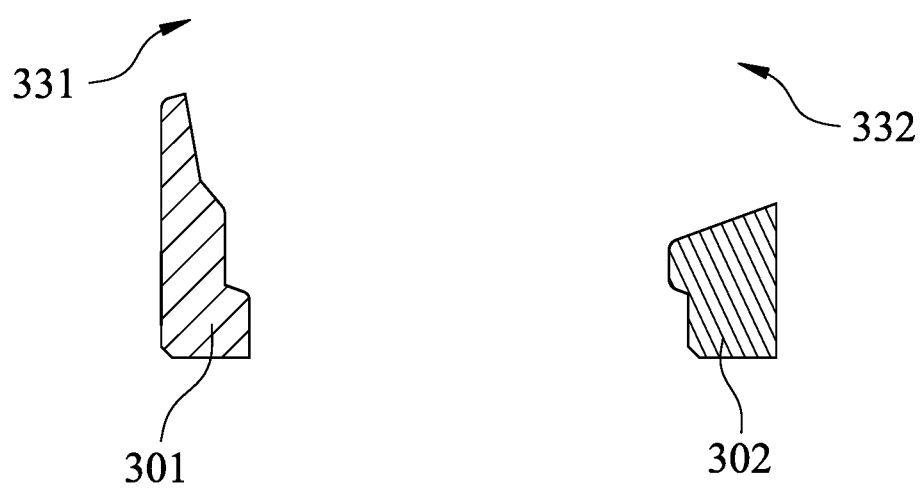

FIG. 3B is a schematic view of the annular optical element assembly 300 according to the 3rd embodiment, and FIG. 3C is an exploded view of the annular optical element assembly 300 of FIG. 3B. In FIG. 3B and FIG. 3C, the annular optical element assembly 300 having a central axis z includes a first annular optical element 301 and a second annular optical element 302. In the 3rd embodiment, the first annular optical element 301 and the second annular optical element 302 of the annular optical element assembly 300 are circularly annular and coaxial with respect to the central axis z, wherein all cross-sectional planes of the annular optical element assembly 300 which pass through the central axis z and have normal directions vertical to the central axis z are the same, shown as FIG. 3B.

The first annular optical element 301 includes a first central opening 331 and a first axial connecting structure 351. The central axis z passes through the first central opening 331. The first axial connecting structure 351 surrounds the first central opening 331 and includes a first axial connecting surface 371.

The second annular optical element 302 includes a second central opening 332 and a second axial connecting structure 352. The central axis z passes through the second central opening 332. The second axial connecting structure 352 surrounds the second central opening 332 and includes a second axial connecting surface 372.

The first axial connecting surface 371 and the second axial connecting surface 372 are corresponding and connected to each other for aligning the first annular optical element 301 and the second annular optical element 302 with the central axis z. It can be said that the first axial connecting structure 351 at least including the first axial connecting surface 371 and the second axial connecting structure 352 at least including the second axial connecting surface 372 are for aligning the first annular optical element 301 and the second annular optical element 302 with the central axis z. In the 3rd embodiment, the first annular optical element 301 and the second annular optical element 302 are circularly annular, coaxial with respect to the central axis z, and aligned with the central axis z, and thereby the first central opening 331 and the second central opening 332 are corresponding to and aligned with each other.

Figure 3D:
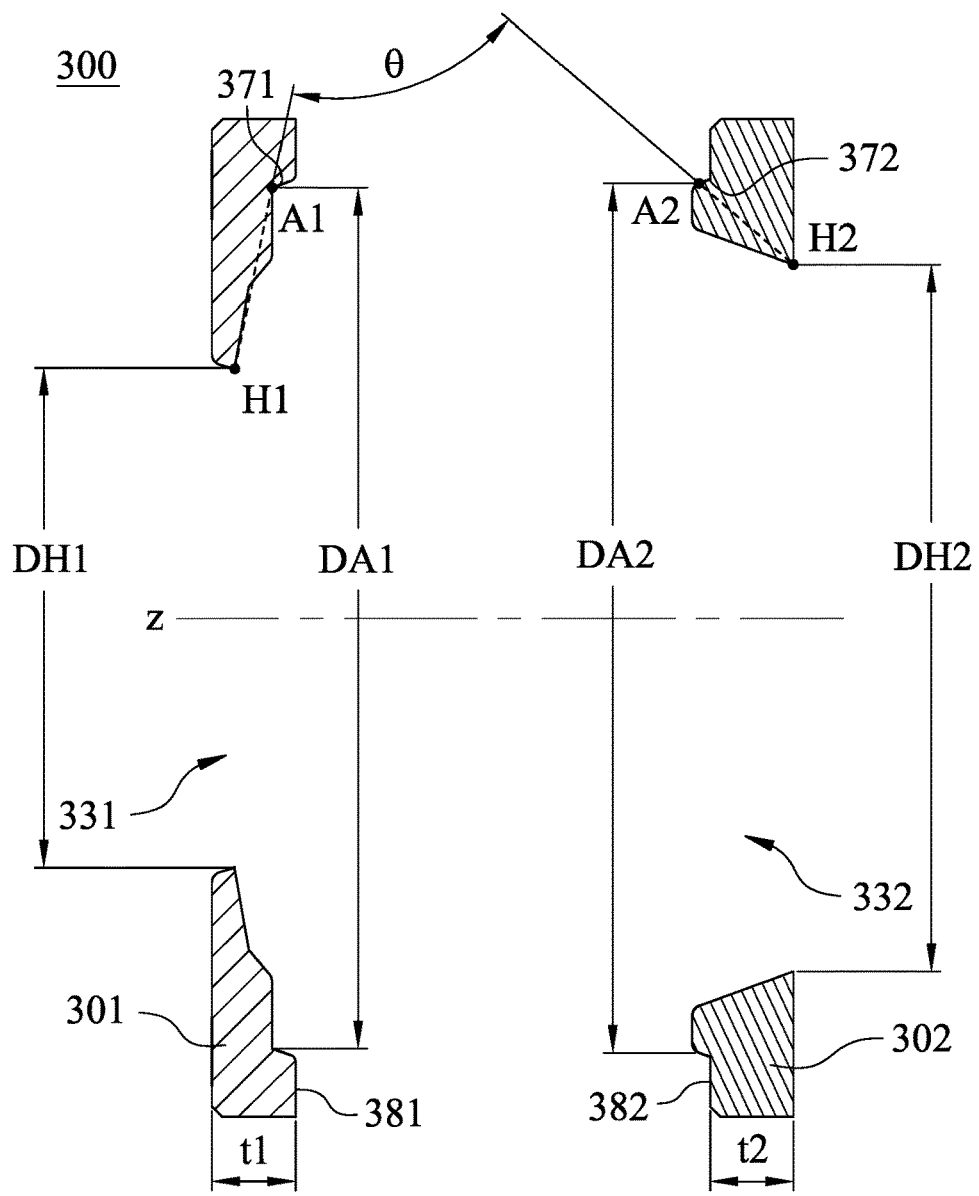
FIG. 3D is another exploded view of the annular optical element assembly of FIG. 3B.
Figure 3E:
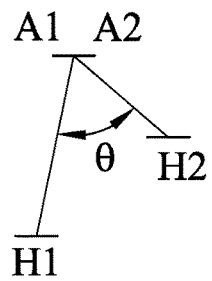
FIG. 3E is a schematic view of the parameter θ according to FIG. 3D.

FIG. 3D is another exploded view of the annular optical element assembly 300 of FIG. 3B, and FIG. 3E is a schematic view of the parameter θ according to FIG. 3D. In FIG. 3D and FIG. 3E, on the cross-sectional plane of the annular optical element assembly 300 which pass through the central axis z and has the normal direction vertical to the central axis z (i.e. FIG. 3B, wherein FIG. 3D is the another exploded view of FIG. 3B), when a minimum diameter position of the first axial connecting surface 371 is A1, a minimum diameter position of the first central opening 331 is H1, a minimum diameter position of the second axial connecting surface 372 is A2, a minimum diameter position of the second central opening 332 is H2, and an angle between a line connecting A1 with H1 and a line connecting A2 with H2 is θ, the following condition is satisfied: 5 degrees<θ<90 degrees. Therefore, a light trap structure with an inverted V-shaped groove formed between the first annular optical element 301 and the second annular optical element 302 assembled with each other allows saving the usage of a light blocking sheet. Specifically, an air gap space 377 with a proper spacing width is located between the first annular optical element 301 and the second annular optical element 302. It is difficult to visually see the light trap structure resulted from little reflected light from the surfaces of the annular optical element assembly 300, so that the light trap structure with the inverted V-shaped groove can have a bottomless effect caused by the reflected light from the surfaces of the annular optical element assembly 300 being reduced. Preferably, the following condition can be satisfied: 18 degrees<θ<89 degrees. More preferably, the following condition can be satisfied: 28 degrees<θ<79 degrees. Accordingly, the angle θ of appropriate shrinkage is favorable for absorbing light by the light trap structure with the inverted V-shaped groove.

In detail, in FIG. 3B and FIG. 3C, each of the first axial connecting surface 371 and the second axial connecting surface 372 can be a conical surface. That is, the conical surface is an annular conical surface with respect to the central axis z, and the conical surface is straightly inclined to the central axis z. When an angle between the first axial connecting surface 371 and the central axis z and an angle between the second axial connecting surface 372 and the central axis z are α and the same values, the following condition can be satisfied: 1 degrees<α<38 degrees. Therefore, the parameter α with the proper value is favorable for better aligning the first annular optical element 301 and the second annular optical element 302 with the central axis z. Preferably, the following condition can be satisfied: 5 degrees<α<25 degrees.

In FIG. 3D, the line connecting A1 with H1 and the line connecting A2 with H2 can approach towards each other from being near the central axis z to being far from the central axis z, that is, the line connecting A1 with H1 and the line connecting A2 with H2 can have a trend of being close to each other from being near the central axis z to being far from the central axis z. Thus, the inverted V-shaped groove, which is a kind of the light trap structures, can be defined by the line connecting A1 with H1 and the line connecting A2 with H2. The light trap structure with the inverted V-shaped groove according to the present disclosure having the function of reducing reflected light can be shown from the results of computing the geometric relationship between the line connecting A1 with H1 and the line connecting A2 with H2, real shooting experiences and trying numerous assembling with various optical elements.

In FIG. 3B and FIG. 3C, the first annular optical element 301 can further include a first inner receiving surface 341 surrounding the first central opening 331. The first inner receiving surface 341 is closer to the central axis z than the first axial connecting surface 371 is to the central axis z. The first inner receiving surface 341 is vertical to the central axis z. The second annular optical element 302 can further include a second inner receiving surface 342 surrounding the second central opening 332. The second inner receiving surface 342 is closer to the central axis z than the second axial connecting surface 372 is to the central axis z. The second inner receiving surface 342 is vertical to the central axis z. The first inner receiving surface 341 and the second inner receiving surface 342 are corresponding and not connected to each other. Therefore, the annular optical element assembly 300 is favorable for saving the usage of the light blocking sheet and thereby reducing the cost via the first inner receiving surface 341 and the second inner receiving surface 342, which provide a further improved structural configuration.

The air gap space 377, being an air layer sandwiched, can be located between the first inner receiving surface 341 and the second inner receiving surface 342. Specifically, the first inner receiving surface 341 and the second inner receiving surface 342 define the air gap space 377, that is, the air gap space 377 is formed between the first inner receiving surface 341 and the second inner receiving surface 342. When a width parallel to the central axis z of the air gap space 377 is w, the following condition can be satisfied: 0.001 mm<w<0.03 mm. Therefore, the air gap space 377 is favorable for reducing the stray light reflection. The air gap space 377 is a small space extended from the narrowest portion of the inverted V-shaped groove, which is beneficial to provide the light trap structure with the inverted V-shaped groove being deeper so as to absorb the reflected light from the optical elements more easily.

In addition, each of the first annular optical element 301 and the second annular optical element 302 is made of a black plastic material and made by an injection molding method.

The first axial connecting structure 351 can further include a first outer receiving surface 381 vertical to the central axis z, wherein the first outer receiving surface 381 is farther from the central axis z than the first axial connecting surface 371 is from the central axis z. The second axial connecting structure 352 can further include a second outer receiving surface 382 vertical to the central axis z, wherein the second outer receiving surface 382 is farther from the central axis z than the second axial connecting surface 372 is from the central axis z, and the first outer receiving surface 381 and the second outer receiving surface 382 are corresponding and connected to each other.

The data of the parameters DA1, DA2, DH1, DH2, θ, w, α, t1, t2 and t1/t2 of the annular optical element assembly 300 according to the 3rd embodiment of the present disclosure are listed in the following Table 3, wherein the parameters are also shown as FIG. 3B to FIG. 3E. The definitions of these parameters shown in Table 3 are the same as those stated in the annular optical element assembly 100 of the 1st embodiment with corresponding values for the annular optical element assembly 300.

TABLE 3

| 3rd Embodiment | | | |
|---|---|---|---|
| DA1 (mm) | 4.14 | w (mm) | 0.024 |
| DA2 (mm) | 4.18 | α (deg.) | 20 |
| DH1 (mm) | 2.41 | t1 (mm) | 0.4 |
| DH2 (mm) | 3.4 | t2 (mm) | 0.4 |
| θ (deg.) | 61 | t1/t2 | 1.00 |

4th Embodiment

Figure 4A:
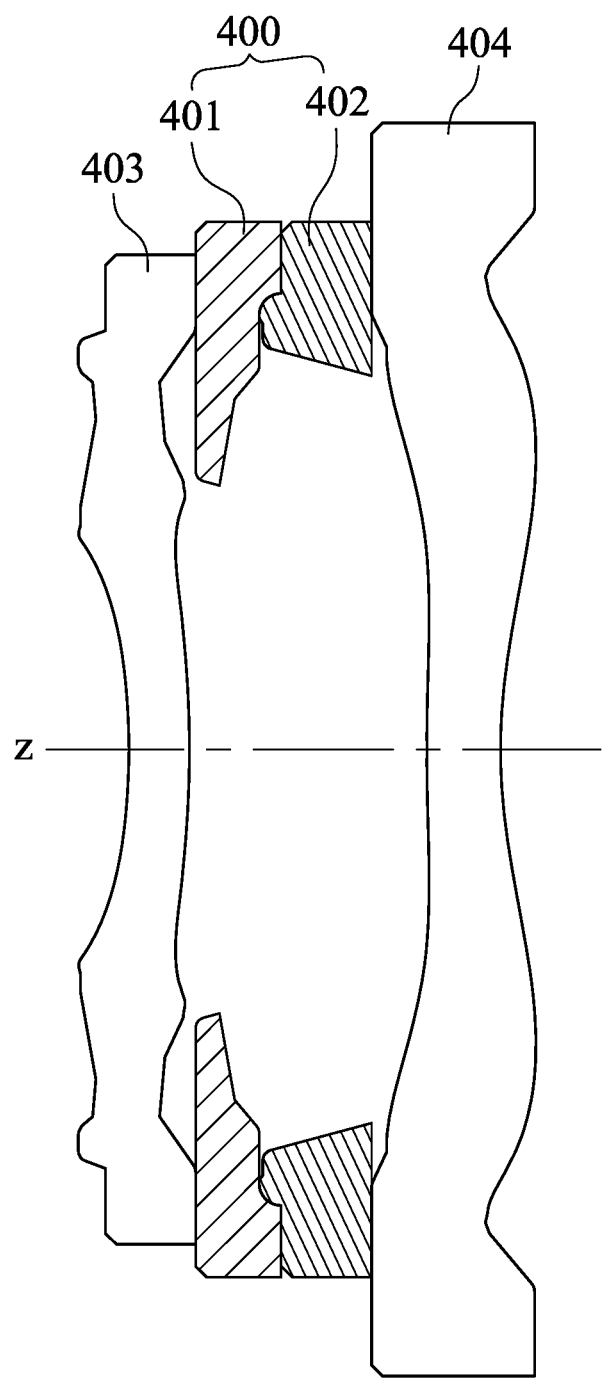
FIG. 4A is an assembling schematic view of an annular optical element assembly according to the 4th embodiment of the present disclosure and the lens elements.

FIG. 4A is an assembling schematic view of an annular optical element assembly 400 according to the 4th embodiment of the present disclosure, lens elements 403 and 404. In FIG. 4A, the annular optical element assembly 400, the lens elements 403 and 404 can be part of optical elements in the imaging lens set (not shown completely), wherein two side surfaces of the annular optical element assembly 400 are respectively abutted with the lens elements 403 and 404.

Figure 4B:
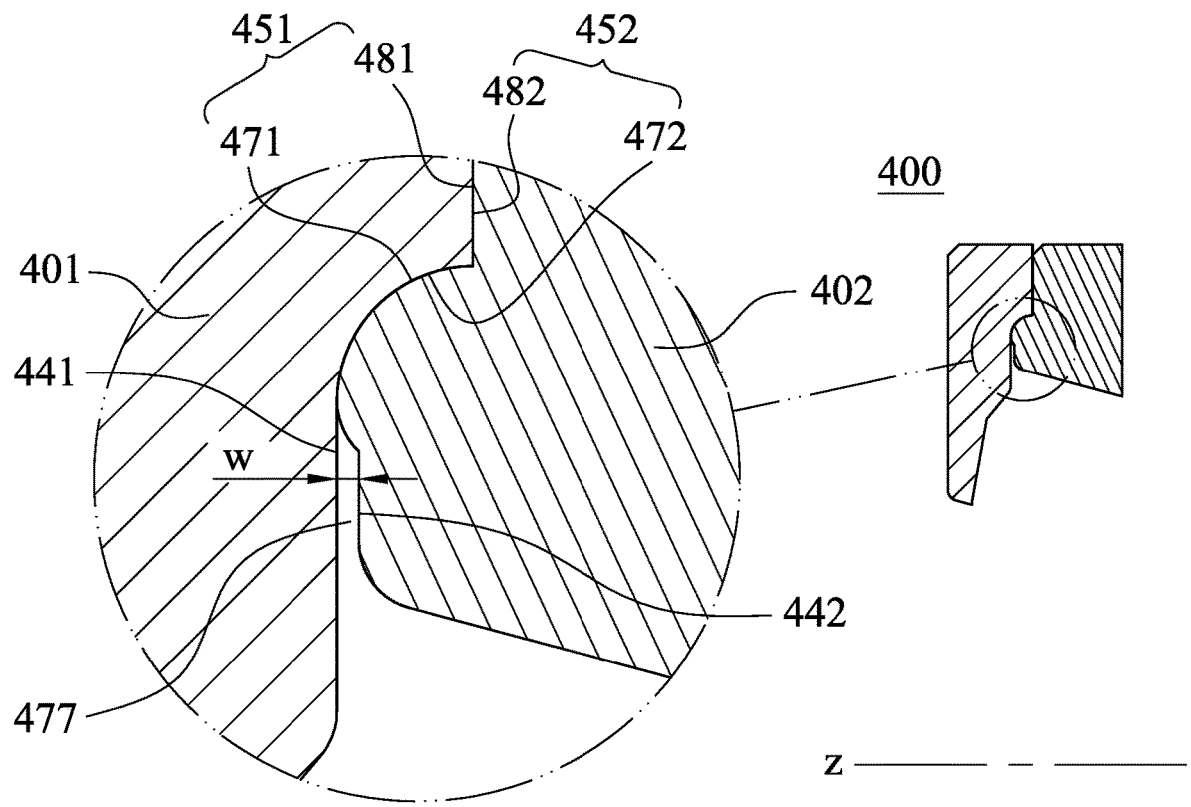
FIG. 4B is a schematic view of the annular optical element assembly according to the 4th embodiment.
Figure 4B:
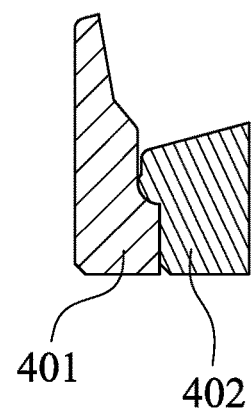
Figure 4C:
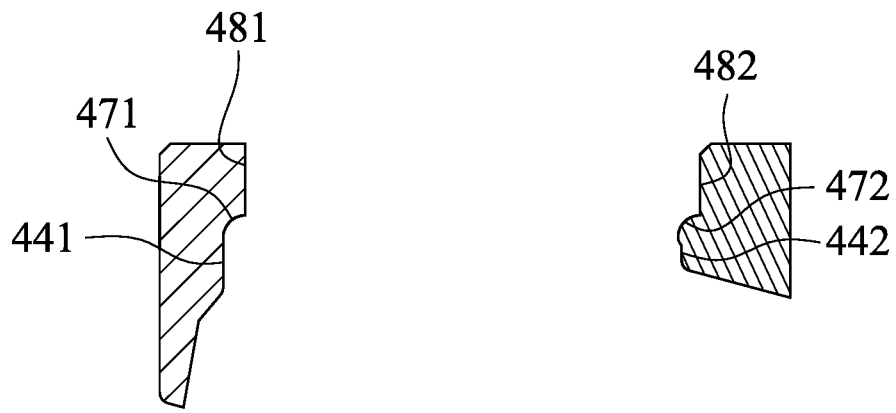
FIG. 4C is an exploded view of the annular optical element assembly of FIG. 4B.
Figure 4C:
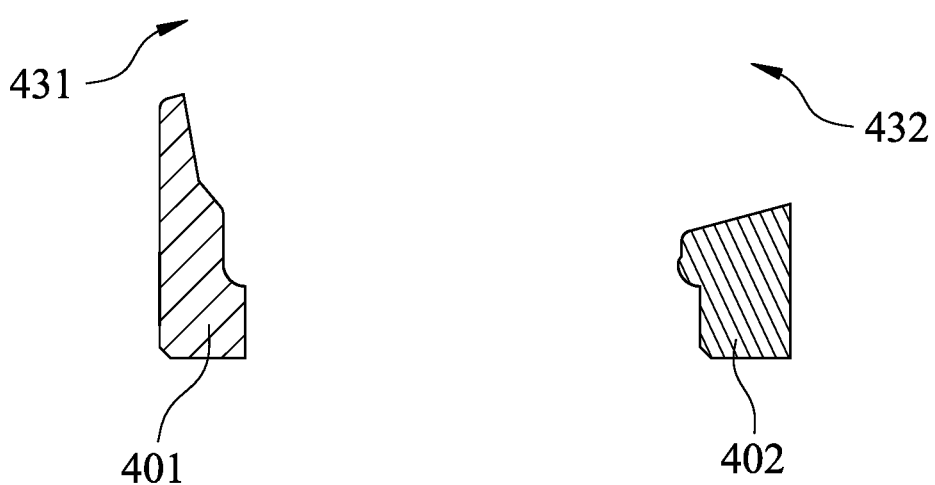

FIG. 4B is a schematic view of the annular optical element assembly 400 according to the 4th embodiment, and FIG. 4C is an exploded view of the annular optical element assembly 400 of FIG. 4B. In FIG. 4B and FIG. 4C, the annular optical element assembly 400 having a central axis z includes a first annular optical element 401 and a second annular optical element 402. In the 4th embodiment, the first annular optical element 401 and the second annular optical element 402 of the annular optical element assembly 400 are circularly annular and coaxial with respect to the central axis z, wherein all cross-sectional planes of the annular optical element assembly 400 which pass through the central axis z and have normal directions vertical to the central axis z are the same, shown as FIG. 4B.

The first annular optical element 401 includes a first central opening 431 and a first axial connecting structure 451. The central axis z passes through the first central opening 431. The first axial connecting structure 451 surrounds the first central opening 431 and includes a first axial connecting surface 471.

The second annular optical element 402 includes a second central opening 432 and a second axial connecting structure 452. The central axis z passes through the second central opening 432. The second axial connecting structure 452 surrounds the second central opening 432 and includes a second axial connecting surface 472.

The first axial connecting surface 471 and the second axial connecting surface 472 are corresponding and connected to each other for aligning the first annular optical element 401 and the second annular optical element 402 with the central axis z. In the 4th embodiment, the first annular optical element 401 and the second annular optical element 402 are circularly annular, coaxial with respect to the central axis z, and aligned with the central axis z, and thereby the first central opening 431 and the second central opening 432 are corresponding to and aligned with each other.

Figure 4D:
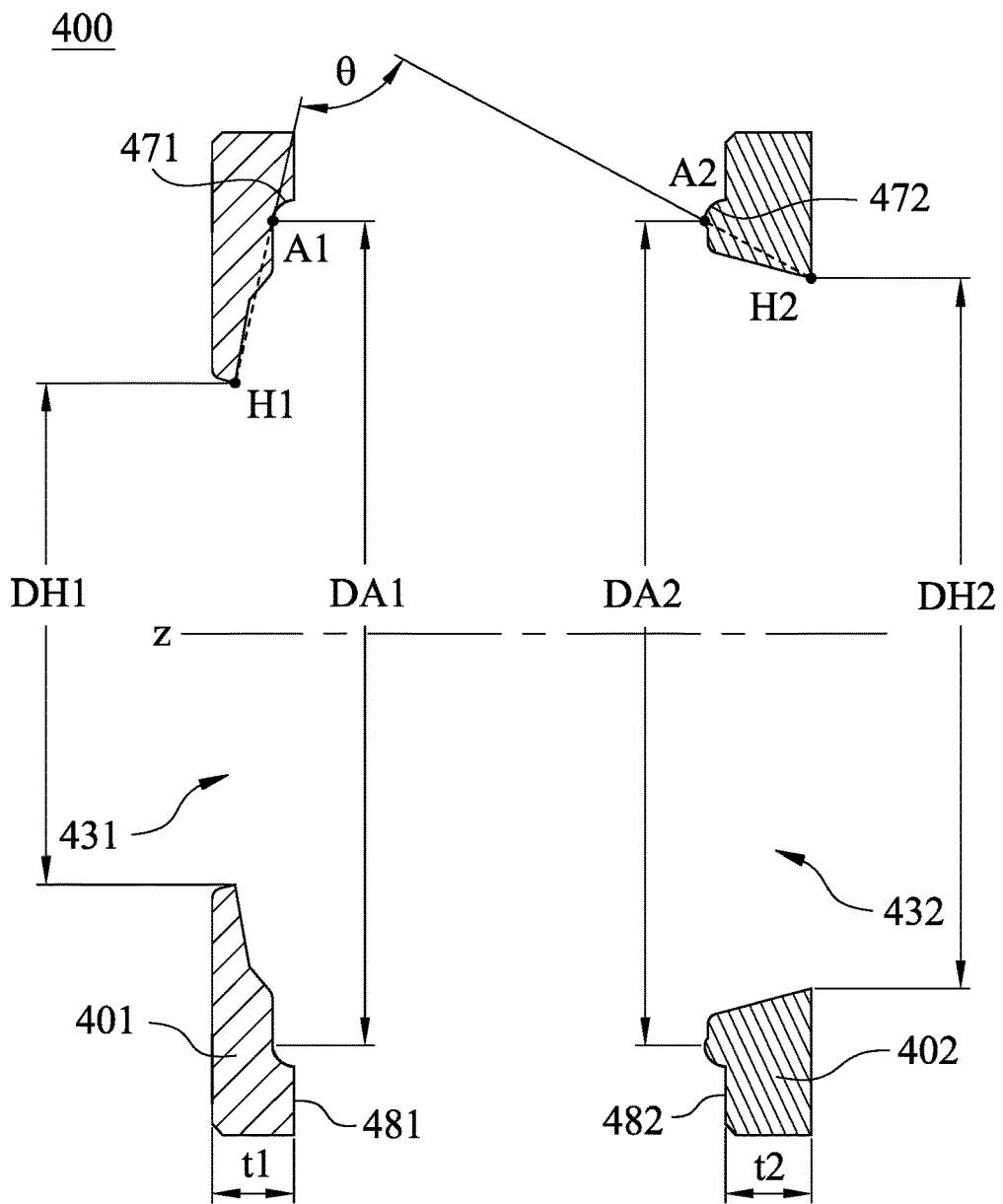
FIG. 4D is another exploded view of the annular optical element assembly of FIG. 4B.
Figure 4E:
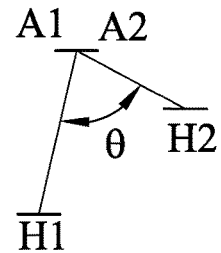
FIG. 4E is a schematic view of the parameter θ according to FIG. 4D.

FIG. 4D is another exploded view of the annular optical element assembly 400 of FIG. 4B, and FIG. 4E is a schematic view of the parameter θ according to FIG. 4D. In FIG. 4D and FIG. 4E, the definitions of parameters DA1, DA2, DH1 and DH2 and minimum diameter positions A1, A2, H1 and H2 of the annular optical element assembly 400 in the 4th embodiment are the same as those of the annular optical element assembly 100 in the 1st embodiment.

In the 4th embodiment, the line connecting A1 with H1 and the line connecting A2 with H2 approach towards each other from being near the central axis z to being far from the central axis z.

In FIG. 4B and FIG. 4C, the first annular optical element 401 further includes a first inner receiving surface 441 surrounding the first central opening 431. The first inner receiving surface 441 is closer to the central axis z than the first axial connecting surface 471 is to the central axis z. The first inner receiving surface 441 is vertical to the central axis z. The second annular optical element 402 further includes a second inner receiving surface 442 surrounding the second central opening 432. The second inner receiving surface 442 is closer to the central axis z than the second axial connecting surface 472 is to the central axis z. The second inner receiving surface 442 is vertical to the central axis z. The first inner receiving surface 441 and the second inner receiving surface 442 are corresponding and not connected to each other.

An air gap space 477, being an air layer sandwiched, is located between the first inner receiving surface 441 and the second inner receiving surface 442. Specifically, the first inner receiving surface 441 and the second inner receiving surface 442 define the air gap space 477, that is, the air gap space 477 is formed between the first inner receiving surface 441 and the second inner receiving surface 442.

In addition, each of the first annular optical element 401 and the second annular optical element 402 is made of a black plastic material and made by an injection molding method. Each of the first axial connecting surface 471 and the second axial connecting surface 472 is an arc annular surface.

The first axial connecting structure 451 further includes a first outer receiving surface 481 vertical to the central axis z, wherein the first outer receiving surface 481 is farther from the central axis z than the first axial connecting surface 471 is from the central axis z. The second axial connecting structure 452 further includes a second outer receiving surface 482 vertical to the central axis z, wherein the second outer receiving surface 482 is farther from the central axis z than the second axial connecting surface 472 is from the central axis z, and the first outer receiving surface 481 and the second outer receiving surface 482 are corresponding and connected to each other.

The data of the parameters DA1, DA2, DH1, DH2, θ, w, t1, t2 and t1/t2 of the annular optical element assembly 400 according to the 4th embodiment of the present disclosure are listed in the following Table 4, wherein the parameters are also shown as FIG. 4B to FIG. 4E. The definitions of these parameters shown in Table 4 are the same as those stated in the annular optical element assembly 100 of the 1st embodiment with corresponding values for the annular optical element assembly 400.

TABLE 4

| 4th Embodiment | | | |
|---|---|---|---|
| DA1 (mm) | 3.95 | w (mm) | 0.016 |
| DA2 (mm) | 3.95 | t1 (mm) | 0.39 |
| DH1 (mm) | 2.4 | t2 (mm) | 0.41 |
| DH2 (mm) | 3.4 | t1/t2 | 0.95 |
| θ (deg.) | 75 | | |

5th Embodiment

Figure 5A:
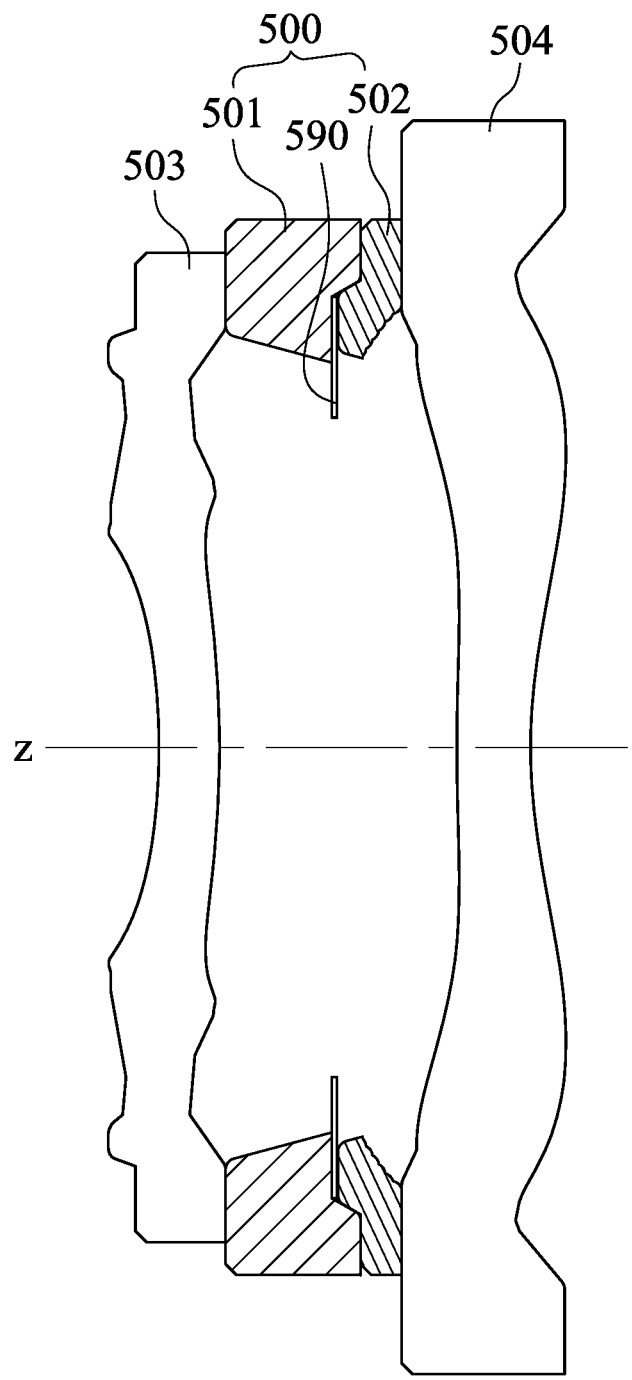
FIG. 5A is an assembling schematic view of an annular optical element assembly according to the 5th embodiment of the present disclosure and the lens elements.

FIG. 5A is an assembling schematic view of an annular optical element assembly 500 according to the 5th embodiment of the present disclosure, lens elements 503 and 504. In FIG. 5A, the annular optical element assembly 500, the lens elements 503 and 504 can be part of optical elements in the imaging lens set (not shown completely), wherein two side surfaces of the annular optical element assembly 500 are respectively abutted with the lens elements 503 and 504.

Figure 5B:
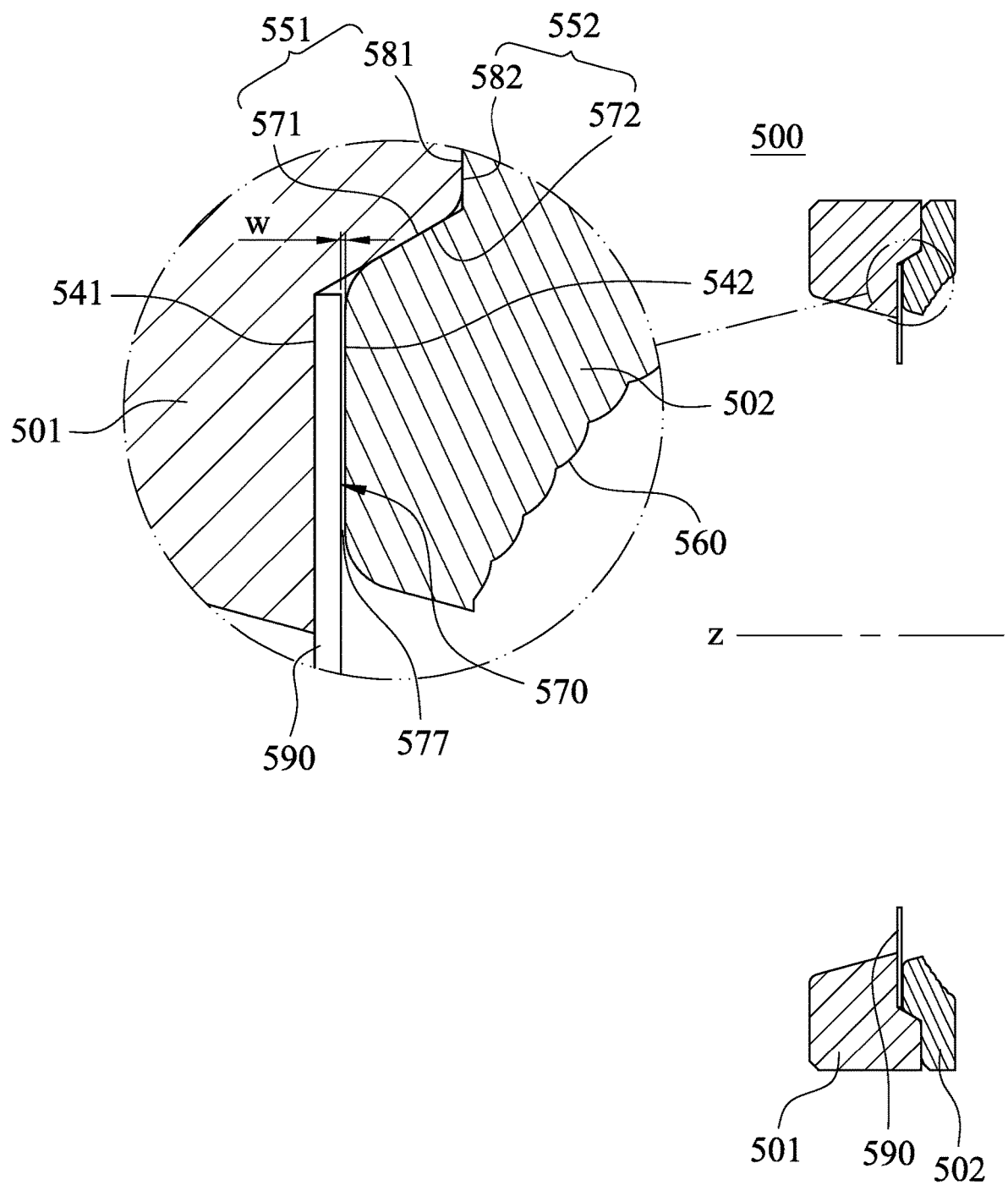
FIG. 5B is a schematic view of the annular optical element assembly according to the 5th embodiment.
Figure 5C:
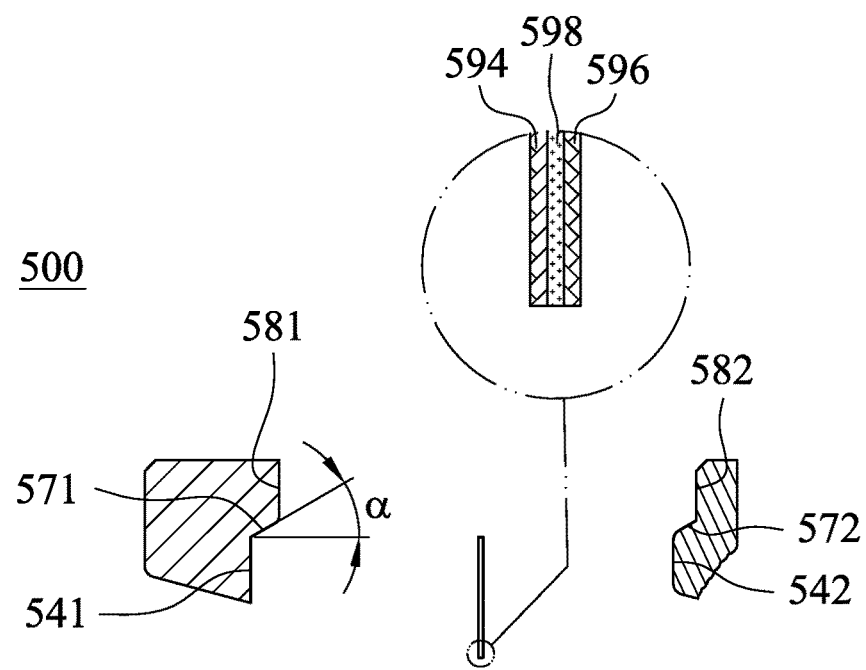
FIG. 5C is an exploded view of the annular optical element assembly of FIG. 5B.
Figure 5C:
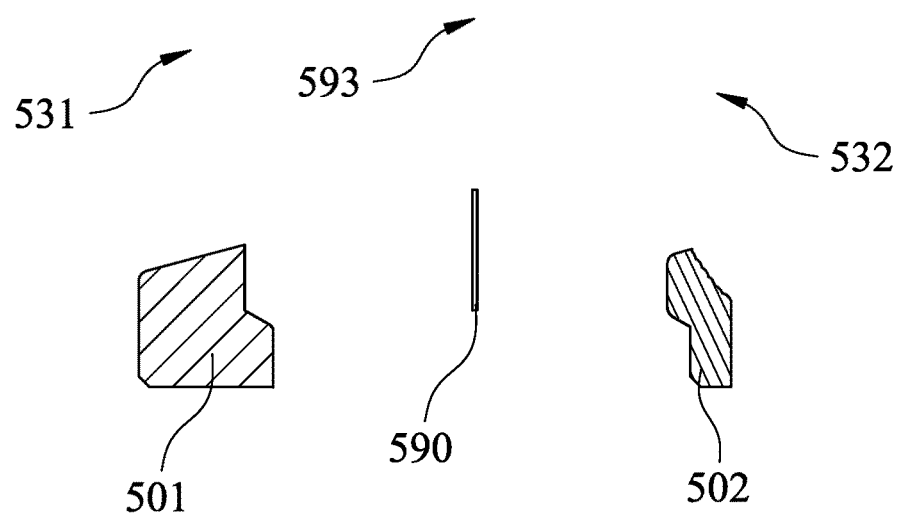

FIG. 5B is a schematic view of the annular optical element assembly 500 according to the 5th embodiment, and FIG. 5C is an exploded view of the annular optical element assembly 500 of FIG. 5B. In FIG. 5B and FIG. 5C, the annular optical element assembly 500 having a central axis z includes a first annular optical element 501 and a second annular optical element 502. In the 5th embodiment, optical elements of the annular optical element assembly 500 such as the first annular optical element 501 and the second annular optical element 502 are circularly annular and coaxial with respect to the central axis z, wherein all cross-sectional planes of the annular optical element assembly 500 which pass through the central axis z and have normal directions vertical to the central axis z are the same, shown as FIG. 5B.

The first annular optical element 501 includes a first central opening 531 and a first axial connecting structure 551. The central axis z passes through the first central opening 531. The first axial connecting structure 551 surrounds the first central opening 531 and includes a first axial connecting surface 571.

The second annular optical element 502 includes a second central opening 532 and a second axial connecting structure 552. The central axis z passes through the second central opening 532. The second axial connecting structure 552 surrounds the second central opening 532 and includes a second axial connecting surface 572.

The first axial connecting surface 571 and the second axial connecting surface 572 are corresponding and connected to each other for aligning the first annular optical element 501 and the second annular optical element 502 with the central axis z. In the 5th embodiment, the first annular optical element 501 and the second annular optical element 502 are circularly annular, coaxial with respect to the central axis z, and aligned with the central axis z, and thereby the first central opening 531 and the second central opening 532 are corresponding to and aligned with each other.

Furthermore, the first annular optical element 501 further includes a first inner receiving surface 541 surrounding the first central opening 531. The first inner receiving surface 541 is closer to the central axis z than the first axial connecting surface 571 is to the central axis z. The first inner receiving surface 541 is vertical to the central axis z.

The second annular optical element 502 further includes a second inner receiving surface 542 surrounding the second central opening 532. The second inner receiving surface 542 is closer to the central axis z than the second axial connecting surface 572 is to the central axis z. The second inner receiving surface 542 is vertical to the central axis z.

The first inner receiving surface 541 and the second inner receiving surface 542 are corresponding and not connected to each other for defining a receiving space 570, that is, the receiving space 570 is formed between the first inner receiving surface 541 and the second inner receiving surface 542.

The annular optical element assembly 500 further includes a light blocking sheet 590, wherein an outer diameter of the light blocking sheet 590 is smaller than an outer diameter of the first annular optical element 501 and an outer diameter of the second annular optical element 502.

The light blocking sheet 590 is received in the receiving space 570 and limitedly disposed with respect to a position on the central axis z by the first annular optical element 501 and the second annular optical element 502. The light blocking sheet 590 includes a light blocking sheet opening 593, wherein the central axis z passes through the light blocking sheet opening 593.

In detail, each of the first annular optical element 501 and the second annular optical element 502 is made of a black plastic material and made by an injection molding method.

The receiving space 570 includes an air gap space 577, wherein the air gap space 577 is located between the light blocking sheet 590 and the first inner receiving surface 541 or between the light blocking sheet 590 and the second inner receiving surface 542. It can be said that the air gap space 577 is an air layer sandwiched, and specifically at least part space between the first inner receiving surface 541 and the second inner receiving surface 542 serves as the air gap space 577.

Each of the first axial connecting surface 571 and the second axial connecting surface 572 is a conical surface. An angle between the first axial connecting surface 571 and the central axis z and an angle between the second axial connecting surface 572 and the central axis z are α and the same values. The first axial connecting surface 571 and the second axial connecting surface 572 are for aligning the light blocking sheet opening 593 with the first central opening 531 and the second central opening 532.

The light blocking sheet 590 is a composite light blocking sheet and further includes a first outer layer 594, a second outer layer 596 and an inner substrate layer 598, wherein the first outer layer 594 surrounds a first outer opening, the second outer layer 596 surrounds a second outer opening, the inner substrate layer 598 is disposed between the first outer layer 594 and the second outer layer 596, and the inner substrate layer 598 connects the first outer layer 594 and the second outer layer 596 and surrounds a substrate opening. The first outer opening, the substrate opening and the second outer opening are corresponding to each other and coaxial with respect to the central axis z, and form the light blocking sheet opening 593, wherein the first outer opening, the second outer opening and the substrate opening in the 5th embodiment may refer to the first outer opening 195, the second outer opening 197 and the substrate opening 199 of the light blocking sheet 190 shown as FIG. 1G in the 1st embodiment, and their reference numerals are omitted herein. Furthermore, the inner substrate layer 598 is made of a plastic material, and each of the first outer layer 594 and the second outer layer 596 is made of a black carbon-containing material.

Figure 5D:
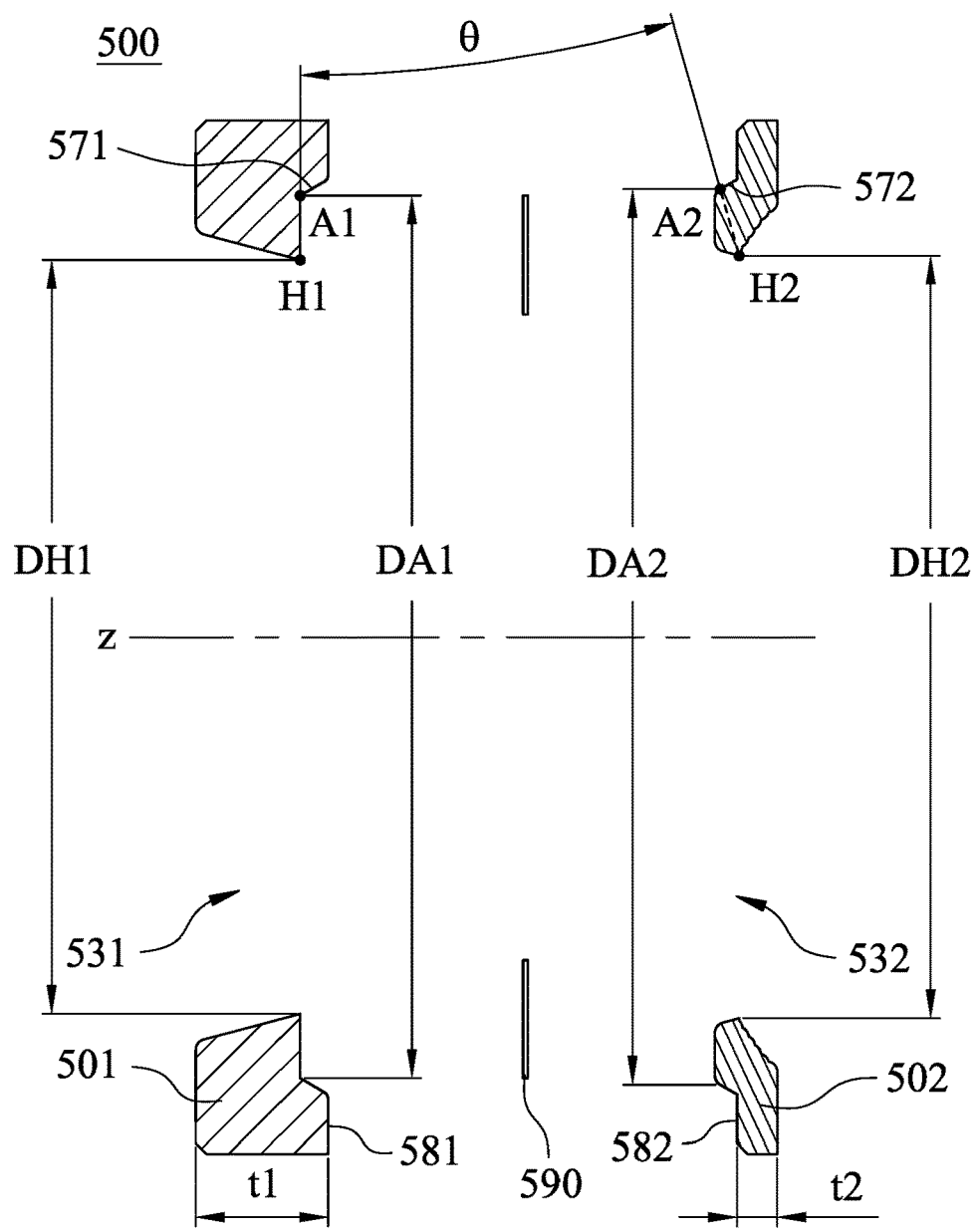
FIG. 5D is another exploded view of the annular optical element assembly of FIG. 5B.
Figure 5E:
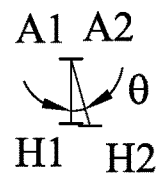
FIG. 5E is a schematic view of the parameter θ according to FIG. 5D.

FIG. 5D is another exploded view of the annular optical element assembly 500 of FIG. 5B, and FIG. 5E is a schematic view of the parameter θ according to FIG. 5D. In FIG. 5D and FIG. 5E, the definitions of parameters DA1, DA2, DH1 and DH2 and minimum diameter positions A1, A2, H1 and H2 of the annular optical element assembly 500 in the 5th embodiment are the same as those of the annular optical element assembly 100 in the 1st embodiment. In the 5th embodiment, the line connecting A1 with H1 and the line connecting A2 with H2 approach towards each other from being near the central axis z to being far from the central axis z.

In FIG. 5B and FIG. 5C, the first axial connecting structure 551 further includes a first outer receiving surface 581 vertical to the central axis z, wherein the first outer receiving surface 581 is farther from the central axis z than the first axial connecting surface 571 is from the central axis z. The second axial connecting structure 552 further includes a second outer receiving surface 582 vertical to the central axis z, wherein the second outer receiving surface 582 is farther from the central axis z than the second axial connecting surface 572 is from the central axis z, and the first outer receiving surface 581 and the second outer receiving surface 582 are corresponding and connected to each other.

The second annular optical element 502 includes a plurality of micro structures 560, which may be a plurality of annular protrusion structures being continued one by one and coaxial with respect to the central axis z, wherein each of the micro structures 560 may have an arc annular surface.

Therefore, it is favorable for effectively reducing the stray light, and thereby enhancing the image quality of the imaging lens set in which the annular optical element assembly 500 is applied.

The data of the parameters DA1, DA2, DH1, DH2, θ, w, α, t1, t2 and t1/t2 of the annular optical element assembly 500 according to the 5th embodiment of the present disclosure are listed in the following Table 5, wherein the parameters are also shown as FIG. 5B to FIG. 5E. The definitions of these parameters shown in Table 5 are the same as those stated in the annular optical element assembly 100 of the 1st embodiment with corresponding values for the annular optical element assembly 500.

TABLE 5

5th Embodiment

| | | | |
|---|---|---|---|
| DA1 (mm) | 4.1 | w (mm) | 0.004 |
| DA2 (mm) | 4.16 | α (deg.) | 30 |
| DH1 (mm) | 3.5 | t1 (mm) | 0.61 |
| DH2 (mm) | 3.54 | t2 (mm) | 0.19 |
| θ (deg.) | 16 | t1/t2 | 3.21 |

6th Embodiment

Figure 6A:
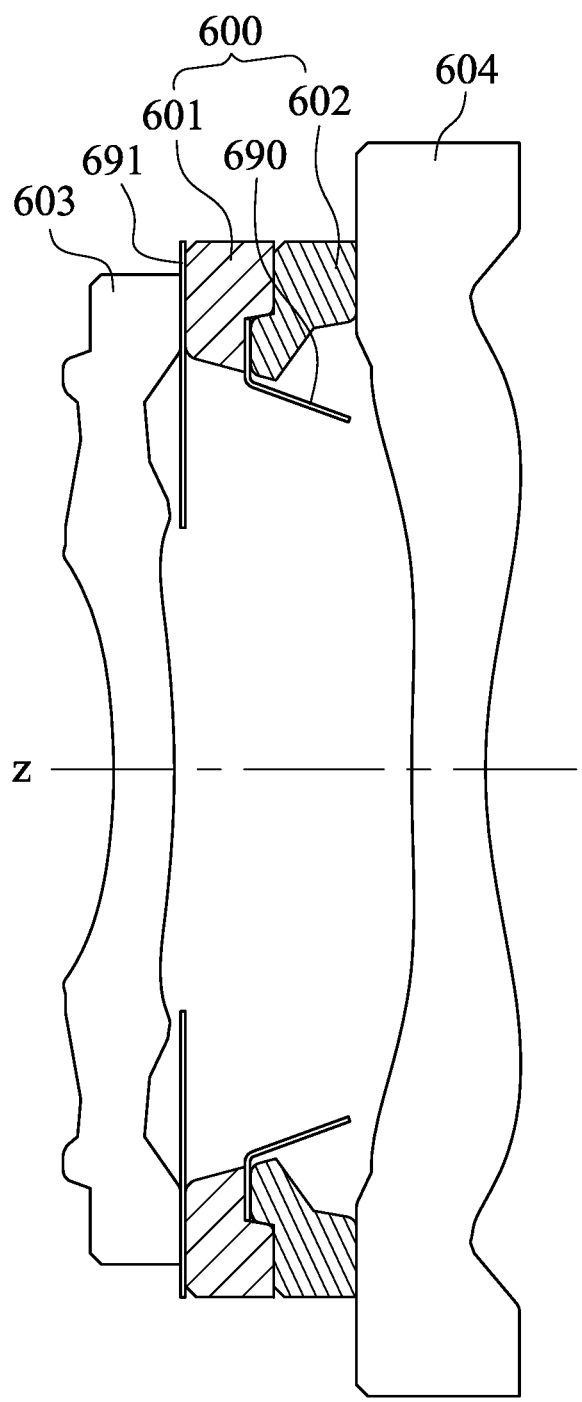
FIG. 6A is an assembling schematic view of an annular optical element assembly according to the 6th embodiment of the present disclosure and the lens elements.

FIG. 6A is an assembling schematic view of an annular optical element assembly 600 according to the 6th embodiment of the present disclosure, lens elements 603 and 604. In FIG. 6A, the annular optical element assembly 600, the lens elements 603, 604 and a light blocking sheet 691 can be part of optical elements in the imaging lens set (not shown completely), wherein two side surfaces of the annular optical element assembly 600 are respectively abutted with the light blocking sheet 691 and the lens element 604.

Figure 6B:
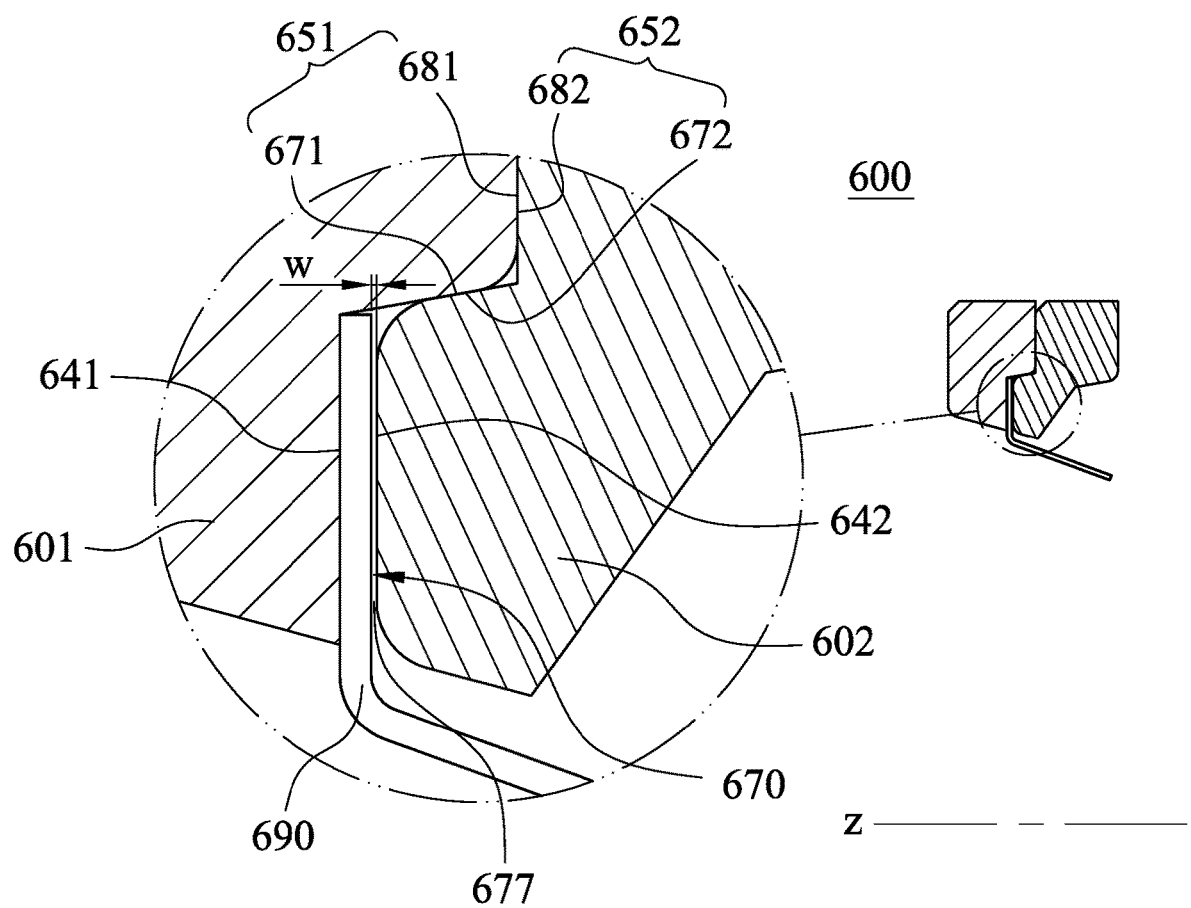
FIG. 6B is a schematic view of the annular optical element assembly according to the 6th embodiment.
Figure 6C:
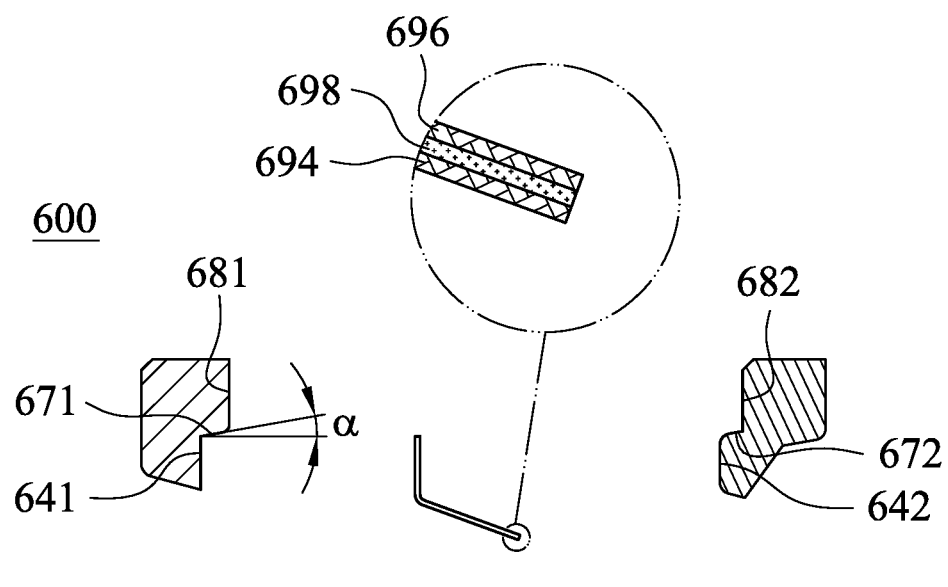
FIG. 6C is an exploded view of the annular optical element assembly of FIG. 6B.
Figure 6C:
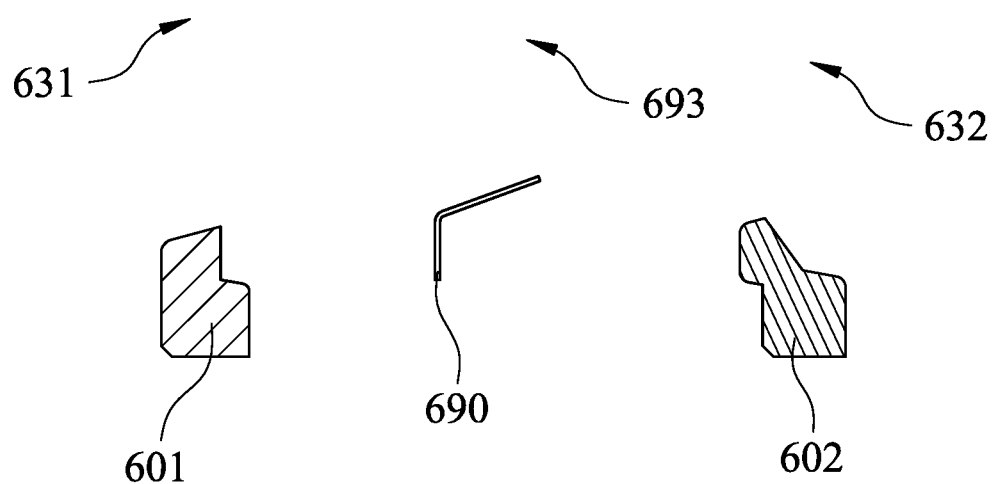

FIG. 6B is a schematic view of the annular optical element assembly 600 according to the 6th embodiment, and FIG. 6C is an exploded view of the annular optical element assembly 600 of FIG. 6B. In FIG. 6B and FIG. 6C, the annular optical element assembly 600 having a central axis z includes a first annular optical element 601 and a second annular optical element 602. In the 6th embodiment, optical elements of the annular optical element assembly 600 such as the first annular optical element 601 and the second annular optical element 602 are circularly annular and coaxial with respect to the central axis z, wherein all cross-sectional planes of the annular optical element assembly 600 which pass through the central axis z and have normal directions vertical to the central axis z are the same, shown as FIG. 6B.

The first annular optical element 601 includes a first central opening 631 and a first axial connecting structure 651. The central axis z passes through the first central opening 631. The first axial connecting structure 651 surrounds the first central opening 631 and includes a first axial connecting surface 671.

The second annular optical element 602 includes a second central opening 632 and a second axial connecting structure 652. The central axis z passes through the second central opening 632. The second axial connecting structure 652 surrounds the second central opening 632 and includes a second axial connecting surface 672.

The first axial connecting surface 671 and the second axial connecting surface 672 are corresponding and connected to each other for aligning the first annular optical element 601 and the second annular optical element 602 with the central axis z. In the 6th embodiment, the first annular optical element 601 and the second annular optical element 602 are circularly annular, coaxial with respect to the central axis z, and aligned with the central axis z, and thereby the first central opening 631 and the second central opening 632 are corresponding to and aligned with each other.

Furthermore, the first annular optical element 601 further includes a first inner receiving surface 641 surrounding the first central opening 631. The first inner receiving surface 641 is closer to the central axis z than the first axial connecting surface 671 is to the central axis z. The first inner receiving surface 641 is vertical to the central axis z.

The second annular optical element 602 further includes a second inner receiving surface 642 surrounding the second central opening 632. The second inner receiving surface 642 is closer to the central axis z than the second axial connecting surface 672 is to the central axis z. The second inner receiving surface 642 is vertical to the central axis z.

The first inner receiving surface 641 and the second inner receiving surface 642 are corresponding and not connected to each other for defining a receiving space 670, that is, the receiving space 670 is formed between the first inner receiving surface 641 and the second inner receiving surface 642.

The annular optical element assembly 600 further includes a light blocking sheet 690, wherein an outer diameter of the light blocking sheet 690 is smaller than an outer diameter of the first annular optical element 601 and an outer diameter of the second annular optical element 602.

The light blocking sheet 690 is received in the receiving space 670 and limitedly disposed with respect to a position on the central axis z by the first annular optical element 601 and the second annular optical element 602. The light blocking sheet 690 includes a light blocking sheet opening 693, wherein the central axis z passes through the light blocking sheet opening 693, and an inner annular portion of the light blocking sheet 690 bends towards the second annular optical element 602.

In detail, each of the first annular optical element 601 and the second annular optical element 602 is made of a black plastic material and made by an injection molding method.

The receiving space 670 includes an air gap space 677, wherein the air gap space 677 is located between the light blocking sheet 690 and the first inner receiving surface 641 or between the light blocking sheet 690 and the second inner receiving surface 642. It can be said that the air gap space 677 is an air layer sandwiched, and specifically at least part space between the first inner receiving surface 641 and the second inner receiving surface 642 serves as the air gap space 677.

Each of the first axial connecting surface 671 and the second axial connecting surface 672 is a conical surface. An angle between the first axial connecting surface 671 and the central axis z and an angle between the second axial connecting surface 672 and the central axis z are α and the same values. The first axial connecting surface 671 and the second axial connecting surface 672 are for aligning the light blocking sheet opening 693 with the first central opening 631 and the second central opening 632.

The light blocking sheet 690 is a composite light blocking sheet and further includes a first outer layer 694, a second outer layer 696 and an inner substrate layer 698, wherein the first outer layer 694 surrounds a first outer opening, the second outer layer 696 surrounds a second outer opening, the inner substrate layer 698 is disposed between the first outer layer 694 and the second outer layer 696, and the inner substrate layer 698 connects the first outer layer 694 and the second outer layer 696 and surrounds a substrate opening.

The first outer opening, the substrate opening and the second outer opening are corresponding to each other and coaxial with respect to the central axis z, and form the light blocking sheet opening 693, wherein the first outer opening, the second outer opening and the substrate opening in the 6th embodiment may refer to the first outer opening 195, the second outer opening 197 and the substrate opening 199 of the light blocking sheet 190 shown as FIG. 1G in the 1st embodiment, and their reference numerals are omitted herein. Furthermore, the inner substrate layer 698 is made of a plastic material, and each of the first outer layer 694 and the second outer layer 696 is made of a black carbon-containing material.

Figure 6E:
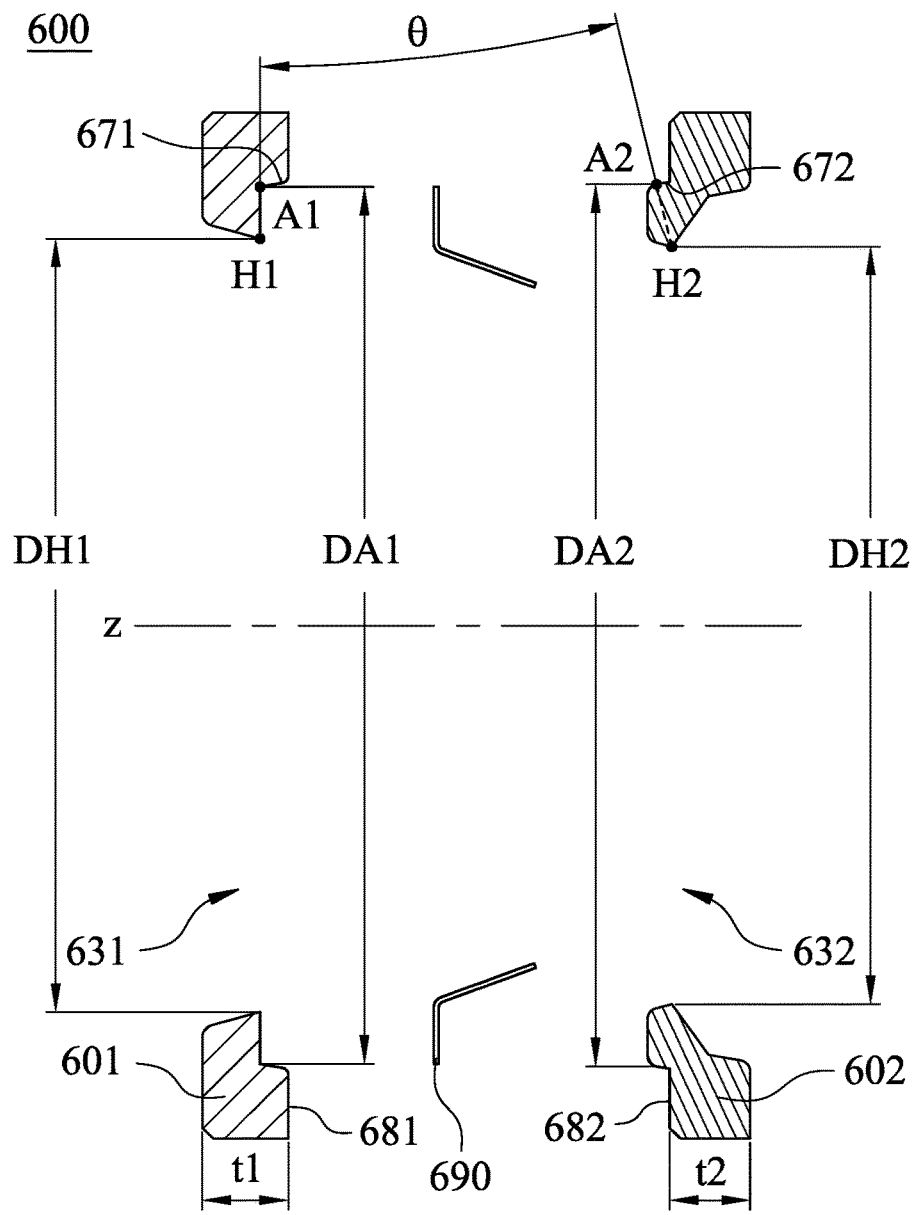
FIG. 6E is a schematic view of the parameter θ according to FIG. 6D.
Figure 6E:
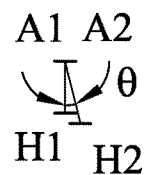

FIG. 6D is another exploded view of the annular optical element assembly 600 of FIG. 6B, and FIG. 6E is a schematic view of the parameter θ according to FIG. 6D. In FIG. 6D and FIG. 6E, the definitions of parameters DA1, DA2, DH1 and DH2 and minimum diameter positions A1, A2, H1 and H2 of the annular optical element assembly 600 in the 6th embodiment are the same as those of the annular optical element assembly 100 in the 1st embodiment. In the 6th embodiment, the line connecting A1 with H1 and the line connecting A2 with H2 approach towards each other from being near the central axis z to being far from the central axis z.

In FIG. 6B and FIG. 6C, the first axial connecting structure 651 further includes a first outer receiving surface 681 vertical to the central axis z, wherein the first outer receiving surface 681 is farther from the central axis z than the first axial connecting surface 671 is from the central axis z. The second axial connecting structure 652 further includes a second outer receiving surface 682 vertical to the central axis z, wherein the second outer receiving surface 682 is farther from the central axis z than the second axial connecting surface 672 is from the central axis z, and the first outer receiving surface 681 and the second outer receiving surface 682 are corresponding and connected to each other.

The data of the parameters DA1, DA2, DH1, DH2, θ, w, α, t1, t2 and t1/t2 of the annular optical element assembly 600 according to the 6th embodiment of the present disclosure are listed in the following Table 6, wherein the parameters are also shown as FIG. 6B to FIG. 6E. The definitions of these parameters shown in Table 6 are the same as those stated in the annular optical element assembly 100 of the 1st embodiment with corresponding values for the annular optical element assembly 600.

TABLE 6

| 6th Embodiment | | | |
|---|---|---|---|
| DA1 (mm) | 4.1 | w (mm) | 0.004 |
| DA2 (mm) | 4.12 | α (deg.) | 10 |
| DH1 (mm) | 3.62 | t1 (mm) | 0.4 |
| DH2 (mm) | 3.54 | t2 (mm) | 0.38 |
| θ (deg.) | 14 | t1/t2 | 1.05 |

7th Embodiment

Figure 7A:
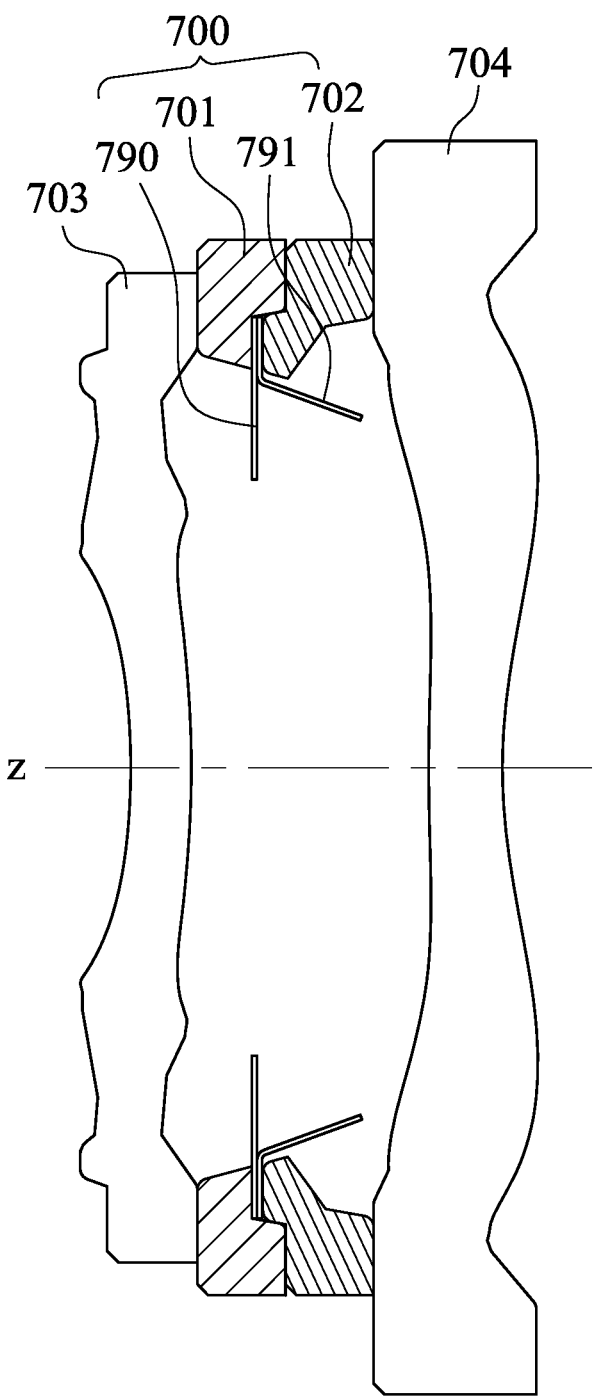
FIG. 7A is an assembling schematic view of an annular optical element assembly according to the 7th embodiment of the present disclosure and the lens elements.

FIG. 7A is an assembling schematic view of an annular optical element assembly 700 according to the 7th embodiment of the present disclosure, lens elements 703 and 704. In FIG. 7A, the annular optical element assembly 700, the lens elements 703 and 704 can be part of optical elements in the imaging lens set (not shown completely), wherein two side surfaces of the annular optical element assembly 700 are respectively abutted with the lens elements 703 and 704.

Figure 7B:
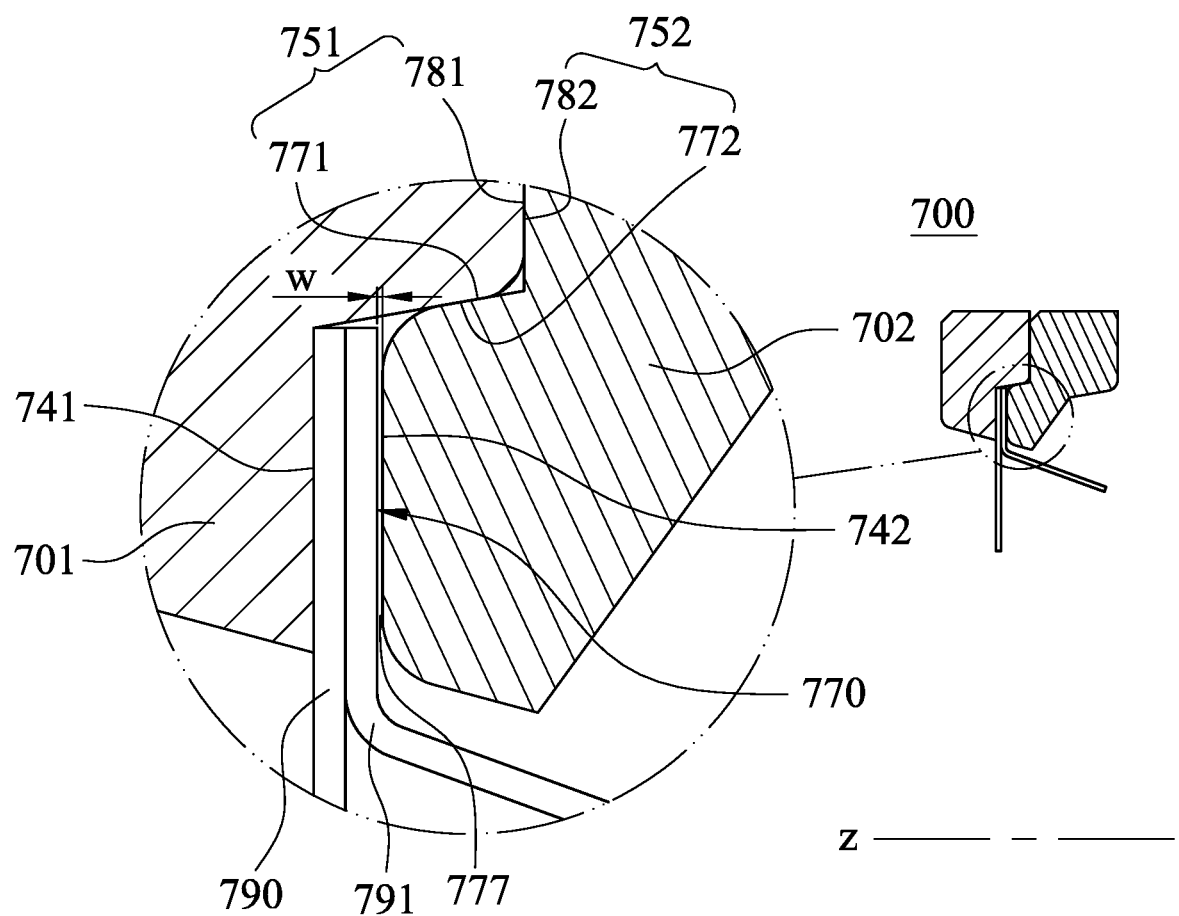
FIG. 7B is a schematic view of the annular optical element assembly according to the 7th embodiment.
Figure 7B:
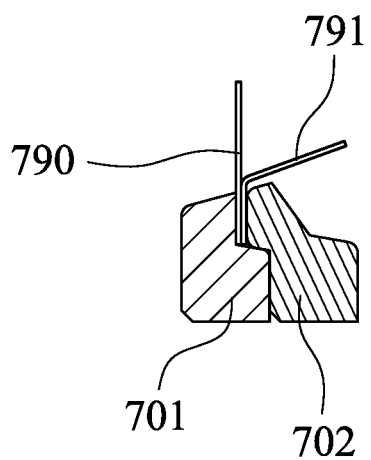
Figure 7C:
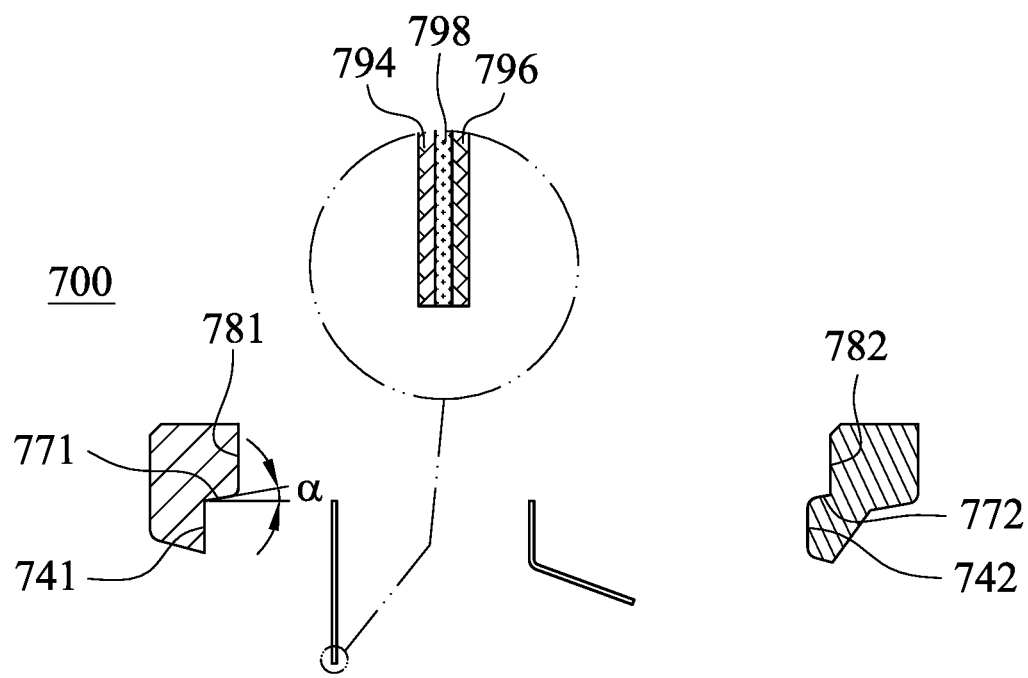
FIG. 7C is an exploded view of the annular optical element assembly of FIG. 7B.
Figure 7C:
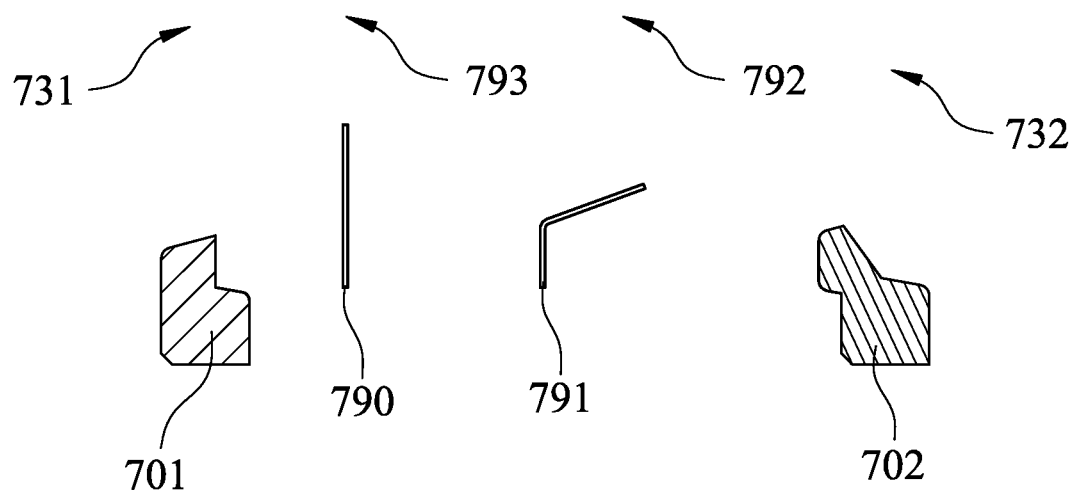

FIG. 7B is a schematic view of the annular optical element assembly 700 according to the 7th embodiment, and FIG. 7C is an exploded view of the annular optical element assembly 700 of FIG. 7B. In FIG. 7B and FIG. 7C, the annular optical element assembly 700 having a central axis z includes a first annular optical element 701 and a second annular optical element 702. In the 7th embodiment, optical elements of the annular optical element assembly 700 such as the first annular optical element 701 and the second annular optical element 702 are circularly annular and coaxial with respect to the central axis z, wherein all cross-sectional planes of the annular optical element assembly 700 which pass through the central axis z and have normal directions vertical to the central axis z are the same, shown as FIG. 7B.

The first annular optical element 701 includes a first central opening 731 and a first axial connecting structure 751. The central axis z passes through the first central opening 731. The first axial connecting structure 751 surrounds the first central opening 731 and includes a first axial connecting surface 771.

The second annular optical element 702 includes a second central opening 732 and a second axial connecting structure 752. The central axis z passes through the second central opening 732. The second axial connecting structure 752 surrounds the second central opening 732 and includes a second axial connecting surface 772.

The first axial connecting surface 771 and the second axial connecting surface 772 are corresponding and connected to each other for aligning the first annular optical element 701 and the second annular optical element 702 with the central axis z. In the 7th embodiment, the first annular optical element 701 and the second annular optical element 702 are circularly annular, coaxial with respect to the central axis z, and aligned with the central axis z, and thereby the first central opening 731 and the second central opening 732 are corresponding to and aligned with each other.

Furthermore, the first annular optical element 701 further includes a first inner receiving surface 741 surrounding the first central opening 731. The first inner receiving surface 741 is closer to the central axis z than the first axial connecting surface 771 is to the central axis z. The first inner receiving surface 741 is vertical to the central axis z.

The second annular optical element 702 further includes a second inner receiving surface 742 surrounding the second central opening 732. The second inner receiving surface 742 is closer to the central axis z than the second axial connecting surface 772 is to the central axis z. The second inner receiving surface 742 is vertical to the central axis z.

The first inner receiving surface 741 and the second inner receiving surface 742 are corresponding and not connected to each other for defining a receiving space 770, that is, the receiving space 770 is formed between the first inner receiving surface 741 and the second inner receiving surface 742.

The annular optical element assembly 700 further includes two light blocking sheets 790 and 791, wherein an outer diameter of the light blocking sheet 790 and an outer diameter of the light blocking sheet 791 are both smaller than an outer diameter of the first annular optical element 701 and an outer diameter of the second annular optical element 702.

The light blocking sheets 790 and 791 are received in the receiving space 770 and limitedly disposed with respect to positions on the central axis z by the first annular optical element 701 and the second annular optical element 702. The light blocking sheet 790 includes a light blocking sheet opening 793, wherein the central axis z passes through the light blocking sheet opening 793. The light blocking sheet 791 includes a light blocking sheet opening 792, wherein the central axis z passes through the light blocking sheet opening 792, and an inner annular portion of the light blocking sheet 791 bends towards the second annular optical element 702.

In detail, each of the first annular optical element 701 and the second annular optical element 702 is made of a black plastic material and made by an injection molding method.

The receiving space 770 includes an air gap space 777, wherein the air gap space 777 is located between the light blocking sheet 790 and the first inner receiving surface 741 or between the light blocking sheet 791 and the second inner receiving surface 742. It can be said that the air gap space 777 is an air layer sandwiched, and specifically at least part space between the first inner receiving surface 741 and the second inner receiving surface 742 serves as the air gap space 777.

Each of the first axial connecting surface 771 and the second axial connecting surface 772 is a conical surface. An angle between the first axial connecting surface 771 and the central axis z and an angle between the second axial connecting surface 772 and the central axis z are α and the same values. The first axial connecting surface 771 and the second axial connecting surface 772 are for aligning the light blocking sheet openings 792, 793 with the first central opening 731 and the second central opening 732.

The light blocking sheet 790 is a composite light blocking sheet and further includes a first outer layer 794, a second outer layer 796 and an inner substrate layer 798, wherein the first outer layer 794 surrounds a first outer opening, the second outer layer 796 surrounds a second outer opening, the inner substrate layer 798 is disposed between the first outer layer 794 and the second outer layer 796, and the inner substrate layer 798 connects the first outer layer 794 and the second outer layer 796 and surrounds a substrate opening. The first outer opening, the substrate opening and the second outer opening are corresponding to each other and coaxial with respect to the central axis z, and form the light blocking sheet opening 793, wherein the first outer opening, the second outer opening and the substrate opening in the 7th embodiment may refer to the first outer opening 195, the second outer opening 197 and the substrate opening 199 of the light blocking sheet 190 shown as FIG. 1G in the 1st embodiment, and their reference numerals are omitted herein. Furthermore, the inner substrate layer 798 is made of a plastic material, and each of the first outer layer 794 and the second outer layer 796 is made of a black carbon-containing material. In addition, the light blocking sheet 791 is also a composite light blocking sheet, wherein the light blocking sheet 791 is made of the same material as the light blocking sheet 790, an overall shape of the light blocking sheet 791 is different from an overall shape of the light blocking sheet 790, and other details of the light blocking sheet 791 will not be described herein.

Figure 7D:
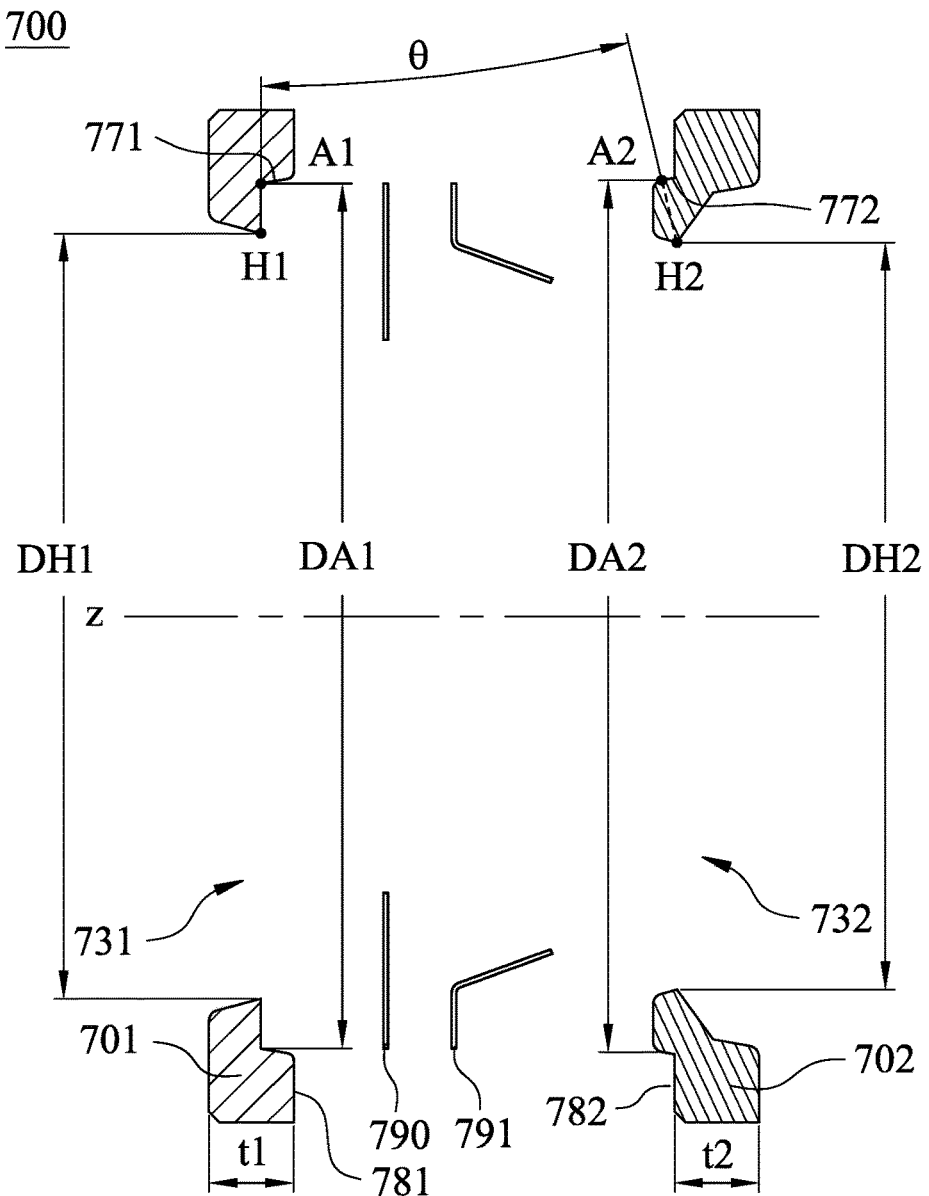
FIG. 7D is another exploded view of the annular optical element assembly of FIG. 7B.
Figure 7E:
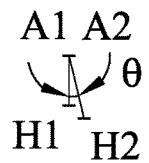
FIG. 7E is a schematic view of the parameter θ according to FIG. 7D.

FIG. 7D is another exploded view of the annular optical element assembly 700 of FIG. 7B, and FIG. 7E is a schematic view of the parameter θ according to FIG. 7D. In FIG. 7D and FIG. 7E, the definitions of parameters DA1, DA2, DH1 and DH2 and minimum diameter positions A1, A2, H1 and H2 of the annular optical element assembly 700 in the 7th embodiment are the same as those of the annular optical element assembly 100 in the 1st embodiment. In the 7th embodiment, the line connecting A1 with H1 and the line connecting A2 with H2 approach towards each other from being near the central axis z to being far from the central axis z.

In FIG. 7B and FIG. 7C, the first axial connecting structure 751 further includes a first outer receiving surface 781 vertical to the central axis z, wherein the first outer receiving surface 781 is farther from the central axis z than the first axial connecting surface 771 is from the central axis z. The second axial connecting structure 752 further includes a second outer receiving surface 782 vertical to the central axis z, wherein the second outer receiving surface 782 is farther from the central axis z than the second axial connecting surface 772 is from the central axis z, and the first outer receiving surface 781 and the second outer receiving surface 782 are corresponding and connected to each other.

The data of the parameters DA1, DA2, DH1, DH2, θ, w, α, t1, t2 and t1/t2 of the annular optical element assembly 700 according to the 7th embodiment of the present disclosure are listed in the following Table 7, wherein the parameters are also shown as FIG. 7B to FIG. 7E. The definitions of these parameters shown in Table 7 are the same as those stated in the annular optical element assembly 100 of the 1st embodiment with corresponding values for the annular optical element assembly 700.

TABLE 7

| 7th Embodiment | | | |
|---|---|---|---|
| DA1 (mm) | 4.1 | w (mm) | 0.004 |
| DA2 (mm) | 4.13 | α (deg.) | 10 |
| DH1 (mm) | 3.63 | t1 (mm) | 0.4 |
| DH2 (mm) | 3.54 | t2 (mm) | 0.4 |
| θ (deg.) | 14 | t1/t2 | 1.00 |

8th Embodiment

Figure 8A:
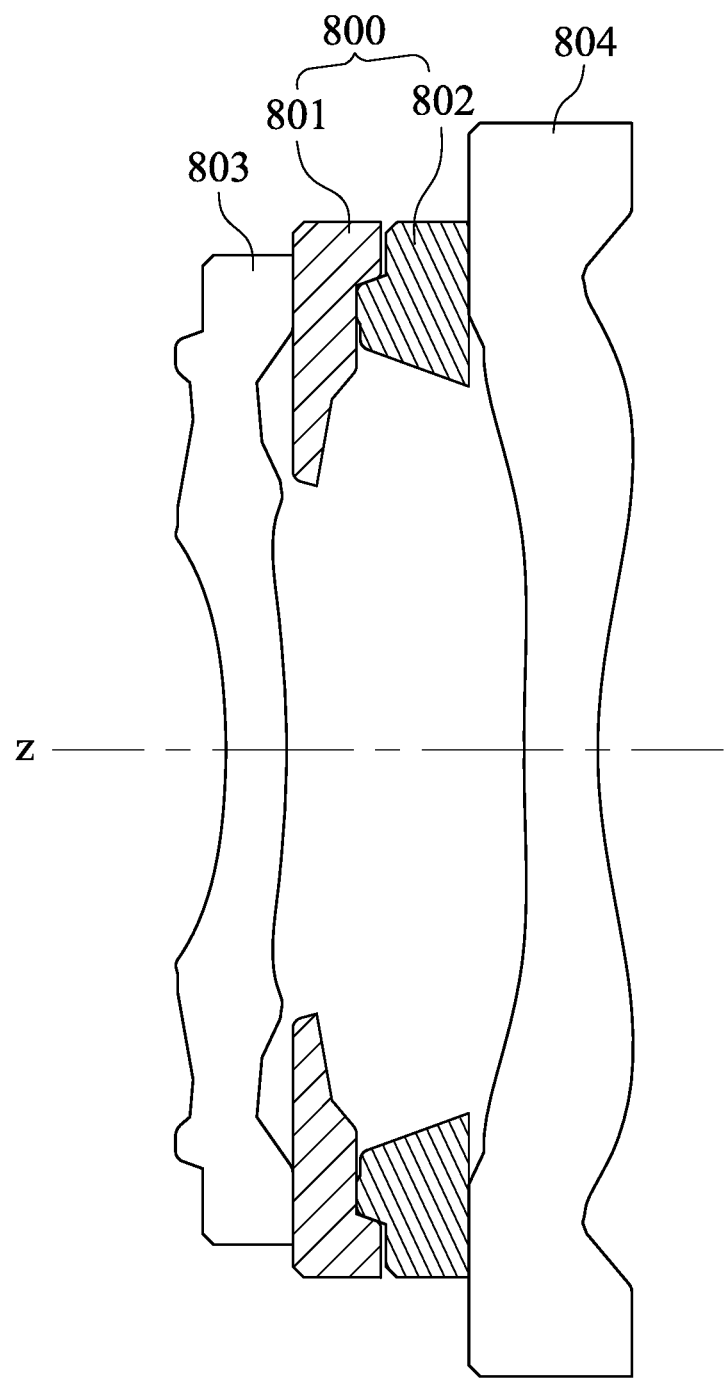
FIG. 8A is an assembling schematic view of an annular optical element assembly according to the 8th embodiment of the present disclosure and the lens elements.

FIG. 8A is an assembling schematic view of an annular optical element assembly 800 according to the 8th embodiment of the present disclosure, lens elements 803 and 804. In FIG. 8A, the annular optical element assembly 800, the lens elements 803 and 804 can be part of optical elements in the imaging lens set (not shown completely), wherein two side surfaces of the annular optical element assembly 800 are respectively abutted with the lens elements 803 and 804.

Figure 8B:
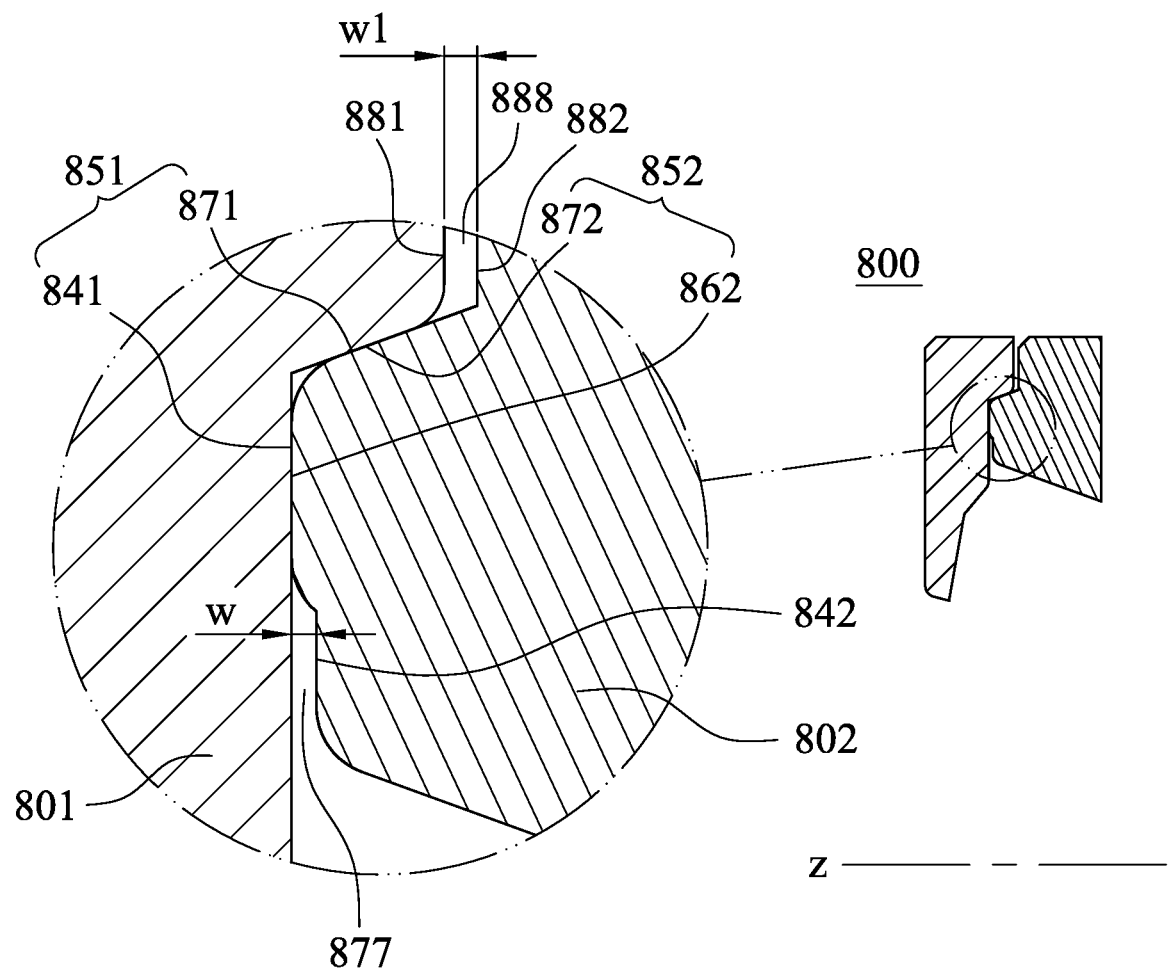
FIG. 8B is a schematic view of the annular optical element assembly according to the 8th embodiment.
Figure 8B:
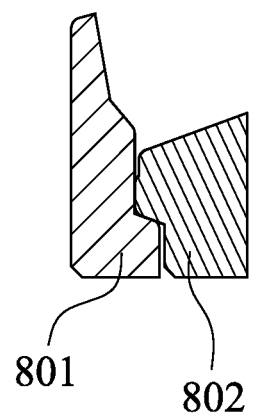
Figure 8C:
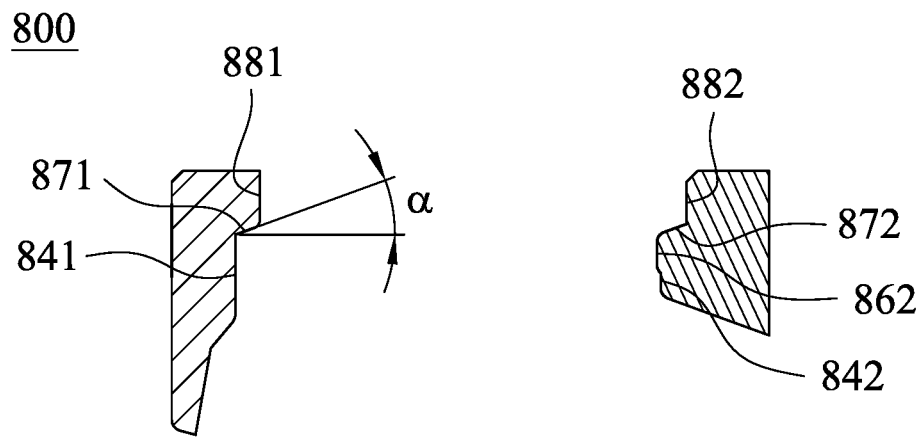
FIG. 8C is an exploded view of the annular optical element assembly of FIG. 8B.
Figure 8C:
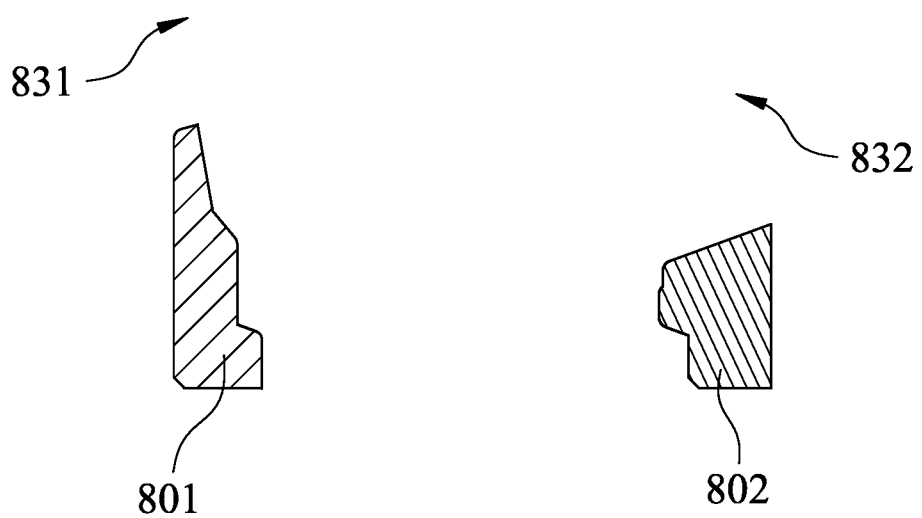

FIG. 8B is a schematic view of the annular optical element assembly 800 according to the 8th embodiment, and FIG. 8C is an exploded view of the annular optical element assembly 800 of FIG. 8B. In FIG. 8B and FIG. 8C, the annular optical element assembly 800 having a central axis z includes a first annular optical element 801 and a second annular optical element 802. In the 8th embodiment, the first annular optical element 801 and the second annular optical element 802 of the annular optical element assembly 800 are circularly annular and coaxial with respect to the central axis z, wherein all cross-sectional planes of the annular optical element assembly 800 which pass through the central axis z and have normal directions vertical to the central axis z are the same, shown as FIG. 8B.

The first annular optical element 801 includes a first central opening 831 and a first axial connecting structure 851. The central axis z passes through the first central opening 831. The first axial connecting structure 851 surrounds the first central opening 831 and includes a first axial connecting surface 871.

The second annular optical element 802 includes a second central opening 832 and a second axial connecting structure 852. The central axis z passes through the second central opening 832. The second axial connecting structure 852 surrounds the second central opening 832 and includes a second axial connecting surface 872.

The first axial connecting surface 871 and the second axial connecting surface 872 are corresponding and connected to each other for aligning the first annular optical element 801 and the second annular optical element 802 with the central axis z. In the 8th embodiment, the first annular optical element 801 and the second annular optical element 802 are circularly annular, coaxial with respect to the central axis z, and aligned with the central axis z, and thereby the first central opening 831 and the second central opening 832 are corresponding to and aligned with each other.

Figure 8D:
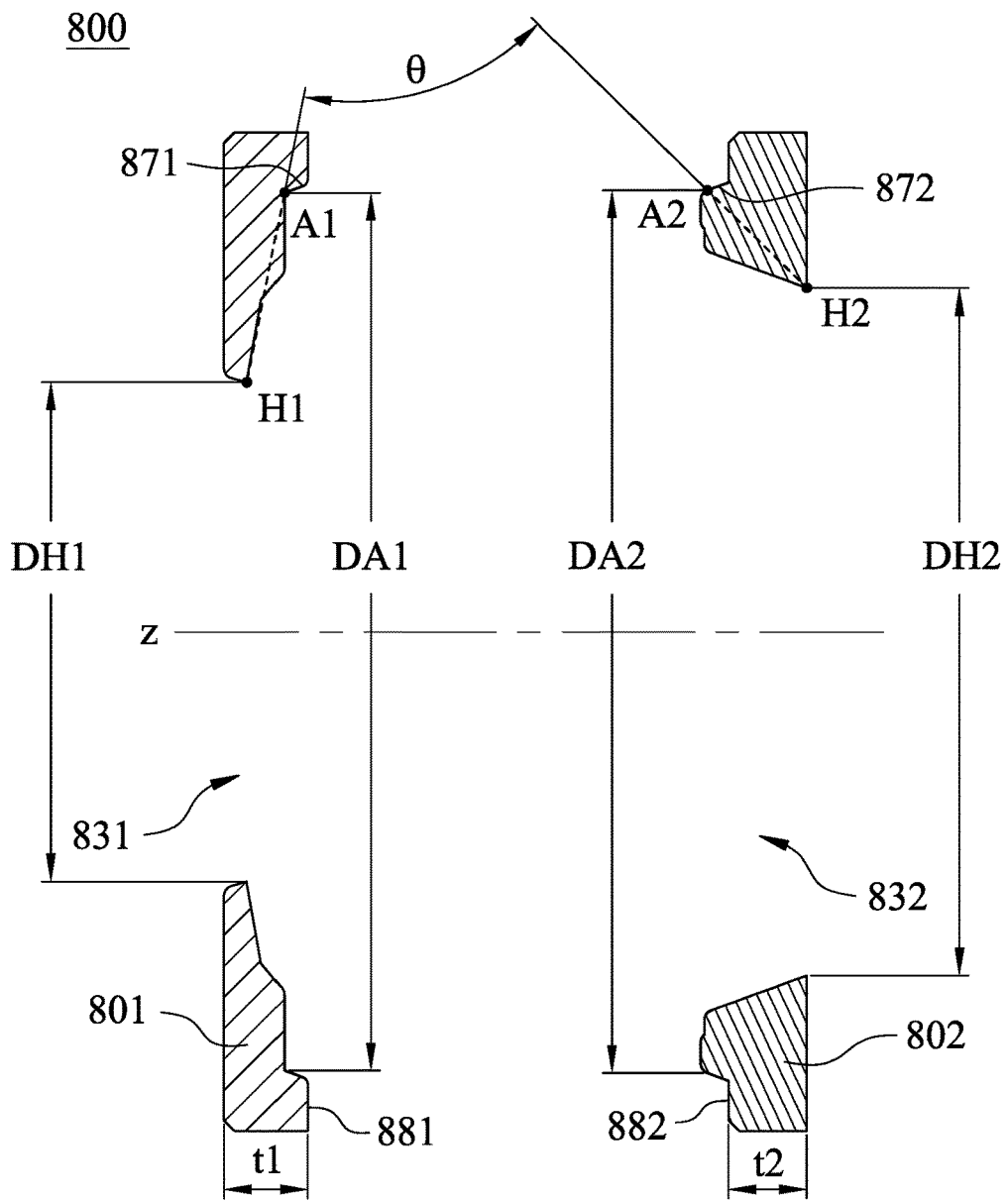
FIG. 8D is another exploded view of the annular optical element assembly of FIG. 8B.
Figure 8E:
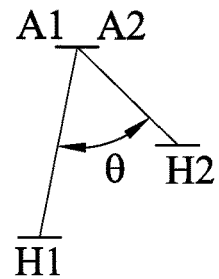
FIG. 8E is a schematic view of the parameter θ according to FIG. 8D.

FIG. 8D is another exploded view of the annular optical element assembly 800 of FIG. 8B, and FIG. 8E is a schematic view of the parameter θ according to FIG. 8D. In FIG. 8D and FIG. 8E, the definitions of parameters DA1, DA2, DH1 and DH2 and minimum diameter positions A1, A2, H1 and H2 of the annular optical element assembly 800 in the 8th embodiment are the same as those of the annular optical element assembly 100 in the 1st embodiment.

In the 8th embodiment, the line connecting A1 with H1 and the line connecting A2 with H2 approach towards each other from being near the central axis z to being far from the central axis z.

In FIG. 8B and FIG. 8C, each of the first axial connecting surface 871 and the second axial connecting surface 872 is a conical surface. An angle between the first axial connecting surface 871 and the central axis z and an angle between the second axial connecting surface 872 and the central axis z are α and the same values.

The first annular optical element 801 further includes a first inner receiving surface 841 surrounding the first central opening 831. The first inner receiving surface 841 is closer to the central axis z than the first axial connecting surface 871 is to the central axis z. The first inner receiving surface 841 is vertical to the central axis z. The second annular optical element 802 further includes a second inner receiving surface 842 surrounding the second central opening 832. The second inner receiving surface 842 is closer to the central axis z than the second axial connecting surface 872 is to the central axis z. The second inner receiving surface 842 is vertical to the central axis z. The first inner receiving surface 841 and the second inner receiving surface 842 are corresponding and not connected to each other.

An air gap space 877, being an air layer sandwiched, is located between the first inner receiving surface 841 and the second inner receiving surface 842. Specifically, the first inner receiving surface 841 and the second inner receiving surface 842 define the air gap space 877, that is, the air gap space 877 is formed between the first inner receiving surface 841 and the second inner receiving surface 842.

In addition, each of the first annular optical element 801 and the second annular optical element 802 is made of a black plastic material and made by an injection molding method.

In the 8th embodiment, the first axial connecting structure 851 includes the first axial connecting surface 871 and the first inner receiving surface 841. The second axial connecting structure 852 includes the second axial connecting surface 872 and a second middle receiving surface 862 vertical to the central axis z, wherein the second middle receiving surface 862 is located between the second axial connecting surface 872 and the second inner receiving surface 842. The first inner receiving surface 841 and the second middle receiving surface 862 are corresponding and connected to each other.

The first annular optical element 801 further includes a first outer receiving surface 881 vertical to the central axis z, wherein the first outer receiving surface 881 is farther from the central axis z than the first axial connecting surface 871 is from the central axis z. The second annular optical element 802 further includes a second outer receiving surface 882 vertical to the central axis z, wherein the second outer receiving surface 882 is farther from the central axis z than the second axial connecting surface 872 is from the central axis z, and the first outer receiving surface 881 and the second outer receiving surface 882 are corresponding and not connected to each other.

An outer air gap space 888, being an air layer sandwiched, is located between the first outer receiving surface 881 and the second outer receiving surface 882. Specifically, the first outer receiving surface 881 and the second outer receiving surface 882 define the outer air gap space 888, that is, the outer air gap space 888 is formed between the first outer receiving surface 881 and the second outer receiving surface 882. A width parallel to the central axis z of the outer air gap space 888 is w1.

The data of the parameters DA1, DA2, DH1, DH2, θ, w, w1, α, t1, t2 and t1/t2 of the annular optical element assembly 800 according to the 8th embodiment of the present disclosure are listed in the following Table 8, wherein the parameters are also shown as FIG. 8B to FIG. 8E. The definitions of these parameters shown in Table 8 are the same as those stated in the annular optical element assembly 100 of the 1st embodiment with corresponding values for the annular optical element assembly 800.

TABLE 8

| 8th Embodiment | | | |
|---|---|---|---|
| DA1 (mm) | 4.22 | w1 (mm) | 0.024 |
| DA2 (mm) | 4.24 | α (deg.) | 20 |
| DH1 (mm) | 2.4 | t1 (mm) | 0.4 |
| DH2 (mm) | 3.3 | t2 (mm) | 0.376 |
| θ (deg.) | 57 | t1/t2 | 1.06 |
| w (mm) | 0.018 | | |

9th Embodiment

Figure 9A:
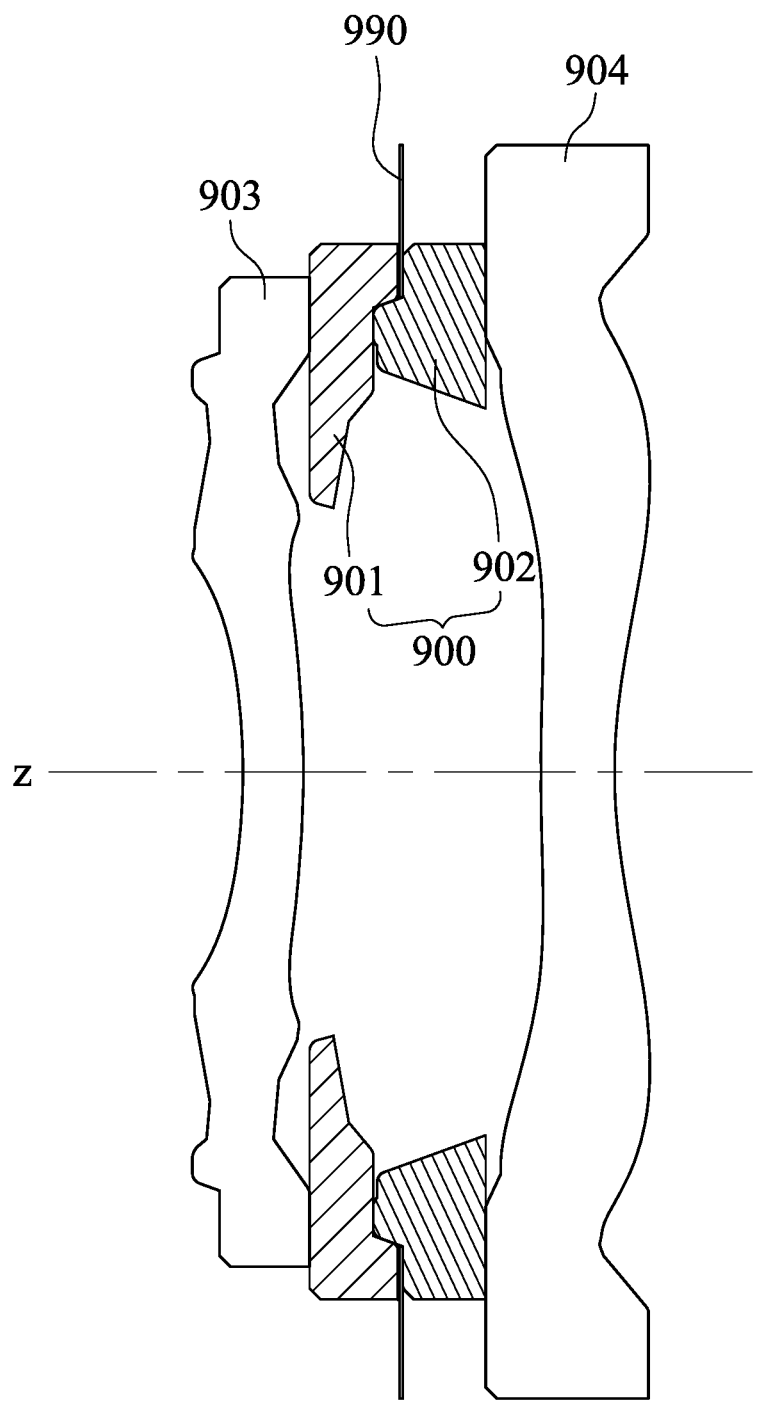
FIG. 9A is an assembling schematic view of an annular optical element assembly according to the 9th embodiment of the present disclosure and the lens elements.

FIG. 9A is an assembling schematic view of an annular optical element assembly 900 according to the 9th embodiment of the present disclosure, lens elements 903 and 904. In FIG. 9A, the annular optical element assembly 900, the lens elements 903 and 904 can be part of optical elements in the imaging lens set (not shown completely), wherein two side surfaces of the annular optical element assembly 900 are respectively abutted with the lens elements 903 and 904.

Figure 9B:
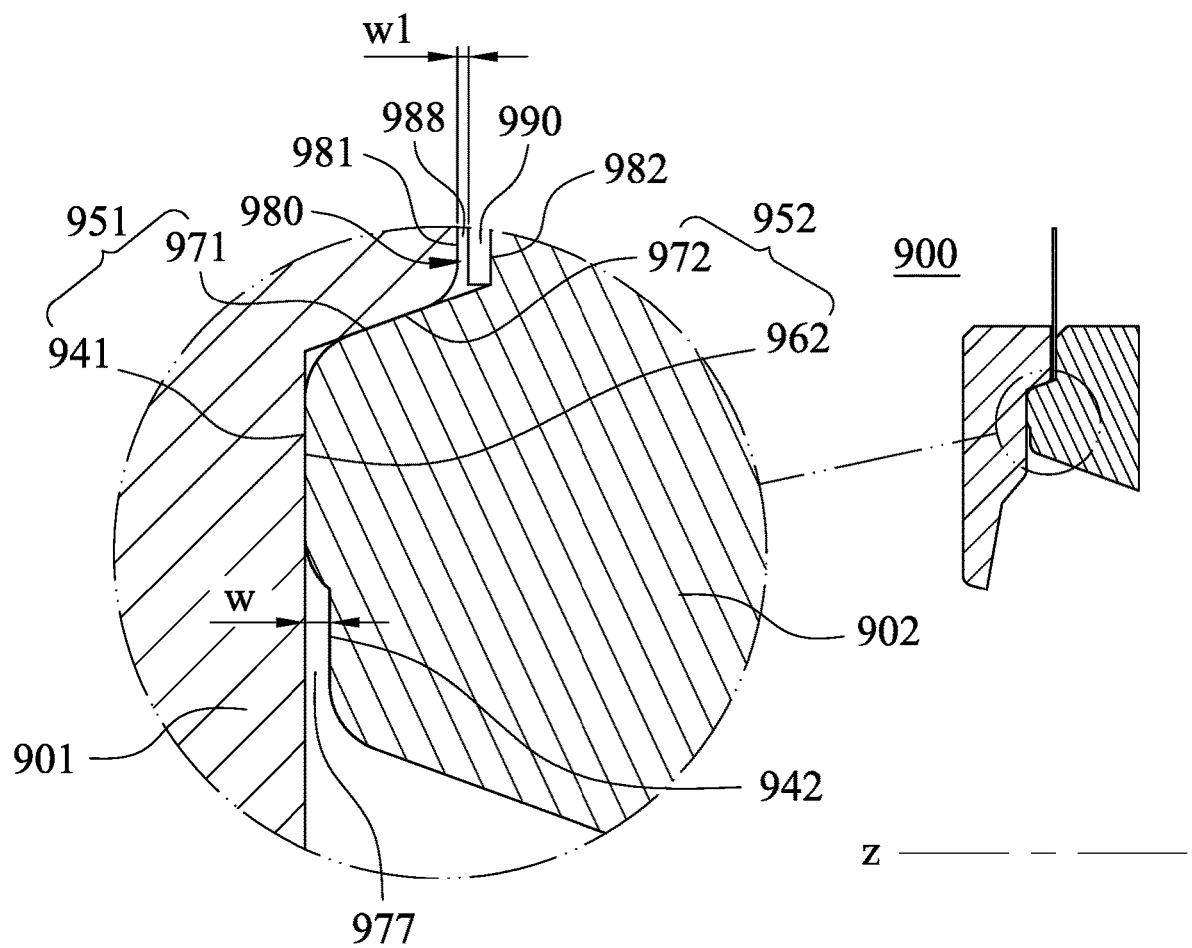
FIG. 9B is a schematic view of the annular optical element assembly according to the 9th embodiment.
Figure 9C:
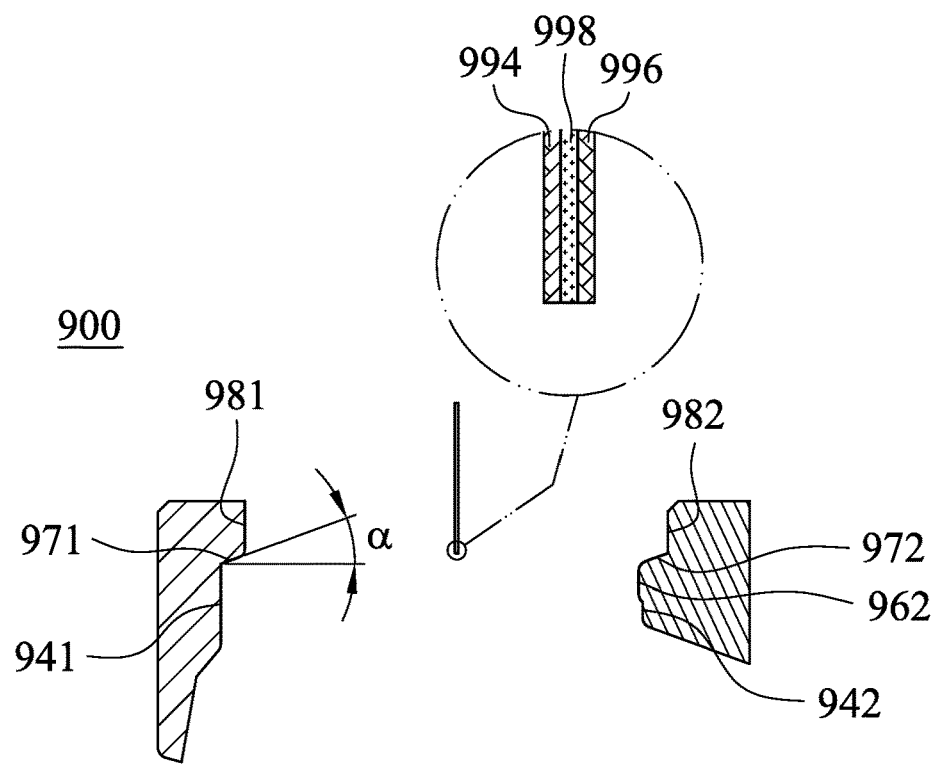
FIG. 9C is an exploded view of the annular optical element assembly of FIG. 9B.
Figure 9C:
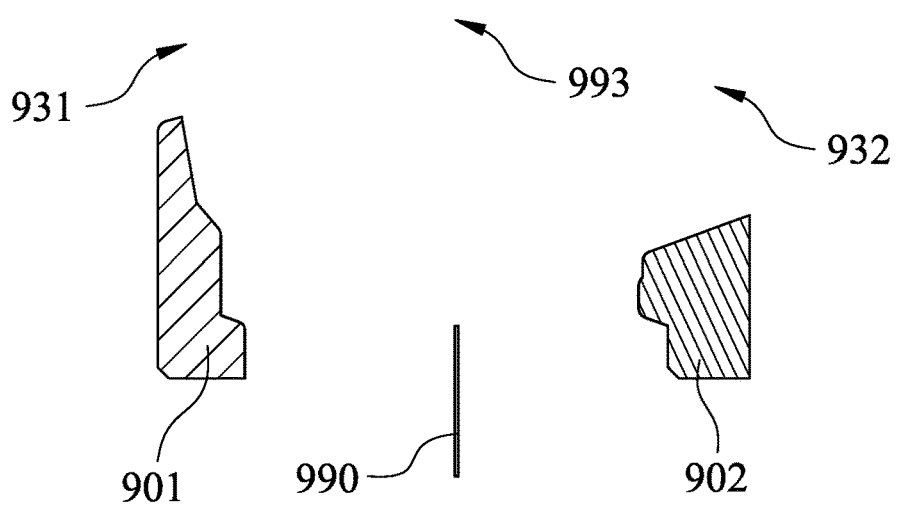

FIG. 9B is a schematic view of the annular optical element assembly 900 according to the 9th embodiment, and FIG. 9C is an exploded view of the annular optical element assembly 900 of FIG. 9B. In FIG. 9B and FIG. 9C, the annular optical element assembly 900 having a central axis z includes a first annular optical element 901 and a second annular optical element 902. In the 9th embodiment, the first annular optical element 901 and the second annular optical element 902 of the annular optical element assembly 900 are circularly annular and coaxial with respect to the central axis z, wherein all cross-sectional planes of the annular optical element assembly 900 which pass through the central axis z and have normal directions vertical to the central axis z are the same, shown as FIG. 9B.

The first annular optical element 901 includes a first central opening 931 and a first axial connecting structure 951. The central axis z passes through the first central opening 931. The first axial connecting structure 951 surrounds the first central opening 931 and includes a first axial connecting surface 971.

The second annular optical element 902 includes a second central opening 932 and a second axial connecting structure 952. The central axis z passes through the second central opening 932. The second axial connecting structure 952 surrounds the second central opening 932 and includes a second axial connecting surface 972.

The first axial connecting surface 971 and the second axial connecting surface 972 are corresponding and connected to each other for aligning the first annular optical element 901 and the second annular optical element 902 with the central axis z. In the 9th embodiment, the first annular optical element 901 and the second annular optical element 902 are circularly annular, coaxial with respect to the central axis z, and aligned with the central axis z, and thereby the first central opening 931 and the second central opening 932 are corresponding to and aligned with each other.

Figure 9D:
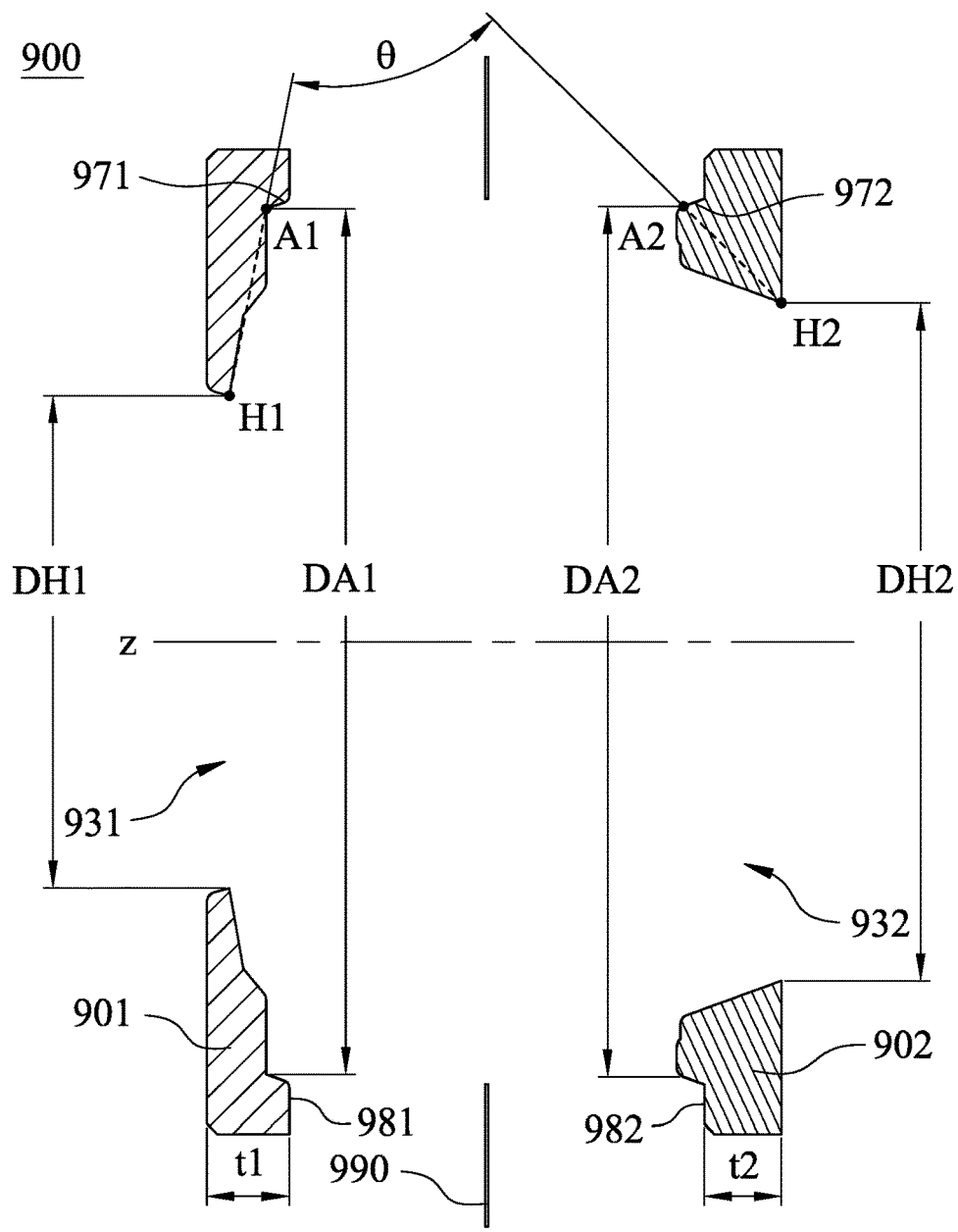
FIG. 9D is another exploded view of the annular optical element assembly of FIG. 9B.
Figure 9E:
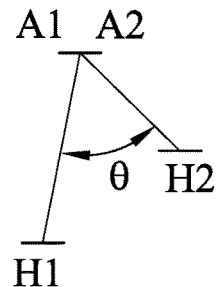
FIG. 9E is a schematic view of the parameter θ according to FIG. 9D.

FIG. 9D is another exploded view of the annular optical element assembly 900 of FIG. 9B, and FIG. 9E is a schematic view of the parameter θ according to FIG. 9D. In FIG. 9D and FIG. 9E, the definitions of parameters DA1, DA2, DH1 and DH2 and minimum diameter positions A1, A2, H1 and H2 of the annular optical element assembly 900 in the 9th embodiment are the same as those of the annular optical element assembly 100 in the 1st embodiment.

In the 9th embodiment, the line connecting A1 with H1 and the line connecting A2 with H2 approach towards each other from being near the central axis z to being far from the central axis z.

In FIG. 9B and FIG. 9C, each of the first axial connecting surface 971 and the second axial connecting surface 972 is a conical surface. An angle between the first axial connecting surface 971 and the central axis z and an angle between the second axial connecting surface 972 and the central axis z are α and the same values.

The first annular optical element 901 further includes a first inner receiving surface 941 surrounding the first central opening 931. The first inner receiving surface 941 is closer to the central axis z than the first axial connecting surface 971 is to the central axis z. The first inner receiving surface 941 is vertical to the central axis z. The second annular optical element 902 further includes a second inner receiving surface 942 surrounding the second central opening 932. The second inner receiving surface 942 is closer to the central axis z than the second axial connecting surface 972 is to the central axis z. The second inner receiving surface 942 is vertical to the central axis z. The first inner receiving surface 941 and the second inner receiving surface 942 are corresponding and not connected to each other.

An air gap space 977, being an air layer sandwiched, is located between the first inner receiving surface 941 and the second inner receiving surface 942. Specifically, the first inner receiving surface 941 and the second inner receiving surface 942 define the air gap space 977, that is, the air gap space 977 is formed between the first inner receiving surface 941 and the second inner receiving surface 942.

In addition, each of the first annular optical element 901 and the second annular optical element 902 is made of a black plastic material and made by an injection molding method.

In the 9th embodiment, the first axial connecting structure 951 includes the first axial connecting surface 971 and the first inner receiving surface 941. The second axial connecting structure 952 includes the second axial connecting surface 972 and a second middle receiving surface 962 vertical to the central axis z, wherein the second middle receiving surface 962 is located between the second axial connecting surface 972 and the second inner receiving surface 942. The first inner receiving surface 941 and the second middle receiving surface 962 are corresponding and connected to each other.

The first annular optical element 901 further includes a first outer receiving surface 981 vertical to the central axis z, wherein the first outer receiving surface 981 is farther from the central axis z than the first axial connecting surface 971 is from the central axis z. The second annular optical element 902 further includes a second outer receiving surface 982 vertical to the central axis z, wherein the second outer receiving surface 982 is farther from the central axis z than the second axial connecting surface 972 is from the central axis z, and the first outer receiving surface 981 and the second outer receiving surface 982 are corresponding and not connected to each other. The first outer receiving surface 981 and the second outer receiving surface 982 define an outer receiving space 980, that is, the outer receiving space 980 is formed between the first outer receiving surface 981 and the second outer receiving surface 982.

The annular optical element assembly 900 further includes a light blocking sheet 990, wherein the light blocking sheet 990 is received in the outer receiving space 980 and limitedly disposed with respect to a position on the central axis z by the first annular optical element 901 and the second annular optical element 902. The light blocking sheet 990 includes a light blocking sheet opening 993, wherein the central axis z passes through the light blocking sheet opening 993.

The outer receiving space 980 includes an outer air gap space 988, wherein the outer air gap space 988 is located between the light blocking sheet 990 and the first outer receiving surface 981 or between the light blocking sheet 990 and the second outer receiving surface 982. It can be said that the outer air gap space 988 is an air layer sandwiched, the light blocking sheet 990 is received by one of the first outer receiving surface 981 and the second outer receiving surface 982 at a moment, and the light blocking sheet 990 can be slightly shaken in the outer receiving space 980 instead of being simultaneously and closely abutted with the first outer receiving surface 981 and the second outer receiving surface 982. A width parallel to the central axis z of the outer air gap space 988 is w1.

The light blocking sheet 990 is a composite light blocking sheet and further includes a first outer layer 994, a second outer layer 996 and an inner substrate layer 998, wherein the first outer layer 994 surrounds a first outer opening, the second outer layer 996 surrounds a second outer opening, the inner substrate layer 998 is disposed between the first outer layer 994 and the second outer layer 996, and the inner substrate layer 998 connects the first outer layer 994 and the second outer layer 996 and surrounds a substrate opening. The first outer opening, the substrate opening and the second outer opening are corresponding to each other and coaxial with respect to the central axis z, and form the light blocking sheet opening 993, wherein the first outer opening, the second outer opening and the substrate opening in the 9th embodiment may refer to the first outer opening 195, the second outer opening 197 and the substrate opening 199 of the light blocking sheet 190 shown as FIG. 1G in the 1st embodiment, and their reference numerals are omitted herein. Furthermore, the inner substrate layer 998 is made of a plastic material, and each of the first outer layer 994 and the second outer layer 996 is made of a black carbon-containing material.

The data of the parameters DA1, DA2, DH1, DH2, θ, w, w1, α, t1, t2 and t1/t2 of the annular optical element assembly 900 according to the 9th embodiment of the present disclosure are listed in the following Table 9, wherein the parameters are also shown as FIG. 9B to FIG. 9E. The definitions of these parameters shown in Table 9 are the same as those stated in the annular optical element assembly 100 of the 1st embodiment with corresponding values for the annular optical element assembly 900.

TABLE 9

9th Embodiment

| | | | |
|---|---|---|---|
| DA1 (mm) | 4.22 | w1 (mm) | 0.008 |
| DA2 (mm) | 4.24 | α (deg.) | 20 |
| DH1 (mm) | 2.4 | t1 (mm) | 0.4 |
| DH2 (mm) | 3.3 | t2 (mm) | 0.376 |
| θ (deg.) | 57 | t1/t2 | 1.06 |
| w (mm) | 0.018 | | |

10th Embodiment

Figure 10:
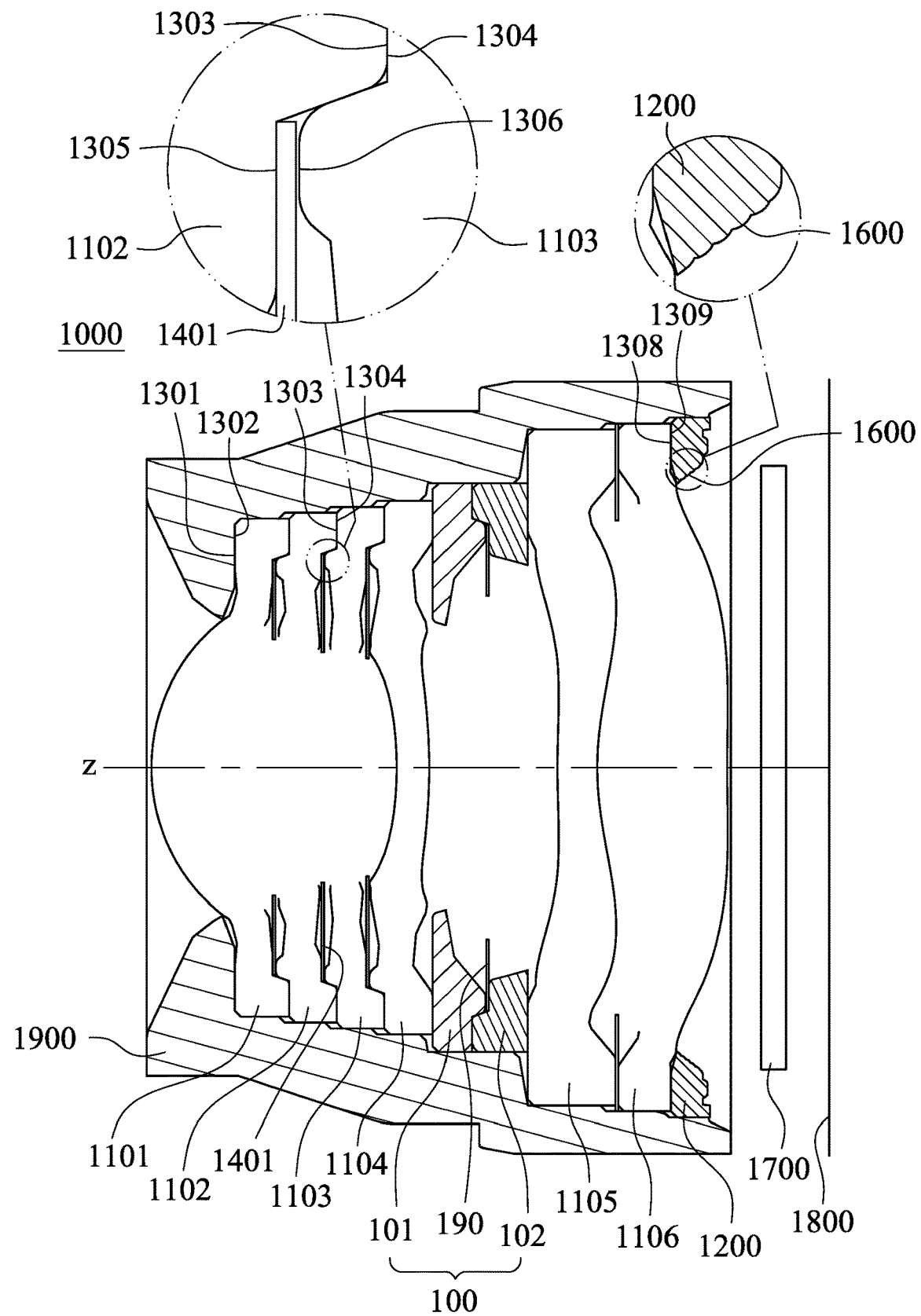
FIG. 10 is a schematic view of an imaging lens set according to the 10th embodiment of the present disclosure.

FIG. 10 is a schematic view of an imaging lens set 1000 according to the 10th embodiment of the present disclosure (some details about lens elements are omitted). In FIG. 10, the imaging lens set 1000 includes the annular optical element assembly 100 of the 1st embodiment according to the present disclosure and a plurality of lens elements (1101, 1102, 1103, 1104, 1105 and 1106), wherein the lens elements 1101-1106 and the annular optical element assembly 100 are arranged along the central axis z (i.e. an optical axis of the imaging lens set 1000), and the annular optical element assembly 100 is disposed between the lens elements 1104 and 1105.

In FIG. 1B, FIG. 1D and FIG. 10, the first axial connecting structure 151 further includes the first outer receiving surface 181 vertical to the central axis z, wherein the first outer receiving surface 181 is farther from the central axis z than the first axial connecting surface 171 is from the central axis z. The second axial connecting structure 152 further includes the second outer receiving surface 182 vertical to the central axis z, wherein the second outer receiving surface 182 is farther from the central axis z than the second axial connecting surface 172 is from the central axis z, and the first outer receiving surface 181 and the second outer receiving surface 182 are corresponding and connected to each other. When the thickness of the first annular optical element 101 which is parallel to the central axis z and corresponding to the first outer receiving surface 181 is t1, and the thickness of the second annular optical element 102 which is parallel to the central axis z and corresponding to the second outer receiving surface 182 is t2, the following condition is satisfied: 0.2<t1/t2<5.0. Therefore, it is favorable for maintaining a proper thickness proportion between the first annular optical element 101 and the second annular optical element 102, so as to balance the manufacturability and a desired light blocking position of the imaging lens set 1000. Furthermore, the first outer receiving surface 181 and the second outer receiving surface 182 have a function of stacking optical elements (i.e. the first annular optical element 101 and the second annular optical element 102). The other details of the annular optical element assembly 100 have been described in the foregoing paragraphs of the 1st embodiment and will not be described again herein.

In general, a "receiving surface" may indicate a surface of an optical element for being received or abutted with another optical element, wherein the receiving surface may be vertical to a central axis (i.e. an optical axis), but not limited thereto, and the aforementioned optical element may be a lens element, a light blocking sheet, a spacer, a retainer, a barrel and so on. In the annular optical element assembly 100 according to the 1st embodiment of the 10th embodiment, the first annular optical element 101 and the second annular optical element 102 are both spacers, wherein the first inner receiving surface 141, the second inner receiving surface 142, the first outer receiving surface 181 and the second outer receiving surface 182 are all within the scope of the receiving surfaces.

In FIG. 10, the receiving surfaces may be for stacking the optical elements so as provide each fixed axial distance between every two lens elements which are adjacent to each other. The following are examples of some applications of the receiving surfaces. A receiving surface 1303 of the lens element 1102 and a receiving surface 1304 of the lens element 1103 are corresponding and connected to each other, so as to maintain an axial distance between the lens elements 1102 and 1103. A receiving surface 1309 of a retainer 1200 and a receiving surface 1308 of the lens element 1106 are corresponding and connected to each other, and thereby the retainer 1200 and the lens element 1106 are stacked with each other, so that the lens elements 1101-1106 can be positioned and fixed in a barrel 1900. A receiving surface 1302 of the lens element 1101 and a receiving surface 1301 of the barrel 1900 are corresponding and connected to each other, and thereby the lens element 1101 and the barrel 1900 are stacked with each other, so as to maintain a specific distance between a light receiving opening of the barrel 1900 and the lens element 1101.

Furthermore, in FIG. 1B and FIG. 10, two receiving surfaces of two respective optical elements disposed correspondingly to each other may allow a mechanical configuration for accommodating a third optical lens element, such as the first inner receiving surface 141 and the second inner receiving surface 142 being corresponding and not connected to each other for accommodating the light blocking sheet 190 therebetween, and a receiving surface 1305 of the lens element 1102 and a receiving surface 1306 of the lens element 1103 being corresponding and not connected to each other for accommodating the light blocking sheet 1401 therebetween. In addition, the first outer receiving surface 181 of the first annular optical element 101 and the second outer receiving surface 182 of the second annular optical element 102 are corresponding and connected to each other, and the first inner receiving surface 141 and the second inner receiving surface 142 are corresponding and not connected to each other for accommodating the light blocking sheet 190. Thus, the receiving space 170 is defined by the first inner receiving surface 141 and the second inner receiving surface 142, wherein a spacing width of the receiving space 170 is a little greater than a thickness of the light blocking sheet 190. Therefore, the light blocking sheet 190 can be prevented from unexpected affects after assembling the imaging lens set 1000.

In detail, the imaging lens set 1000 includes the lens elements 1101, 1102, 1103, 1104, 1105, 1106, a glass panel 1700 and an image surface 1800 in order from an object side to an image side. The imaging lens set 1000 has a total of six lens elements (1101, 1102, 1103, 1104, 1105 and 1106), wherein the lens elements 1101, 1102, 1103, 1104, 1105 and 1106 are disposed along the optical axis in the barrel 1900. Furthermore, the imaging lens set 1000 further includes other optical elements, such as the light blocking sheet 1401 disposed between the lens elements 1102 and 1103, the annular optical element assembly 100 disposed between the lens elements 1104 and 1105, and the retainer 1200 disposed on an image side of the lens element 1106. The glass panel 1700 can be a cover glass, a filter or both above, and will not affect the focal length of the imaging lens set 1000. In other embodiments (not shown in drawings), the imaging lens set can have a total of four, five, seven or more lens elements.

In addition, the retainer 1200 can include a plurality of micro structures 1600, which may be a plurality of annular protrusion structures being continued one by one and coaxial with respect to the central axis z, wherein each of the micro structures 1600 may have an arc annular surface. Therefore, it is favorable for effectively reducing the stray light, and thereby enhancing the image quality of the imaging lens set 1000, which the retainer 1200 is applied in.

The data of the aforementioned parameters of the imaging lens set 1000 according to the 10th embodiment of the present disclosure are listed in the following Table 10, wherein the parameters are also shown as FIG. 1D.

TABLE 10

| 10th Embodiment | | | |
|---|---|---|---|
| t1 (mm) | 0.33 | t1/t2 | 0.70 |
| t2 (mm) | 0.47 | | |

Furthermore, the annular optical element assemblies 200-900 of the respective 2nd-9th embodiments according to the present disclosure can be applicable to other imaging lens sets (not shown in drawings), wherein the definitions of the parameters t1, t2 and t1/t2 are the same as the imaging lens set 1000 of the 10th embodiment (the annular optical element assembly 100 of the 1st embodiment), the data of the aforementioned parameters are listed in Table 2 to Table 9, and the parameters are also shown as FIG. 2D, FIG. 3D, FIG. 4D, FIG. 5D, FIG. 6D, FIG. 7D, FIG. 8D and FIG. 9D.

11th Embodiment

Figure 11:
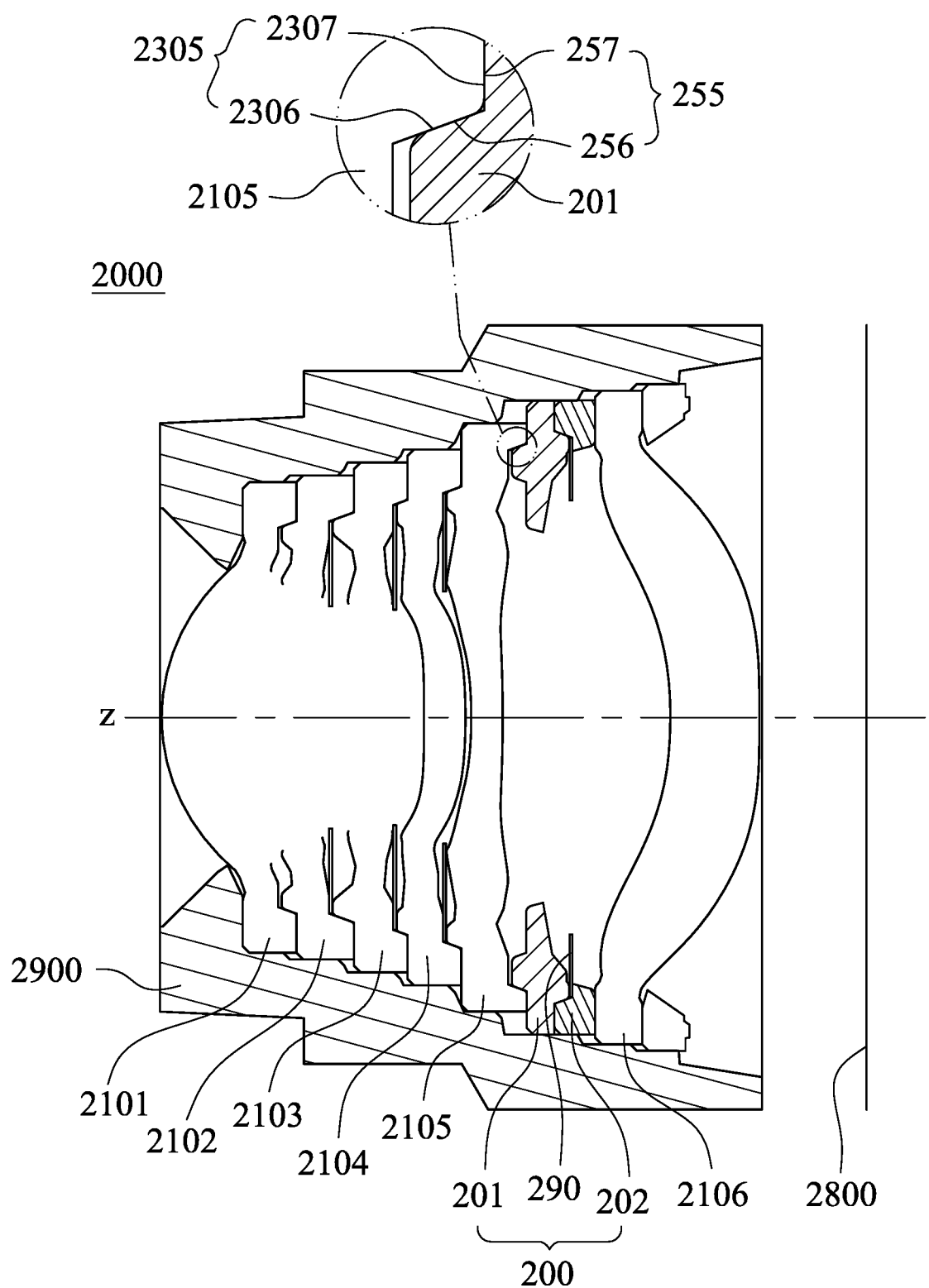
FIG. 11 is a schematic view of an imaging lens set according to the 11th embodiment of the present disclosure.

FIG. 11 is a schematic view of an imaging lens set 2000 according to the 11th embodiment of the present disclosure (some details about lens elements are omitted). In FIG. 11, the imaging lens set 2000 includes the annular optical element assembly 200 of the 2nd embodiment according to the present disclosure and a plurality of lens elements (2101, 2102, 2103, 2104, 2105 and 2106), wherein the lens elements 2101-2106 and the annular optical element assembly 200 are arranged along the central axis z (i.e. an optical axis of the imaging lens set 2000), and the annular optical element assembly 200 is disposed between the lens elements 2105 and 2106.

At least one of the first annular optical element 201 and the second annular optical element 202 further includes the element axial connecting surface 256, wherein it is the first annular optical element 201 including the element axial connecting surface 256 in the 11th embodiment. The element axial connecting surface 256 is located on the side surface of the first annular optical element 201, which is not received with the second annular optical element 202. The element axial connecting surface 256 is the conical surface and for aligning the annular optical element assembly 200 and the lens element 2105 with the central axis z. The conical surface is favorable for the injection molding method as well as the mold releasing, so as to achieve a successful mold releasing and reduce the defects resulted from the injection molding, such as releasing failure, short shot or sink mark. The other details of the annular optical element assembly 200 have been described in the foregoing paragraphs of the 2nd embodiment and will not be described again herein.

In detail, the side surface of the first annular optical element 201, which is not received with the second annular optical element 202, includes an element axial connecting structure 255, wherein the element axial connecting structure 255 includes the element axial connecting surface 256 and a receiving surface 257. The lens element 2105 includes an element axial connecting structure 2305, wherein the element axial connecting structure 2305 includes an element axial connecting surface 2306 and a receiving surface 2307. The element axial connecting surfaces 256 and 2306 are corresponding and connected to each other, and the receiving surfaces 257 and 2307 are corresponding and connected to each other, so as to align the annular optical element assembly 200 (the first annular optical element 201) and the lens element 2105 with the central axis z. Furthermore, the angle between the element axial connecting surface 256 and the central axis z and an angle between the element axial connecting surface 2306 and the central axis z is α2 and the same values (the data is listed in Table 2, and the parameter is also shown as FIG. 2C).

The imaging lens set 2000 includes the lens elements 2101, 2102, 2103, 2104, 2105, 2106 and an image surface 2800 in order from an object side to an image side. The imaging lens set 2000 has a total of six lens elements (2101, 2102, 2103, 2104, 2105 and 2106), wherein the lens elements 2101, 2102, 2103, 2104, 2105 and 2106 are disposed along the optical axis in the barrel 2900. Furthermore, the annular optical element assembly 200 is disposed between the lens elements 2105 and 2106.

The data of the parameters t1, t2 and t1/t2 of the imaging lens set 2000 according to the 11th embodiment of the present disclosure are listed in the following Table 11, wherein the parameters are also shown as FIG. 2D. The definitions of these parameters shown in Table 11 are the same as those stated in the imaging lens set 1000 of the 10th embodiment with corresponding values for the imaging lens set 2000.

TABLE 11

| 11th Embodiment | | | |
|---|---|---|---|
| t1 (mm) | 0.21 | t1/t2 | 0.68 |
| t2 (mm) | 0.31 | | |

12th Embodiment

Figure 12A:
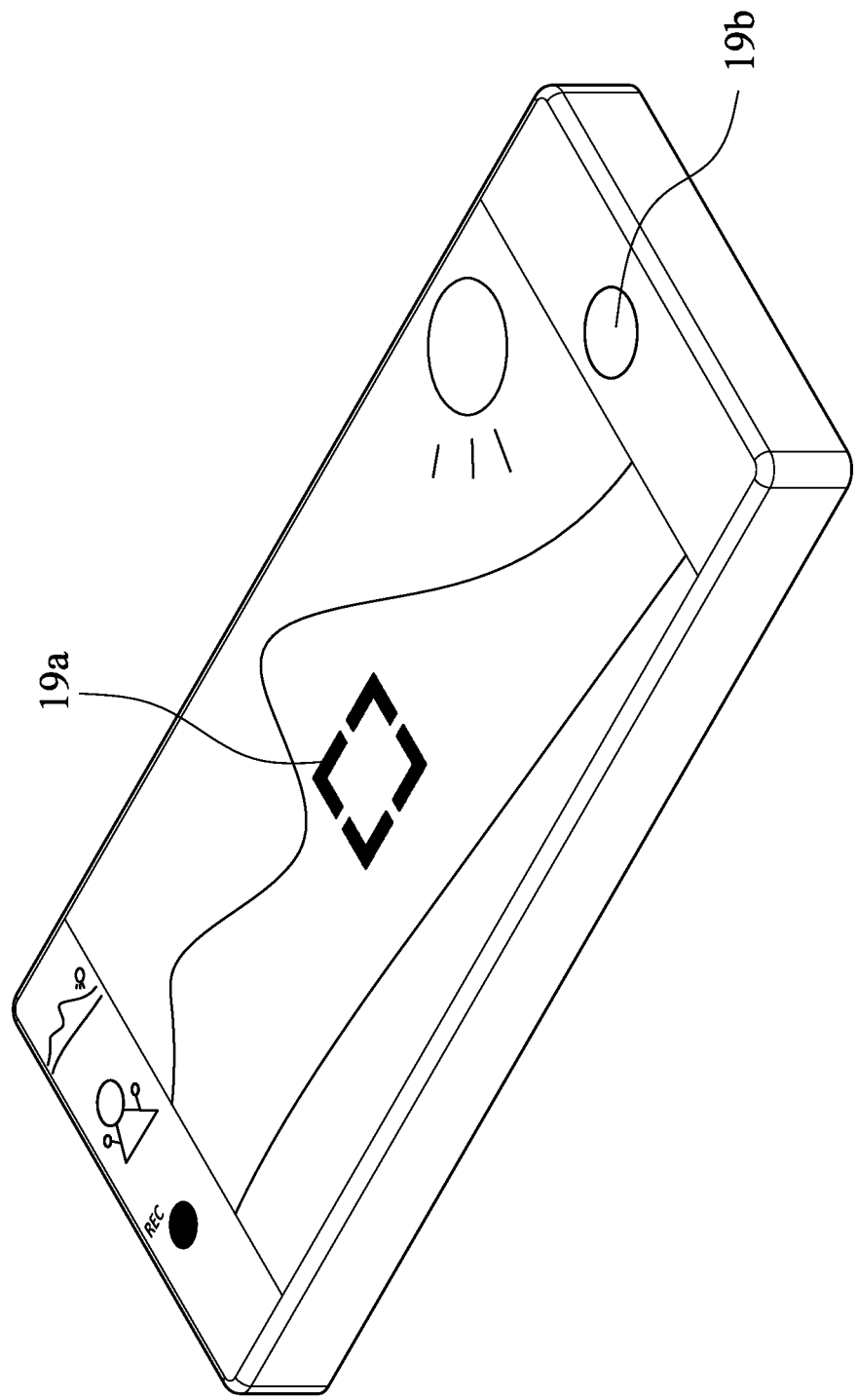
FIG. 12A shows a schematic view of an electronic device according to the 12th embodiment of the present disclosure.
Figure 12B:
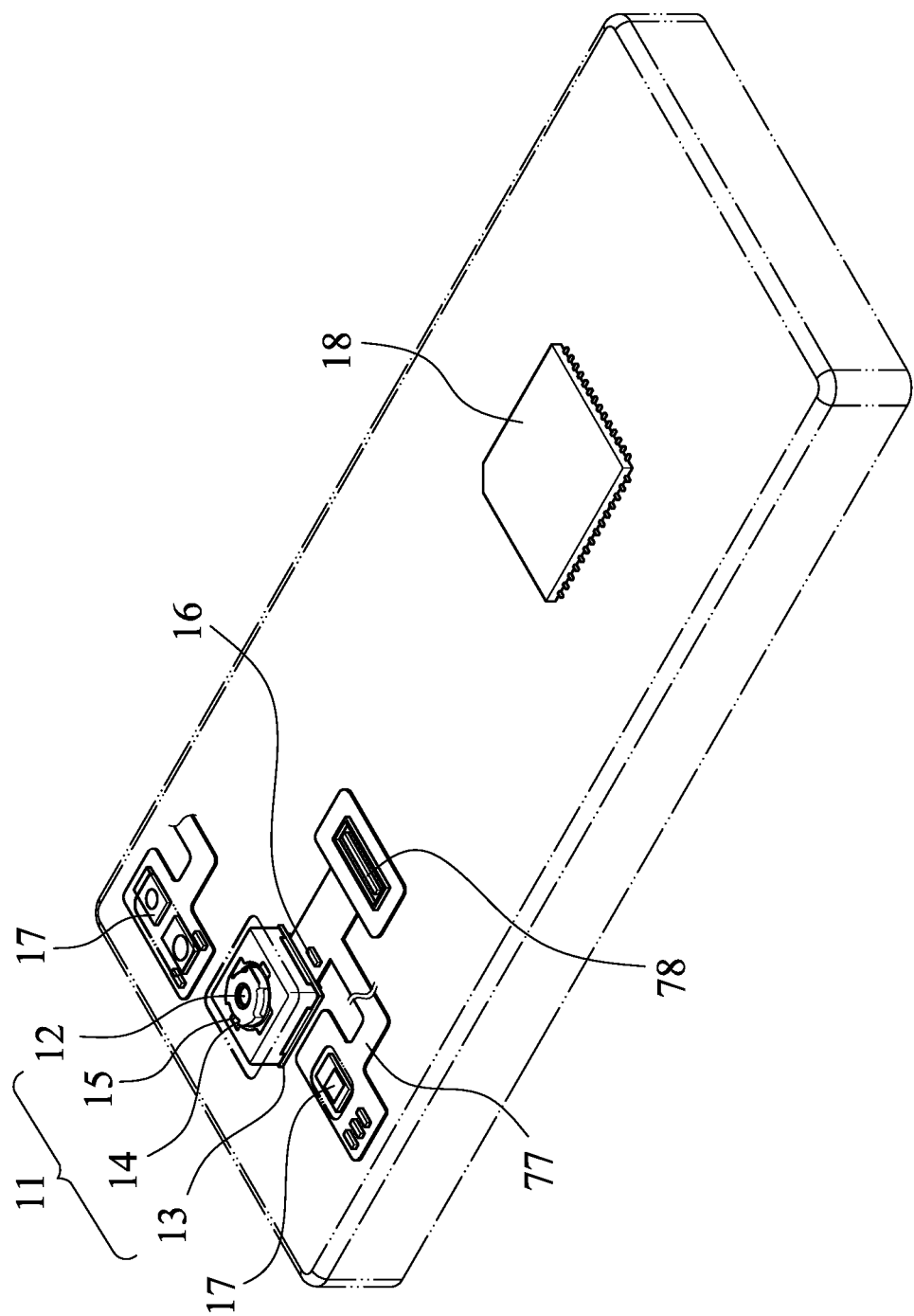
FIG. 12B shows another schematic view of the electronic device according to the 12th embodiment.

FIG. 12A shows a schematic view of an electronic device 10 according to the 12th embodiment of the present disclosure, FIG. 12B shows another schematic view of the electronic device 10 according to the 12th embodiment, and particularly, FIG. 12A and FIG. 12B are schematic views related to a camera of the electronic device 10. In FIG. 12A and FIG. 12B, the electronic device 10 of the 12th embodiment is a smart phone, wherein the electronic device 10 includes a camera module 11. The camera module 11 includes an imaging lens set 12 according to the present disclosure and an image sensor 13, wherein the image sensor 13 is disposed on an image surface of the imaging lens set 12. Therefore, a better image quality can be achieved, and hence the high-end imaging requirements of modern electronic devices can be satisfied.

Furthermore, the user activates the capturing mode via a user interface 19 of the electronic device 10, wherein the user interface 19 of the 12th embodiment can be a touch screen 19a, a button 19b and etc. At this moment, the imaging light is converged on the image sensor 13 of the imaging lens set 12, and the electronic signal associated with image is output to an image signal processor (ISP) 18.

Figure 12C:
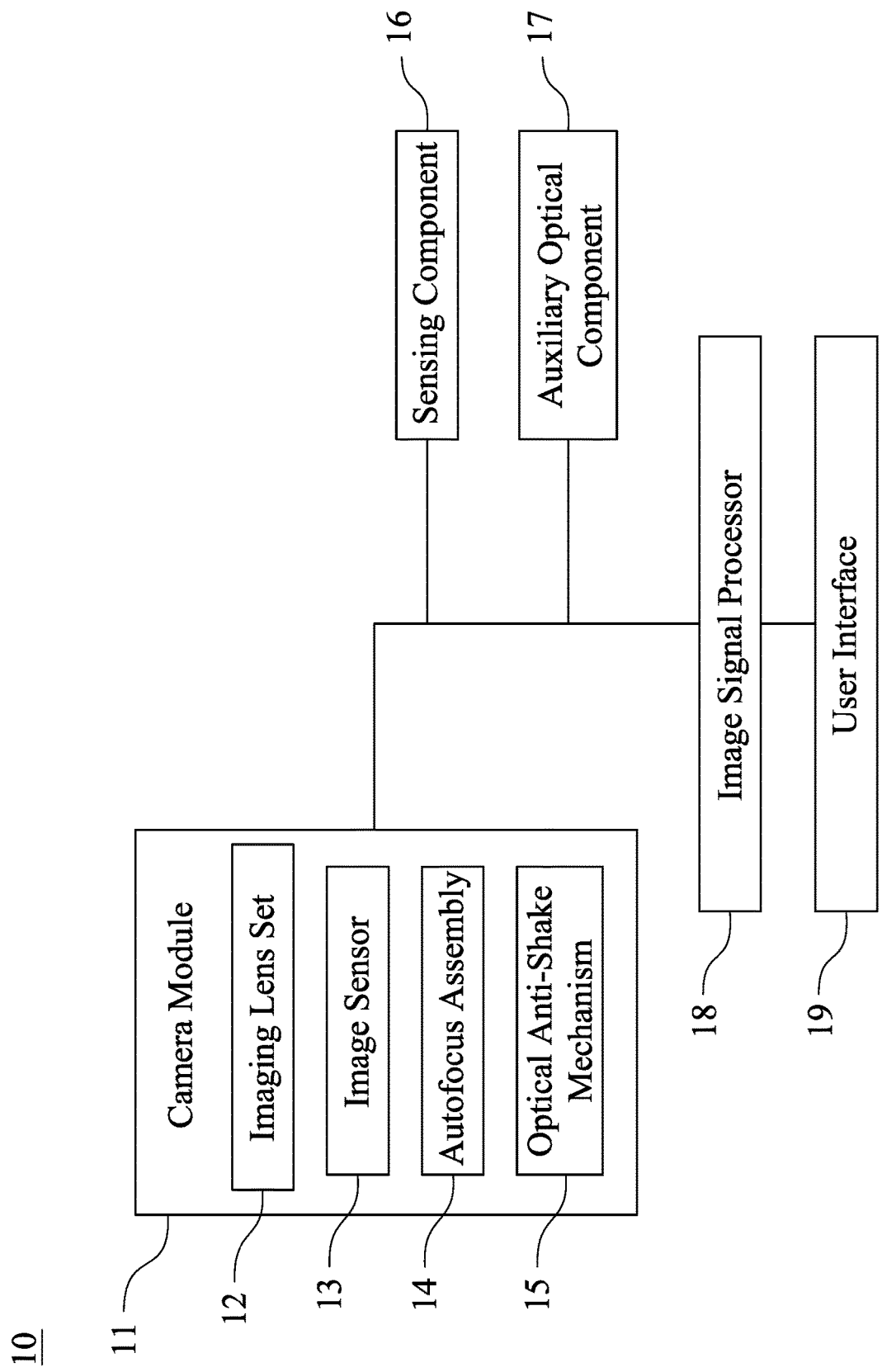
FIG. 12C shows a block diagram of the electronic device according to the 12th embodiment.

FIG. 12C shows a block diagram of the electronic device 10 according to the 12th embodiment, and in particular, the block diagram is related to the camera of the electronic device 10. In FIG. 12A to FIG. 12C, the camera module 11 can further include an autofocus assembly 14 and an optical anti-shake mechanism 15 based on the camera specification of the electronic device 10. Moreover, the electronic device 10 can further include at least one auxiliary optical component 17 and at least one sensing component 16. The auxiliary optical component 17 can be a flash module for compensating for the color temperature, an infrared distance measurement component, a laser focus module and etc. The sensing component 16 can have functions for sensing physical momentum and kinetic energy, and thereby can be an accelerator, a gyroscope, and a hall effect element, to sense shaking or jitters applied by hands of the user or external environments. Accordingly, the functions of the autofocus assembly 14 and the optical anti-shake mechanism 15 of the camera module 11 can be aided and enhanced to achieve the superior image quality. Furthermore, the electronic device 10 according to the present disclosure can have a capturing function with multiple modes, such as taking optimized selfies, high dynamic range (HDR) under a low light source, 4K resolution recording, etc. Additionally, the user can visually see the captured image of the camera through the touch screen 19a and manually operate the view finding range on the touch screen 19a to achieve the auto focus function of what you see is what you get.

Furthermore, in FIG. 12B, the camera module 11, the sensing component 16 and the auxiliary optical component 17 can be disposed on a flexible printed circuit board (FPC) 77 and electrically connected with the associated components, such as the imaging signal processor 18, via a connector 78 to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. In the 12th embodiment, the electronic device 10 includes a plurality of sensing components 16 and a plurality of auxiliary optical components 17. The sensing components 16 and the auxiliary optical components 17 are disposed on the flexible printed circuit board 77 and at least one other flexible printed circuit board (its reference numeral is omitted) and electrically connected with the associated components, such as the image signal processor 18, via corresponding connectors to perform the capturing process. In other embodiments (not shown herein), the sensing components and the auxiliary optical components can also be disposed on the main board of the electronic device or carrier boards of other types according to requirements of the mechanical design and the circuit layout.

In addition, the electronic device 10 can further include but not be limited to a wireless communication unit, a control unit, a storage unit, a random access memory, a read-only memory, or a combination thereof.

13th Embodiment

Figure 13:
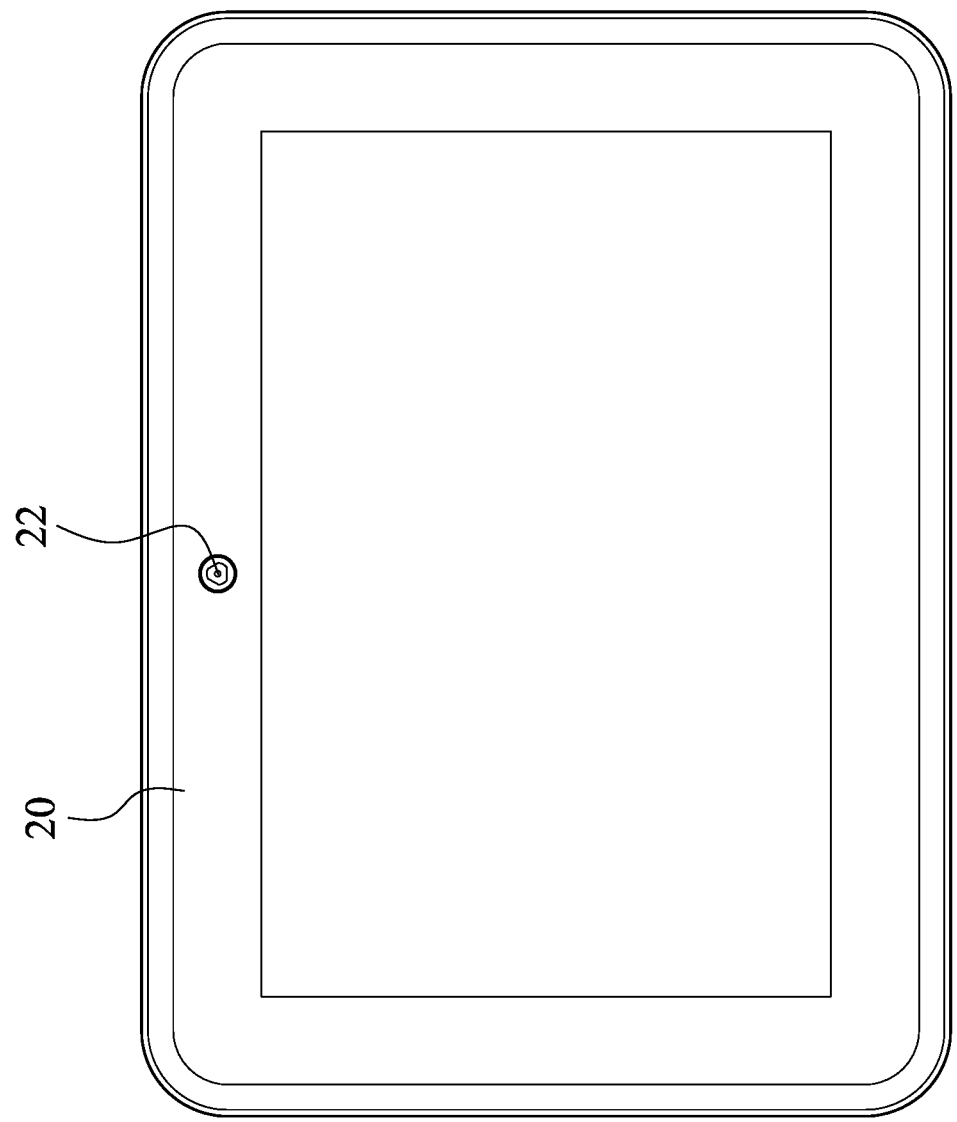
FIG. 13 shows an electronic device according to the 13th embodiment of the present disclosure.

FIG. 13 shows an electronic device 20 according to the 13th embodiment of the present disclosure. The electronic device 20 of the 13th embodiment is a tablet personal computer, wherein the electronic device 20 includes an imaging lens set 22 according to the present disclosure.

14th Embodiment

Figure 14:
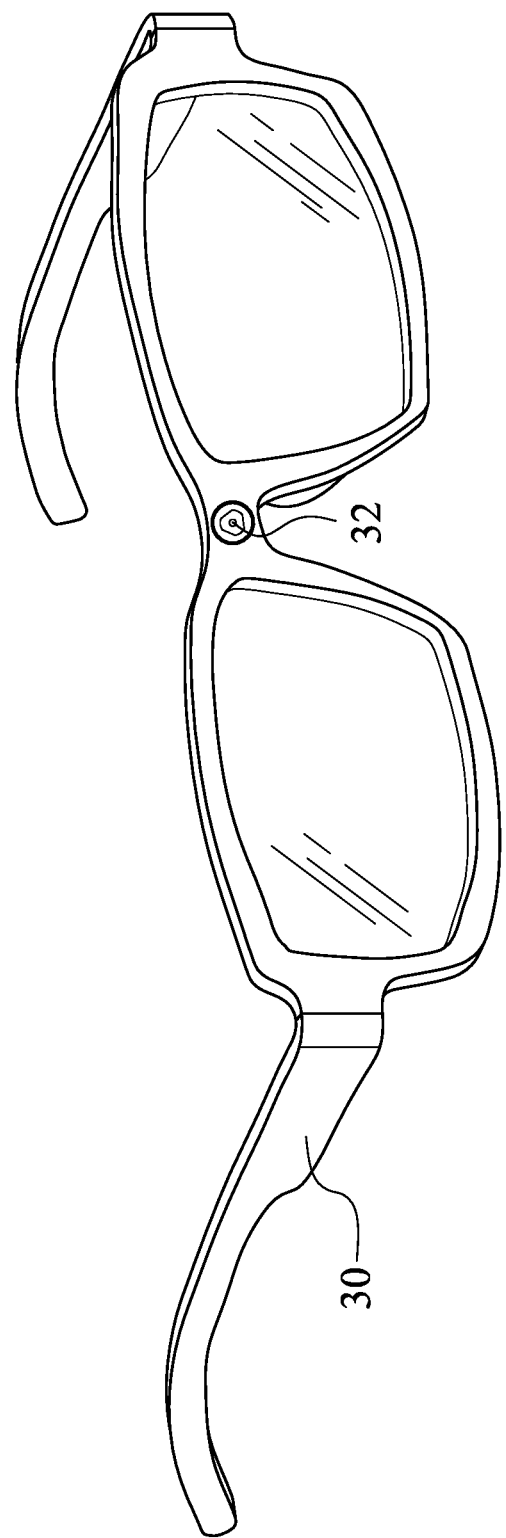
FIG. 14 shows an electronic device according to the 14th embodiment of the present disclosure.
Figure 15:
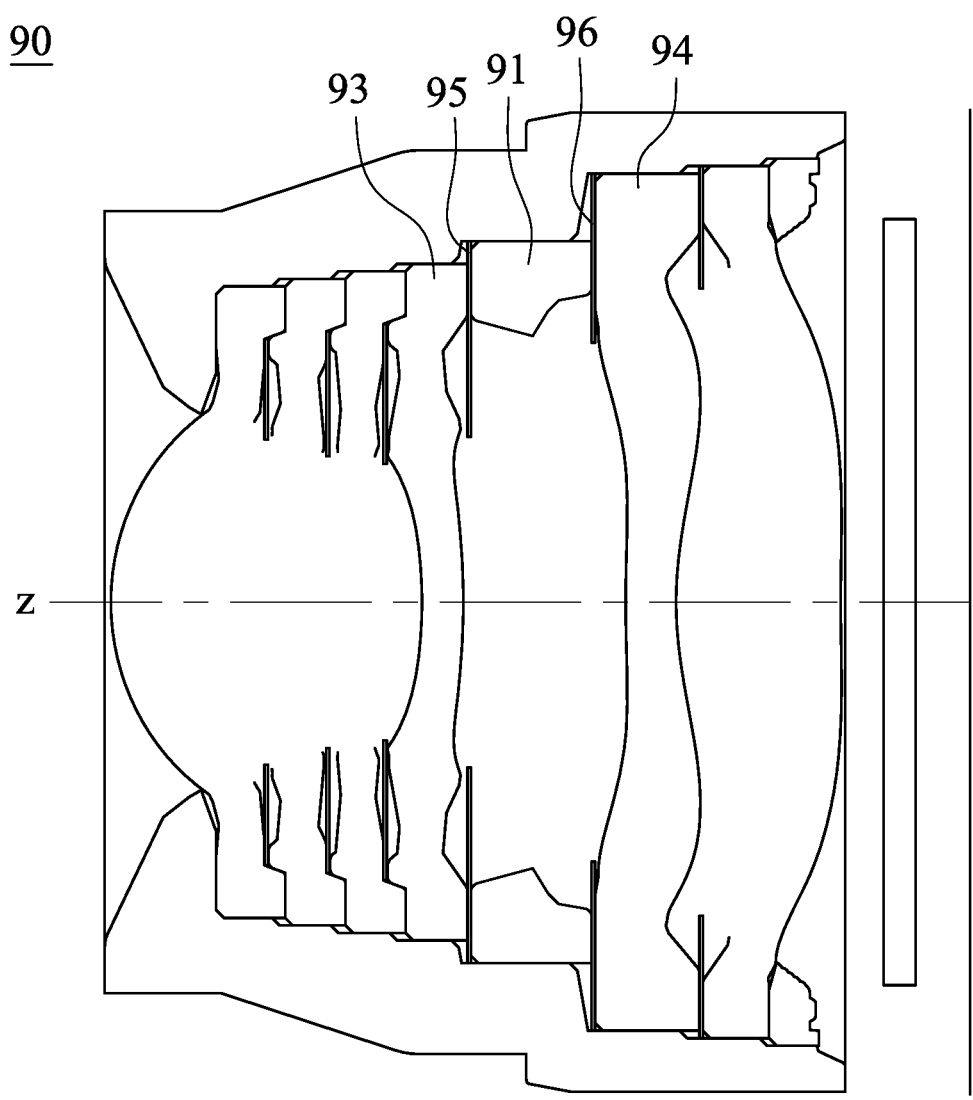
FIG. 15 is a schematic view of a conventional imaging lens set.

FIG. 14 shows an electronic device 30 according to the 14th embodiment of the present disclosure. The electronic device 30 of the 14th embodiment is a wearable device, wherein the electronic device 30 includes an imaging lens set 32 according to the present disclosure.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. An annular optical element assembly having a central axis, wherein the annular optical element assembly comprises:
    a first annular optical element comprising:
      a first central opening, wherein the central axis passes through the first central opening; and
      a first axial connecting structure surrounding the first central opening and comprising a first axial connecting surface, wherein the first axial connecting surface is a conical surface; and
    a second annular optical element comprising:
      a second central opening, wherein the central axis passes through the second central opening; and
      a second axial connecting structure surrounding the second central opening and comprising a second axial connecting surface, wherein the second axial connecting surface is a conical surface, and the first axial connecting surface and the second axial connecting surface are corresponding and connected to each other for aligning the first annular optical element and the second annular optical element with the central axis;
    wherein on a cross-sectional plane of the annular optical element assembly which passes through the central axis and has a normal direction vertical to the central axis, a minimum diameter position of the first axial connecting surface is A1, a minimum diameter position of a surface forming the first central opening is H1, a minimum diameter position of the second axial connecting surface is A2, a minimum diameter position of a surface forming the second central opening is H2, only one of H1 and H2 is closer to an object side than both A1 and A2 to the object side, an angle between a line connecting A1 with H1 and a line connecting A2 with H2 is θ, and the following condition is satisfied:

5 degrees<θ<90 degrees.

2. The annular optical element assembly of claim 1, wherein on the cross-sectional plane of the annular optical element assembly which passes through the central axis and has the normal direction vertical to the central axis, the minimum diameter position of the first axial connecting surface is A1, the minimum diameter position of the surface forming the first central opening is H1, the minimum diameter position of the second axial connecting surface is A2, the minimum diameter position of the surface forming the second central opening is H2, the angle between the line connecting A1 with H1 and the line connecting A2 with H2 is θ, and the following condition is satisfied:

18 degrees <θ<89 degrees.

3. The annular optical element assembly of claim 2, wherein on the cross-sectional plane of the annular optical element assembly which passes through the central axis and has the normal direction vertical to the central axis, the minimum diameter position of the first axial connecting surface is A1, the minimum diameter position of the surface forming the first central opening is H1, the minimum diameter position of the second axial connecting surface is A2, the minimum diameter position of the surface forming the second central opening is H2, the angle between the line connecting A1 with H1 and the line connecting A2 with H2 is θ, and the following condition is satisfied:

28 degrees<θ<79 degrees.

4. The annular optical element assembly of claim 2, wherein an angle between the first axial connecting surface and the central axis and an angle between the second axial connecting surface and the central axis are α and the same values, and the following condition is satisfied:

1 degrees<α<38 degrees.

5. The annular optical element assembly of claim 4, wherein the line connecting A1 with H1 and the line connecting A2 with H2 approach towards each other from being near the central axis to being far from the central axis.

6. The annular optical element assembly of claim 2, wherein the first annular optical element further comprises a first inner receiving surface surrounding the first central opening, the first inner receiving surface is closer to the central axis than the first axial connecting surface is to the central axis, the first inner receiving surface is vertical to the central axis, the second annular optical element further comprises a second inner receiving surface surrounding the second central opening, the second inner receiving surface is closer to the central axis than the second axial connecting surface is to the central axis, the second inner receiving surface is vertical to the central axis, and the first inner receiving surface and the second inner receiving surface are corresponding and not connected to each other.

7. The annular optical element assembly of claim 6, wherein an air gap space is located between the first inner receiving surface and the second inner receiving surface, a width parallel to the central axis of the air gap space is w, and the following condition is satisfied:

0.001 mm<w<0.03 mm.

8. An imaging lens set, comprising:
the annular optical element assembly of claim 2; and
a plurality of lens elements, wherein the lens elements and the annular optical element assembly are arranged along the central axis;
wherein at least one of the first annular optical element and the second annular optical element further comprises an element axial connecting surface, which is a conical surface, and the element axial connecting surface is for aligning the annular optical element assembly and at least one of the lens elements with the central axis.

9. An electronic device, comprising:
the imaging lens set of claim 8.

10. An annular optical element assembly having a central axis, wherein the annular optical element assembly comprises:
a first annular optical element comprising:
a first central opening, wherein the central axis passes through the first central opening; and
a first axial connecting structure surrounding the first central opening and comprising a first axial connecting surface, wherein the first axial connecting surface is a conical surface; and
a second annular optical element comprising:
a second central opening, wherein the central axis passes through the second central opening; and
a second axial connecting structure surrounding the second central opening and comprising a second axial connecting surface, wherein the second axial connecting surface is a conical surface, and the first axial connecting surface and the second axial connecting surface are corresponding and connected to each other for aligning the first annular optical element and the second annular optical element with the central axis;
wherein on a cross-sectional plane of the annular optical element assembly which passes through the central axis and has a normal direction vertical to the central axis, a minimum diameter position of the first axial connecting surface is A1, a minimum diameter position of a surface forming the first central opening is H1, a minimum diameter position of the second axial connecting surface is A2, a minimum diameter position of a surface forming the second central opening is H2, only one of H1 and H2 is closer to an image side than both A1 and A2 to the image side, an angle between a line connecting A1 with H1 and a line connecting A2 with H2 is θ, and the following condition is satisfied:

5 degrees<θ<90 degrees.

* * * * *